United States Patent [19]
Hashimura

[11] Patent Number: 5,973,849
[45] Date of Patent: Oct. 26, 1999

[54] ZOOM LENS SYSTEM

[75] Inventor: Junji Hashimura, Sakai, Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,642

[22] Filed: Dec. 13, 1995

[30] Foreign Application Priority Data

| Dec. 16, 1994 | [JP] | Japan | 6-313599 |
| Jan. 24, 1995 | [JP] | Japan | 7-009216 |
| Mar. 29, 1995 | [JP] | Japan | 7-071740 |
| Jul. 5, 1995 | [JP] | Japan | 7-170009 |

[51] Int. Cl.$^6$ .............................. G02B 3/00; G02B 15/14
[52] U.S. Cl. .......................... 359/654; 359/691; 359/692; 359/717
[58] Field of Search .................................... 359/654, 692, 359/689, 686, 682, 681, 708–717, 676–677, 691

[56] References Cited

U.S. PATENT DOCUMENTS

| 4,883,346 | 11/1989 | Aoki et al. | 359/676 |
| 5,087,988 | 2/1992 | Nakayama | 359/689 |
| 5,196,962 | 3/1993 | Aoki | 359/686 |
| 5,325,235 | 6/1994 | Takashima et al. | 359/689 |
| 5,327,290 | 7/1994 | Fukushima et al. | 359/692 |
| 5,353,160 | 10/1994 | Ogata | 359/689 |
| 5,361,167 | 11/1994 | Aoki | 359/689 |
| 5,414,560 | 5/1995 | Kiriki | 359/654 |
| 5,424,870 | 6/1995 | Hashimura et al. | 359/689 |
| 5,434,711 | 7/1995 | Tetsuya et al. | 359/689 |
| 5,541,775 | 7/1996 | Kiriki | 359/687 |

FOREIGN PATENT DOCUMENTS

| 2051116 | 2/1990 | Japan . |
| 4063312 | 2/1992 | Japan . |
| 5188296 | 7/1993 | Japan . |

*Primary Examiner*—Georgia Epps
*Assistant Examiner*—Jordan M. Schwartz
*Attorney, Agent, or Firm*—Price Gess & Ubell

[57] ABSTRACT

A zoom lens system has a plurality of lens units. Zooming is performed by varying distances between the lens units. A gradient index lens is included in the lens units. The gradient index lens has a gradient index in a direction vertical to an optical axis. The gradient index lens has at least one aspherical surface.

80 Claims, 19 Drawing Sheets

FNO=4.60
— d
----- SC
-0.5  0.5
SPHERICAL  SINE
ABERRATION CONDITION

Y'=21.6
----- DM
— DS
-0.5  0.5
ASTIGMATISM

Y'=21.6
-5.0  5.0
DISTORTION %

FNO=6.25
— d
----- SC
-0.5  0.5
SPHERICAL  SINE
ABERRATION CONDITION

Y'=21.6
----- DM
— DS
-0.5  0.5
ASTIGMATISM

Y'=21.6
-5.0  5.0
DISTORTION %

FNO=8.53
— d
----- SC
-0.5  0.5
SPHERICAL  SINE
ABERRATION CONDITION

Y'=21.6
----- DM
— DS
-0.5  0.5
ASTIGMATISM

Y'=21.6
-5.0  5.0
DISTORION %

FNO=3.60

−0.5  0.5
SPHERICAL  SINE
ABERRATION  CONDITION
— d
---- SC

Y'=21.6

−0.5  0.5
ASTIGMATISM
---- DM
— DS

Y'=21.6

−5.0  5.0
DISTORTION %

FNO=4.89

−0.5  0.5
SPHERICAL  SINE
ABERRATION  CONDITION
— d
---- SC

Y'=21.6

−0.5  0.5
ASTIGMATISM
---- DM
— DS

Y'=21.6

−5.0  5.0
DISTORTION %

FNO=6.68

−0.5  0.5
SPHERICAL  SINE
ABERRATION  CONDITION
— d
---- SC

Y'=21.6

−0.5  0.5
ASTIGMATISM
---- DM
— DS

Y'=21.6

−5.0  5.0
DISTORION %

FNO=3.60
— d
---- SC
-0.5  0.5
SPHERICAL  SINE
ABERRATION CONDITION

Y'=21.6
---- DM
—— DS
-0.5  0.5
ASTIGMATISM

Y'=21.6
-5.0  5.0
DISTORTION %

FNO=5.91
— d
---- SC
-0.5  0.5
SPHERICAL  SINE
ABERRATION CONDITION

Y'=21.6
---- DM
—— DS
-0.5  0.5
ASTIGMATISM

Y'=21.6
-5.0  5.0
DISTORTION %

FNO=9.18
— d
---- SC
-0.5  0.5
SPHERICAL  SINE
ABERRATION CONDITION

Y'=21.6
---- DM
—— DS
-0.5  0.5
ASTIGMATISM

Y'=21.6
-5.0  5.0
DISTORION %

FNO=3.60
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORTION %

FNO=5.93
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORTION %

FNO=9.24
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORION %

FNO=3.60
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORTION %

FNO=5.76
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORTION %

FNO=8.73
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORION %

[W]

[T]

FNO=3.60
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORTION %

FNO=5.84
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORTION %

FNO=9.26
— d
---- SC
-0.5  0.5
SPHERICAL  SINE
ABERRATION  CONDITION

Y'=21.6
---- DM
— DS
-0.5  0.5
ASTIGMATISM

Y'=21.6
-5.0  5.0
DISTORION %

FNO=3.60
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORTION %

FNO=5.79
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORTION %

FNO=8.94
— d
---- SC
-0.5   0.5
SPHERICAL   SINE
ABERRATION  CONDITION

Y'=21.6
---- DM
— DS
-0.5   0.5
ASTIGMATISM

Y'=21.6
-5.0   5.0
DISTORION %

FNO=3.60
—— d
---- SC
-0.5  0.5
SPHERICAL  SINE
ABERRATION  CONDITION

Y'=21.6
---- DM
—— DS
-0.5  0.5
ASTIGMATISM

Y'=21.6
-5.0  5.0
DISTORTION %

FNO=6.07
—— d
---- SC
-0.5  0.5
SPHERICAL  SINE
ABERRATION  CONDITION

Y'=21.6
---- DM
—— DS
-0.5  0.5
ASTIGMATISM

Y'=21.6
-5.0  5.0
DISTORTION %

FNO=9.75
—— d
---- SC
-0.5  0.5
SPHERICAL  SINE
ABERRATION  CONDITION

Y'=21.6
---- DM
—— DS
-0.5  0.5
ASTIGMATISM

Y'=21.6
-5.0  5.0
DISTORION %

FIG.20A
FNO=3.60
— d
---- SC
-0.5  0.5
SPHERICAL  SINE
ABERRATION  CONDITION
FIG.20B
Y'=21.6
---- DM
— DS
-0.5  0.5
ASTIGMATISM
FIG.20C
Y'=21.6
-5.0  5.0
DISTORTION %
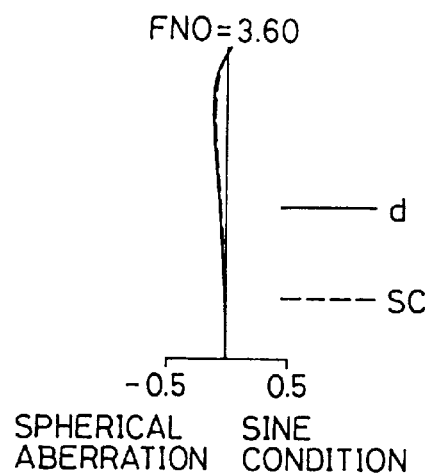
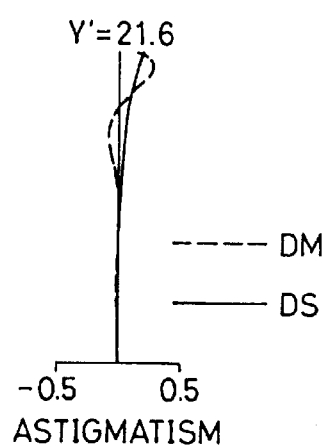
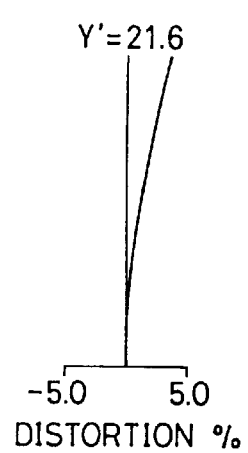
FIG.20D
FNO=5.93
— d
---- SC
-0.5  0.5
SPHERICAL  SINE
ABERRATION  CONDITION
FIG.20E
Y'=21.6
---- DM
— DS
-0.5  0.5
ASTIGMATISM
FIG.20F
Y'=21.6
-5.0  5.0
DISTORTION %
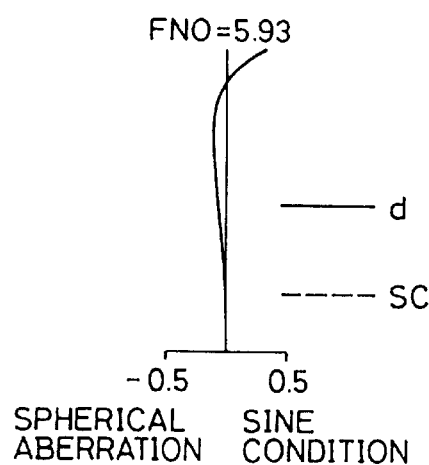
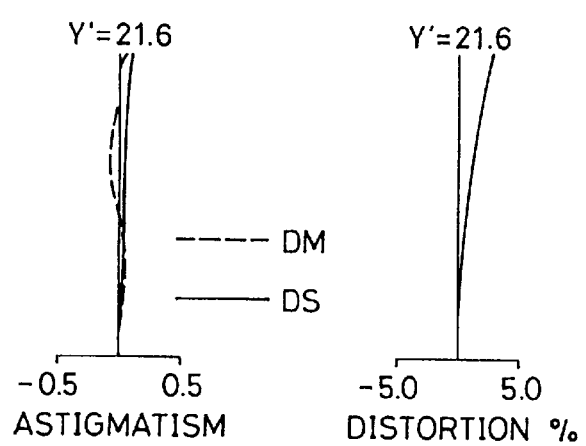
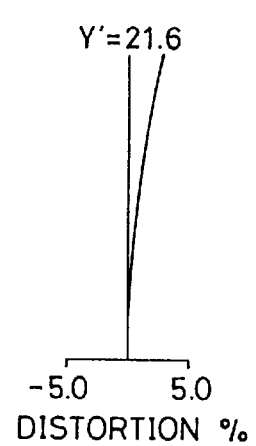
FIG.20G
FNO=9.24
— d
---- SC
-0.5  0.5
SPHERICAL  SINE
ABERRATION  CONDITION
FIG.20H
Y'=21.6
---- DM
— DS
-0.5  0.5
ASTIGMATISM
FIG.20I
Y'=21.6
-5.0  5.0
DISTORION %
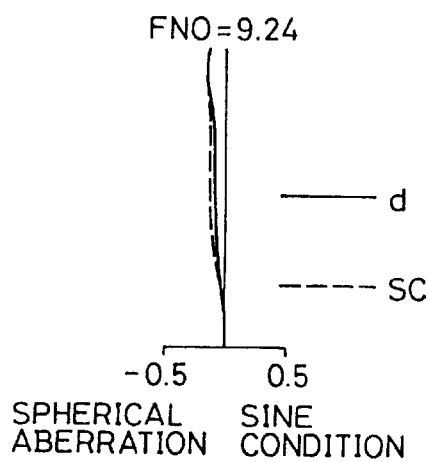
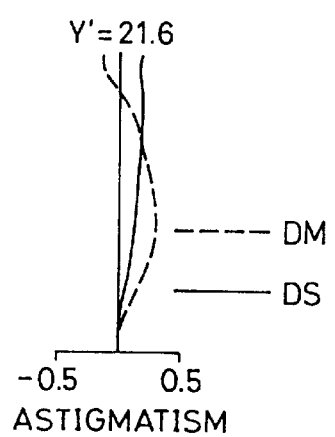
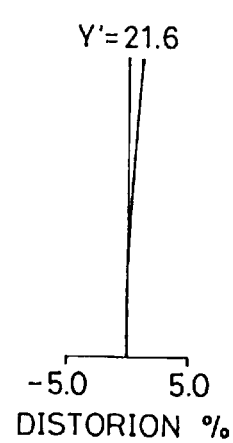

ZOOM LENS SYSTEM

BACKGROUND OF THE INVENTION

1. Field of the Invention

The present invention relates to a zoom lens system, and more particularly, to a small-sized zoom lens system for use in a lens shutter camera and a video camera.

2. Description of the Prior Art

In most of the known three-unit zoom lens systems of positive, positive, negative configuration, a first lens unit includes at least two lens elements, a second lens unit includes at least four lens elements, and a third lens unit includes two or three lens elements.

On the other hand, a three-unit zoom lens system of positive, positive, negative configuration has been proposed in which aberrations are corrected through the use of aspherical surfaces in the optical system to thereby reduce the number of lens elements. For example, U.S. Pat. No. 5,087,988 discloses a zoom lens system in which each lens unit includes one lens element. U.S. Pat. No. 5,325,235 discloses a zoom lens system having a total of four lens elements in which a first lens unit includes one lens element, a second lens unit includes two lens elements and a third lens unit includes one lens element. Japanese Laid-open Patent Application No. H5-188296 discloses a zoom lens system having a total of four or five lens elements in which a second lens unit includes one or two lens elements and a third lens unit includes one lens element. U.S. Pat. No. 5,434,870 discloses a zoom lens system having a total of four lens elements in which a first lens unit includes two lens elements, a second lens unit includes one lens element and a third lens unit includes one lens element. U.S. Pat. No. 5,424,870 discloses a zoom lens system having a total of six lens elements in which each lens unit has two lens elements.

U.S. Pat. No. 5,196,962 discloses a three-unit zoom lens system of positive, positive, negative configuration having a total of six lens elements in which a second lens unit is formed of two lens elements through the use of a gradient index lens (GRIN lens) in the second lens unit.

The GRIN lens is an optical device which has long attracted attention as its optical characteristic (i.e. a characteristic that light advances while being bend in the lens medium) and the possibility of dispersion control are considered highly effective in reducing the number of lens elements constituting the optical system and in reducing the size of the lens system. In particular, since the control of chromatic aberration and Petzval sum which cannot be performed through the aspherical surface can be performed through the GRIN lens, the GRIN lens is expected to have more advantages than the aspherical surface.

In the conventional zoom lens systems having aspherical surfaces, it is impossible to reduce the total number of lens elements of the optical system while reducing the size of the optical system and increasing the magnification. For example, if the first lens unit (i.e. the most object side lens unit) is formed of one lens element, chromatic aberration and Petzval sum generated in the lens unit cannot be sufficiently corrected only through homogeneous lenses, so that a smaller size and a higher magnification cannot be achieved (particularly, the realization of a high magnification is impossible). In addition, in the conventional three-unit zoom lens systems of positive, positive, negative configuration, since the number of lens elements of the second lens unit should be increased to correct aberrations generated in the lens unit, it is extremely difficult to reduce the total number of lens elements of the optical system. This will hereinafter be described in further detail.

In the zoom lens systems disclosed in U.S. Pat. Nos. 5,087,988 and 5,325,235, and Japanese Laid-open Patent Application No. H5-188296, since only homogeneous lenses are used, aberrations (particularly, chromatic aberration and Petzval sum) are not sufficiently corrected, so that only small zoom ratios and large F numbers are achieved. In the zoom lens system disclosed in U.S. Pat. No. 5,434,711, a magnification as high as 2.6× is achieved with a smaller number of lens elements through the use of aspherical surfaces. However, it can hardly be regarded as having high performance.

In the zoom lens system disclosed in U.S. Pat. No. 5,424,870, the aspherical surfaces are incapable of correcting chromatic aberration and Petzval sum, so that each lens unit should include at least two lens elements. This is because in zoom lens systems, in order to correct aberrations in the entire zoom range, it is necessary that at least chromatic aberration and Petzval sum should be corrected in each of the lens units constituting the zoom lens system.

In the zoom lens system disclosed in U.S. Pat. No. 5,196,962, the number of lens elements is reduced through the use of a GRIN lens in the second lens unit. However, since the GRIN lens comprises only spherical lenses, the degree of freedom of the aberration correction is insufficient, so that the number of lens elements of the second lens unit is reduced only to two.

When a fixed focal length lens is constituted by a spherical GRIN lens, it is considered impossible to form it of one lens element since the degree of freedom for the third-order aberration correction is insufficient (see L. G. Atkinson et al., "Design of a gradient-index photographic objective", Appl. Opt. Vol. 21, 1982, pp 993–998). This applies to zoom lens systems. That is, if the lens units constituting a zoom lens system are each formed of one lens element, it is impossible to correct aberration because of the insufficient degree of freedom of the third-order aberration correction, so that it is impossible to form each of the lens units of the zoom lens system of one lens element.

SUMMARY OF THE INVENTION

An object of the present invention is to provide a compact zoom lens system achieving a higher magnification and a smaller number of lens elements.

BRIEF DESCRIPTION OF THE DRAWINGS

This and other objects and features of this invention will become clear from the following description, taken in conjunction with the preferred embodiments with reference to the accompanied drawings in which:

FIGS. 20A to 20I show aberrations of the ninth embodiment;

DESCRIPTION OF THE PREFERRED EMBODIMENTS

Numerical data of first and second embodiments of the present invention are shown in Tables 1 and 2.

The GRIN lens of these embodiments has a gradient index in a direction vertical to the optical axis (hereinafter, this type of GRIN lens will be referred to as a radial GRIN lens). The gradient index is expressed as follows:

$$N(H) = N0 + N1H^2 + N2H^4 \quad (A)$$

where H is the height in a direction vertical to the optical axis, N0 is the axial refractive index, N1 is the quadratic gradient index coefficient, and N2 is the fourth power gradient index coefficient.

In the tables, ri (i=1, 2, 3, ... ) represents a radius of curvature of an ith surface counted from the object side, Ti (i=1, 2, 3, ... ) represents an ith axial distance counted from the object side, Ni (i=1, 2, 3, ... ) represents a 2ith power gradient index of the radial GRIN lens, FL represents a focal length of the entire lens system, and Fno. represents a minimum F number. In each coefficient, the numerals after the letter E correspond to the index portion of each coefficient. For example, 1.0E+02 represents $1.0 \times 10^2$.

The aspherical surface is defined by the following expression:

$$X(H) = \frac{r}{\varepsilon}\left\{1 - \left(1 - \varepsilon \frac{H^2}{r^2}\right)^{\frac{1}{2}}\right\} + \sum_{n \geq 2} AiH^i$$

where r is the reference radius of curvature of the aspherical surface, $\varepsilon$ is the conic constant, and Ai (i=2, 3, 4, ... ) is the aspherical coefficient.

Figure 1:
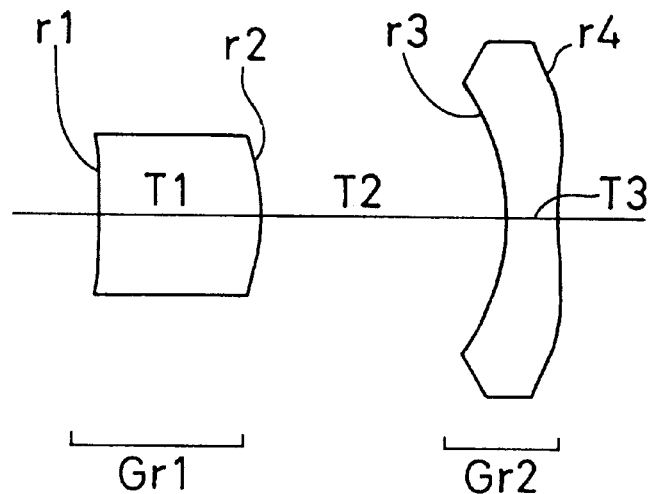
FIG. 1 shows the lens arrangement of a first embodiment of the present invention.

Referring to FIG. 1, there is shown the lens arrangement of the first embodiment of the present invention. The first embodiment comprises from the object side a front lens unit Gr1 of a positive refractive power and a rear lens unit Gr2 of a negative refractive power. The front lens unit consists of a first lens element which is a radial GRIN lens of a positive meniscus configuration convex to the image side whose both side surfaces r1 and r2 are aspherical. The rear lens unit Gr2 consists of a second lens unit which is a radial GRIN lens of a negative meniscus configuration convex to the image side whose image side surface r4 is aspherical.

Figure 2:
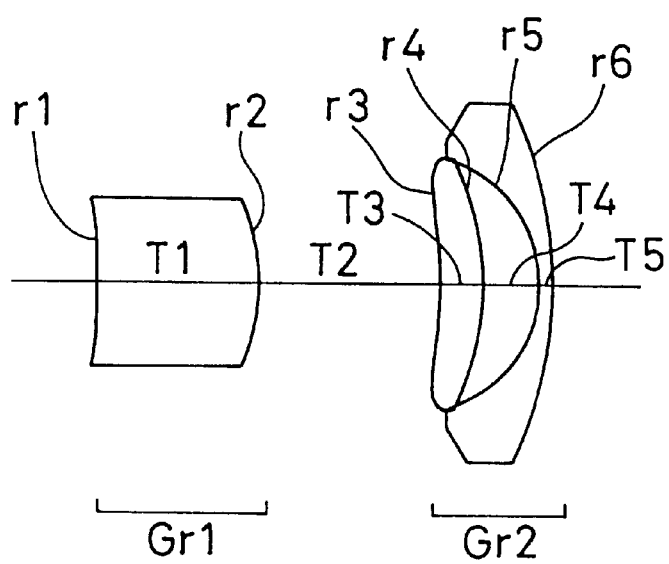
FIG. 2 shows the lens arrangement of a second embodiment of the present invention.

Referring to FIG. 2, there is shown the lens arrangement of the second embodiment of the present invention. The second embodiment comprises from the object side a front lens unit Gr1 of a positive refractive power and a rear lens unit Gr2 of a negative refractive power. The front lens unit Gr1 consists of a first lens element which is a radial GRIN lens of a positive meniscus configuration convex to the image side whose both side surfaces r1 and r2 are aspherical. The rear lens unit Gr2 consists of a second lens element which is a positive lens whose object side surface r3 is aspherical and a third lens element of a negative meniscus configuration convex to the image side.

The first embodiment fulfills the conditions (1) to (12). Tables 3 and 4 show values of the conditions of the first embodiment. In the tables, RF1, RF2, RR1, RR2, TF and TR correspond to r11, r2, r3, r4, T1 and T3, respectively.

The second embodiment fulfills the conditions (1), (2) and (4) to (9). Tables 5 and 6 show values of the conditions of the second embodiment. In the tables, RF1, RF2 and TF correspond to r1, r2 and T1, respectively.

Hereinafter, the conditions (1) to (12) will be described one by one.

$$\left|\frac{Nd2}{\phi g^4}\right| < 1000 \quad (1)$$

where Nd2 is the fourth power gradient index coefficient of the GRIN lens to d-line, and $\phi g$ is the refractive power of the GRIN lens.

The condition (1) is a condition relating to the gradient index of the radial GRIN lens. When the limit of the condition (1) is exceeded, the gradient index of the lens is too great, so that the manufacture of such a lens is difficult and the correction of higher-order aberrations is very difficult.

$$-30 < \frac{Nd1}{\phi p^2} < 20 \quad (2)$$

where Nd1 is the quadratic gradient index coefficient of the GRIN lens to d-line, and $\phi p$ is the refractive power of the lens unit.

The condition (2) is a condition to control Petzval sum in the lens unit of the positive refractive power. When the lower limit of the condition (2) is exceeded, Petzval sum increases toward the negative side, which is undesirable. On the other hand, when the upper limit of the condition (2) is exceeded, Petzval sum increases toward the positive side, so that the correction of Petzval sum in the entire zoom lens system is difficult.

$$-20 < \frac{Nd1}{\phi m^2} < 30 \tag{3}$$

where Nd1 is the quadratic gradient index coefficient of the GRIN lens to d-line, and φm is the refractive power of the lens unit.

The condition (3) is a condition to control Petzval sum in the lens unit of a negative refractive power. When the lower limit of the condition (3) is exceeded, Petzval sum increases toward the positive side, which is undesirable. On the other hand, when the upper limit of the condition (3) is exceeded, Petzval sum increases toward the negative side, the correction of Petzval sum in the entire zoom lens system is difficult.

$$-6.0 < \frac{\phi a(H) - \phi a0}{\phi g} < 6.0 \tag{4}$$

where 0<H<Hmax. Here, H is the height along the lens diameter, Hmax is the effective lens diameter, φa(H) is the refractive power by a local curvature at the height H of the aspherical surface, φa0 is the refractive power by a reference curvature of the aspherical surface, φg is the refractive power of the GRIN lens. φa(H) and φa0 are expressed as follows:

φa(H)=Calo×(N'(H)−N(H))

φa0=C0×(N0'−N0)

where Calo is the local curvature at the height H of the aspherical surface, C0 is the reference curvature of the aspherical surface, N(H) is the refractive index at the height H of an object side medium of the aspherical surface, N'(H) is the refractive index at the height H of the image side medium of the aspherical surface, N0 is the axial refractive index of the object side medium of the aspherical surface, and N0' is the axial refractive index of the image side medium of the aspherical surface.

The condition (4) is a condition to be fulfilled when an aspherical surface is used in the radial GRIN lens. When the upper limit of the condition (4) is exceeded, aberrations generated in the lens unit are further degraded by the aspherical surface, which is undesirable. On the other hand, when the lower limit of the condition (4) is exceeded, the aberrations are over-corrected by the aspherical surface, so that even if a plurality of aspherical surfaces are used, it is difficult to counteract the over-correction by one aspherical surface with another aspherical surface.

When an aspherical surface is used in the radial GRIN lens, it is preferable that both side surfaces are formed to be aspherical since the aberrations over-corrected by one aspherical surface can be corrected by the other aspherical surface.

$$0.5 \leq \left| \frac{\phi R}{\phi W} \right| \leq 2.5 \tag{5}$$

where φR is the refractive power of the rear lens unit, and φW is the refractive power at the shortest focal length condition of the zoom lens system.

The condition (5) is a condition relating to the refractive power of the rear lens unit. When the upper limit of the condition (5) is exceeded, the refractive power of the rear lens unit is too strong, so that it is difficult to correct aberrations, particularly, spherical aberration and distortion at the shortest focal length condition. On the other hand, when the lower limit of the condition (5) is exceeded, the refractive power of the rear lens unit is too weak, so that the size of the optical system increases and the amount of movement of each lens unit for zooming increases, which is undesirable.

$$-3.0 < \frac{\phi a(H) - \phi a0}{\phi R} < 8.0 \tag{6}$$

where 0<H<Hmax. Here, φR is the refractive power of the rear lens unit. The other letters are the same as those of condition (4).

The condition (6) is a condition to be fulfilled by the rear lens unit when an aspherical lens is used in the rear lens unit of the two-unit zoom lens system. When the upper limit of the condition (6) is exceeded, it is difficult to correct distortion at the shortest focal length condition and spherical aberration at the longest focal length condition with the aspherical surface, which is undesirable. On the other hand, when the lower limit of the condition (6) is exceeded, the aberrations are over-corrected by the aspherical surface, so that even if a plurality of aspherical surfaces are used, it is difficult to counteract the over-correction by one aspherical surface with another aspherical surface, which is undesirable.

$$\frac{d}{dH}\{vd(H)\} < 0 \tag{B}$$

where 0<H<0.5Hmax, and $$-0.5 < \frac{vd(H) - vd(0)}{vd(0)} \leq 0.0 \tag{7}$$

where 0<H<Hmax. Here, vv(0) is the dispersion value at an optical axis d/dh{vd(H)} is the differential coefficient of vd(H), vd(H) is the dispersion value at the height H of the radial GRIN lens. vd(H) is expressed as follows:

$$vd(H) = \frac{Nd(H) - 1}{NF(H) - NC(H)} \tag{C}$$

where Nd(H) is the N(H) obtained by applying a coefficient of d-line to N0, N1, N2, . . . of the previously-shown expression (A), NF(H) is the N(H) obtained by applying a coefficient of F-line to N0, N1, N2, . . . of the previously-shown expression (A), and NC(H) is the N(H) obtained by applying a coefficient of C-line to the N0, N1, N2, . . . of the expression (A).

The conditions (7) show the dispersion distribution to be fulfilled by a radial GRIN lens at least one surface of which is aspherical (hereinafter, this GRIN lens will be referred to as aspherical radial GRIN lens) when the front lens unit of the two-unit zoom lens system consists of one such aspherical radial GRIN lens. When the limits of the conditions (7) are exceeded, chromatic aberration generated in the front lens unit increases, so that the correction of axial chromatic aberration in the entire zoom lens system is very difficult.

$$-5.0 < \frac{RF2 + RF1}{RF2 - RF1} < 0.0 \qquad (8)$$

where RF2 is the radius of curvature of the object side surface of the front lens unit, and RF1 is the radius of curvature of the image side surface of the front lens unit.

The condition (8) is a condition relating to the aberration correction of an aspherical radial GRIN lens included in the front lens unit of the two-unit zoom lens system when the front lens unit consists of the aspherical radial GRIN lens. When the upper limit of the condition (8) is exceeded, spherical aberration inclines toward the over side, which is undesirable. On the other hand, when the lower limit of the condition (8) is exceeded, spherical aberration inclines toward the under side and the radius of curvature of the object side surface of the front lens unit decreases, which is undesirable since such a lens is difficult to manufacture.

$$0.1 < \frac{TF}{fF} < 1.0 \qquad (9)$$

where fF is the focal length of the front lens unit, and TF is the axial thickness of the lens included in the front lens unit.

The condition (9) is a condition relating to the axial thickness of an aspherical radial GRIN lens included in the front lens unit of the two-unit zoom lens system when the front lens unit consists of the aspherical radial GRIN lens. When the upper limit of the condition (9) is exceeded, since the axial thickness of the lens is too great, the thickness of the lens unit increases, so that the reduction in size of the entire zoom lens system cannot be achieved. On the other hand, when the lower limit of the condition (9) is exceeded, it is necessary to increase the gradient index in order to control Petzval sum of the entire zoom lens system, so that high-order aberrations are generated. In addition, when the lower limit is exceeded, the radius of curvature of the rear surface of the lens decreases and the manufacture of such a lens is difficult.

When the front lens unit of the two-unit zoom lens system consists of one aspherical radial GRIN lens, it is preferable that the lens constituting the front lens unit has a positive lens configuration where the radius of curvature of the image side surface is small, for example, a positive meniscus configuration convex to the image side and a bi-convex lens configuration. This is because the smaller the radius of curvature of the image side surface is in one lens having a positive refractive power, the more easily a zoom lens system fulfilling the condition (8) is formed.

$$0.0 \leq \frac{vd(H) - vd(0)}{vd(0)} < 1.0 \qquad (10)$$

where the parameters are the same as those of the condition (7).

The conditions (10) show a dispersion distribution to be fulfilled by an aspherical radial GRIN lens when the rear lens unit of the two-unit zoom lens system consists of the aspherical radial GRIN lens. When the limits of the conditions (10) are exceeded, chromatic aberration generated in the rear lens unit increases, so that the correction of lateral chromatic aberration in the entire zoom lens system and the correction of axial chromatic aberration at the longest focal length condition are very difficult. Further, when the rear lens unit of a two-unit zoom lens system consists of one aspherical radial GRIN lens, the following expression is preferably fulfilled in order to obtain more effect of the above-described aberration correction:

$$\frac{d}{dH}\{vd(H)\} > 0 \qquad (11)$$

$$0.0 < \frac{RR2 + RR1}{RR2 - RR1} < 5.0$$

where RR2 is the radius of curvature of the object side surface of the rear lens unit, and RR1 is the radius of curvature of the image side surface of the rear lens unit.

The condition (11) is a condition relating to the aberration correction of an aspherical radial GRIN lens included in the rear lens unit of the two-unit zoom lens system when the rear lens unit consists of the aspherical radial GRIN lens. When the upper limit of the condition (11) is exceeded, spherical aberration at the longest focal length condition inclines toward the over side, which is undesirable. On the other hand, when the lower limit of the condition (11) is exceeded, spherical aberration inclines toward the under side, which is undesirable. In addition, when these limits are exceeded, coma also degrades.

$$0.02 < \frac{TR}{|fR|} < 0.7 \qquad (12)$$

where fR is the focal length of the rear lens unit, and TR is the axial thickness of the lens constituting the rear lens unit.

The condition (12) is a condition relating to the axial thickness of an aspherical radial GRIN lens included in the rear lens unit of the two-unit zoom lens system when the rear lens unit consists of the aspherical GRIN lens. When the upper limit of the condition (12) is exceeded, since the axial thickness of the lens is too great, the thickness of the lens unit increases, so that the reduction in size of the entire zoom lens system cannot be achieved. In addition, field curvature in the vicinity of the most-off-axial portion is difficult to correct. On the other hand, when the lower limit of the condition (12) is exceeded, it is necessary to increase the gradient index in order to control Petzval sum of the entire zoom lens system, so that higher-order aberrations are generated. In addition, when the lower limit is exceeded, the radius of curvature of the rear surface of the lens decreases and the manufacture of such a lens is difficult.

When the rear lens unit of the two-unit zoom lens system consists of one aspherical radial GRIN lens as described above, it is preferable that the lens constituting the rear lens unit has a negative lens configuration where the radius of curvature of the image side surface is small, for example, a negative meniscus configuration convex to the image side. This is because the smaller the radius of curvature of the image side surface is in one lens having a negative refractive power, the more easily a zoom lens system fulfilling the condition (12) is formed. In the case of the two-unit zoom lens system, the distance between the principal points of the front and rear lens units is small at the shortest focal length condition. In this case, if the rear lens unit is provided with a negative meniscus configuration concave to the object side, it is advantageous to the case where members such as a shutter and an aperture stop are provided between the front and rear lens units, since the axial distance between the front and rear lens units increases.

Figure 3A:
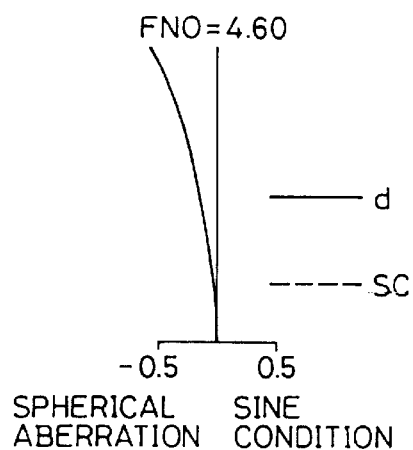
FIGS. 3A to 3I show aberrations of the first embodiment.
Figure 3B:
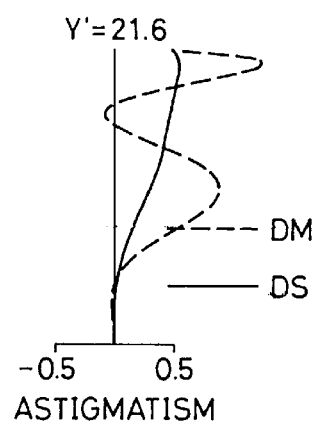
Figure 3C:
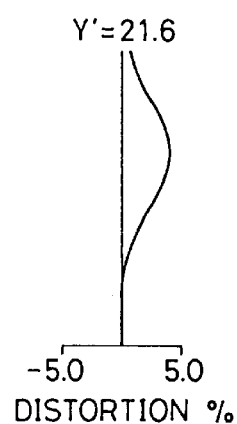
Figure 3D:
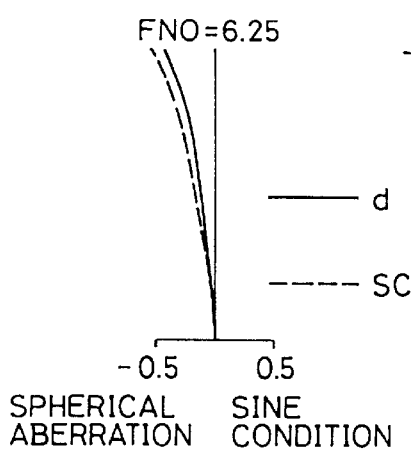
Figure 3E:
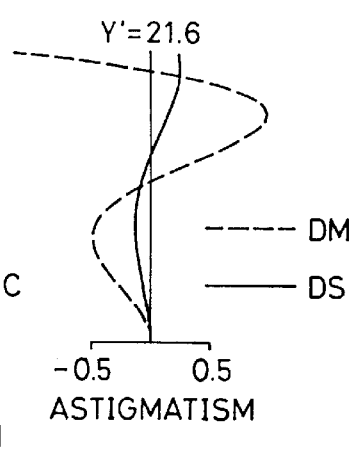
Figure 3F:
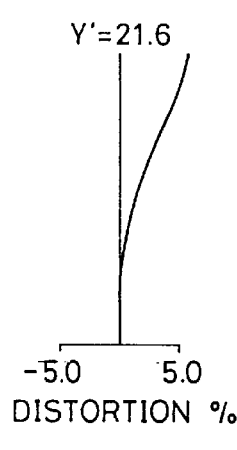
Figure 3G:
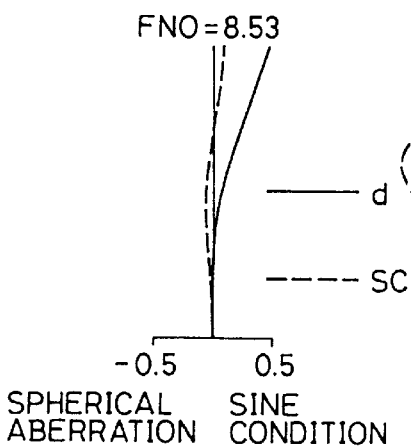
Figure 3H:
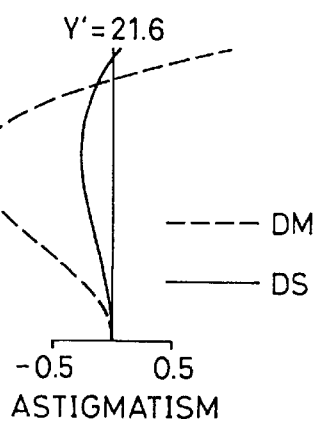
Figure 3I:
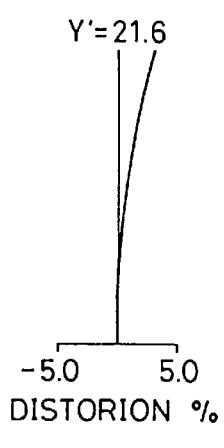
Figure 4A:
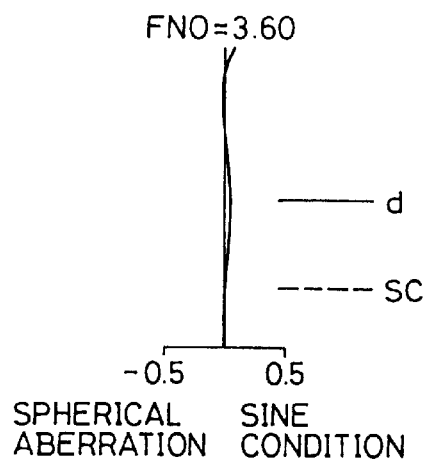
FIGS. 4A to 4I show aberrations of the second embodiment.
Figure 4B:
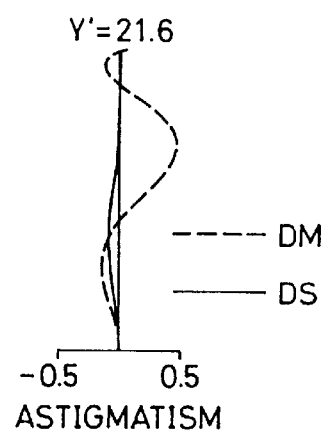
Figure 4C:
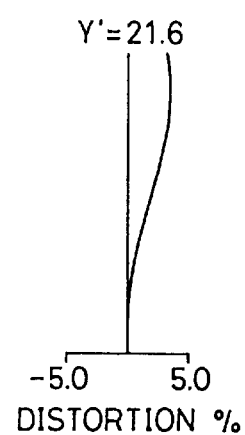
Figure 4D:
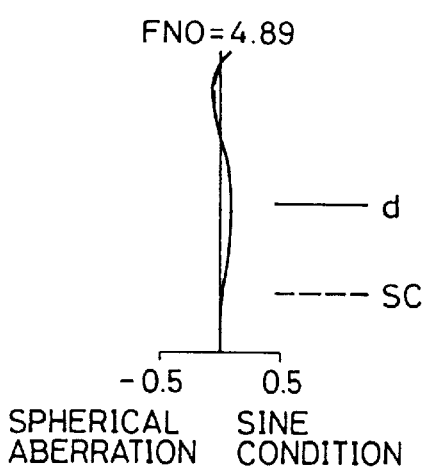
Figure 4E:
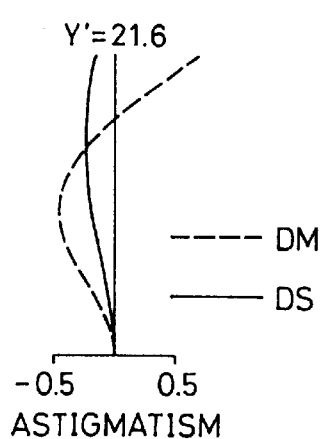
Figure 4F:
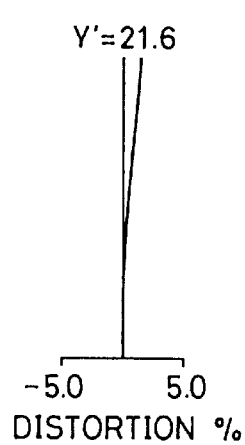
Figure 4G:
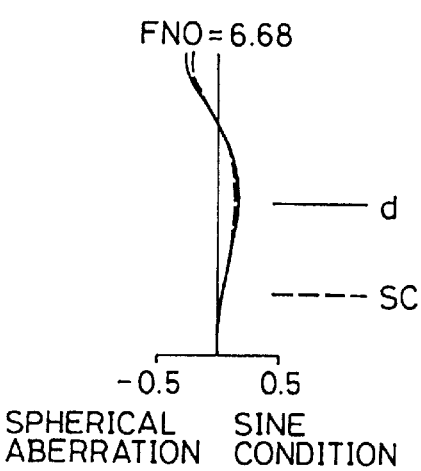
Figure 4H:
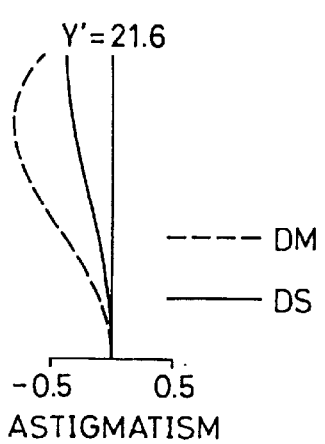
Figure 4I:
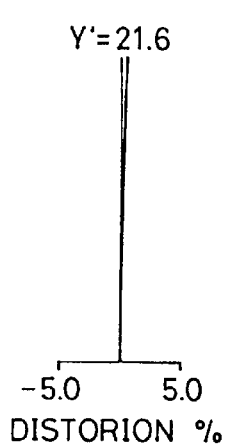
Figure 5:
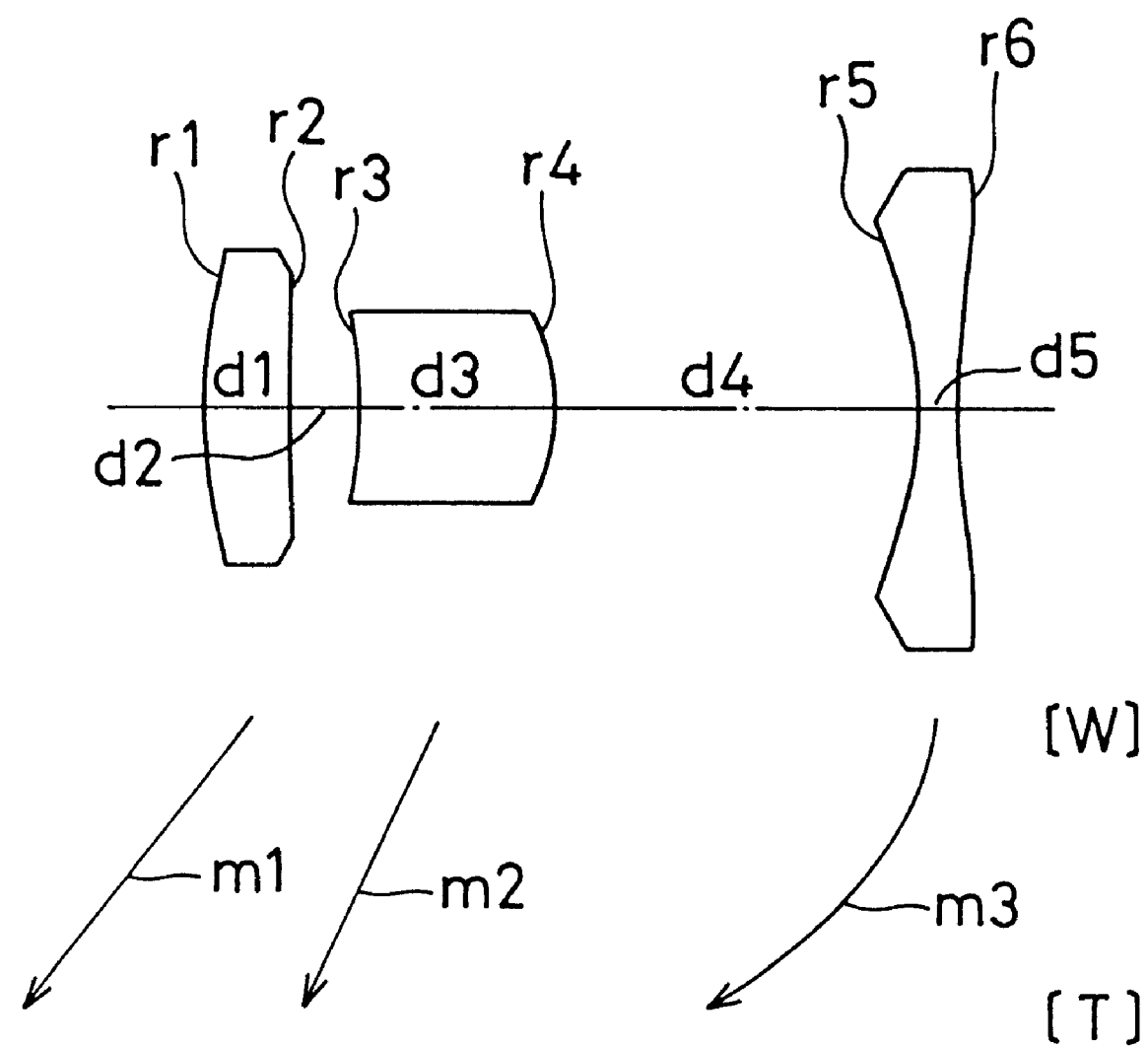
FIG. 5 shows the lens arrangement of a third embodiment of the present invention.
Figure 6A:
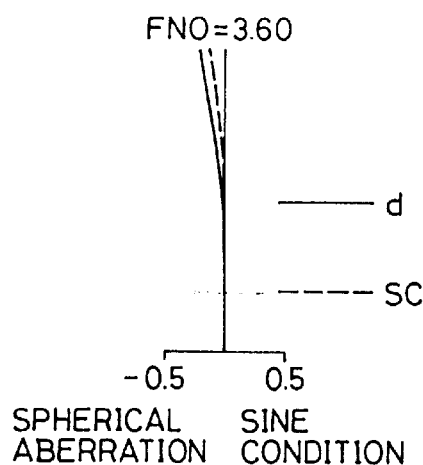
FIGS. 6A to 6I show aberrations of the third embodiment of the present invention.
Figure 6B:
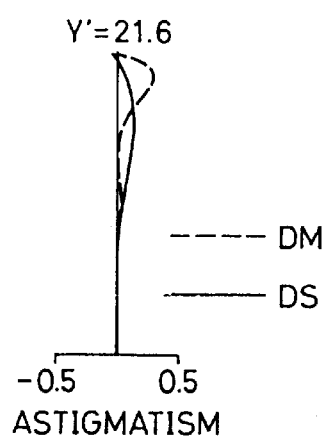
Figure 6C:
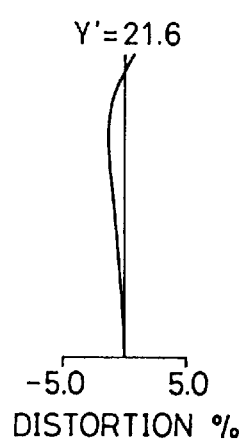
Figure 6D:
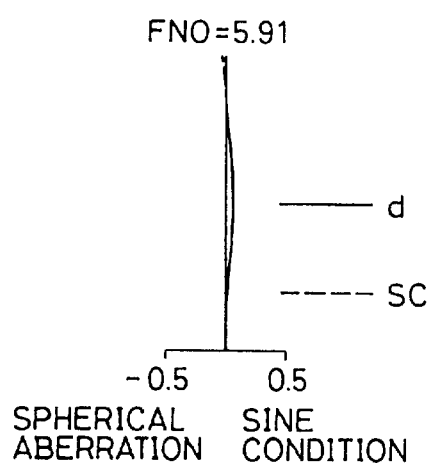
Figure 6E:
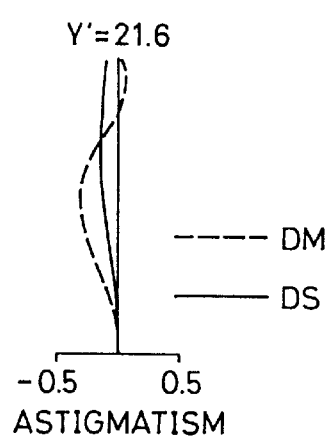
Figure 6F:
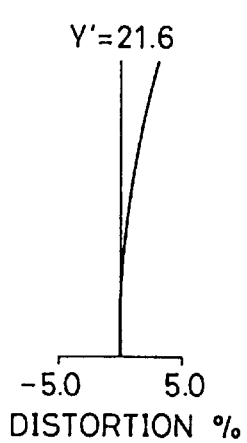
Figure 6G:
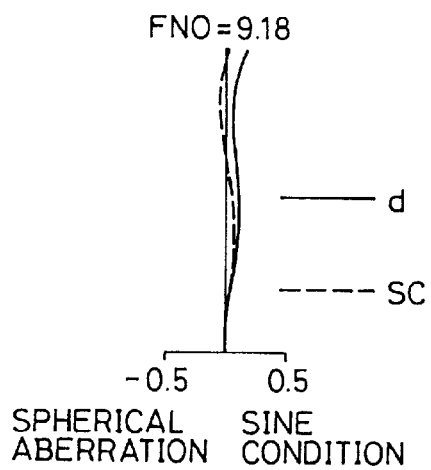
Figure 6H:
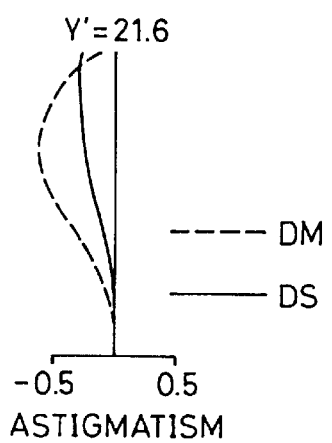
Figure 6I:
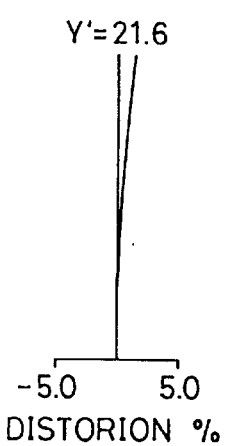
Figure 7:
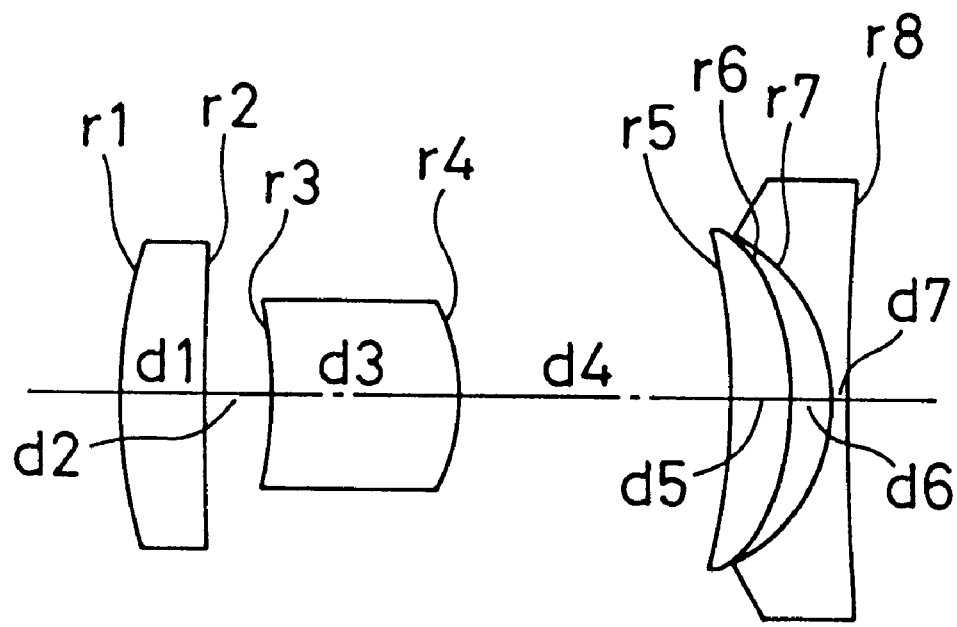
FIG. 7 shows the lens arrangement of a fourth embodiment of the present invention.
Figure 7:
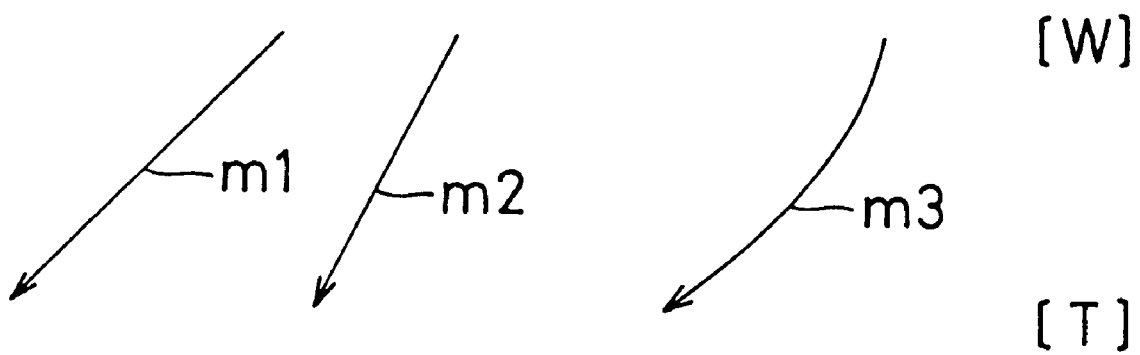
Figure 8A:
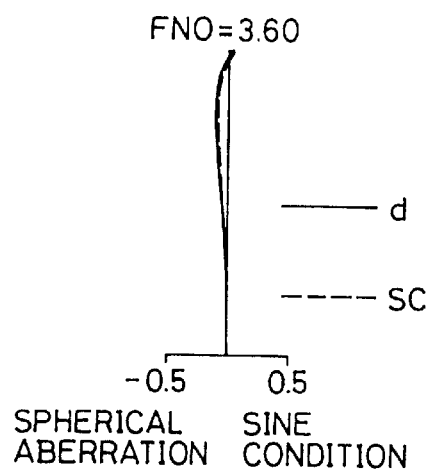
FIGS. 8A to 8I show aberrations of the fourth embodiment of the present invention.
Figure 8B:
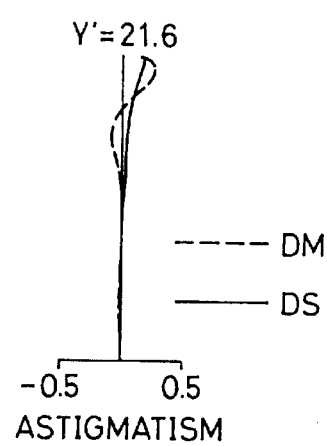
Figure 8C:
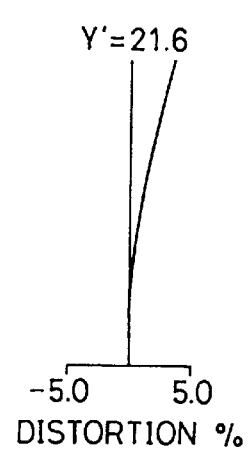
Figure 8D:
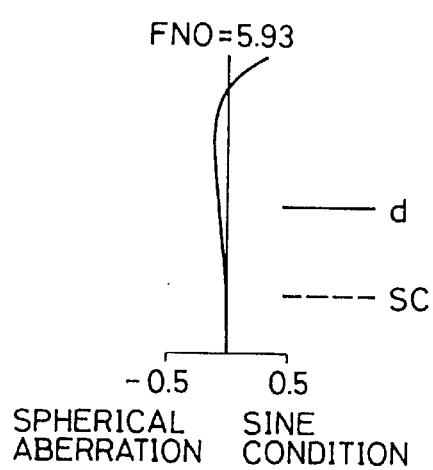
Figure 8E:
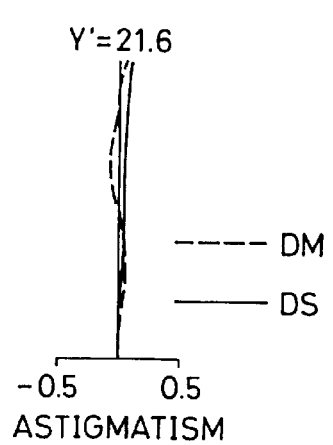
Figure 8F:
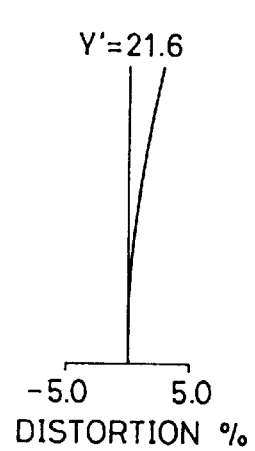
Figure 8G:
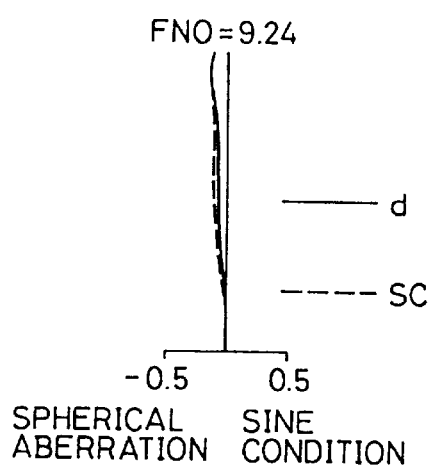
Figure 8H:
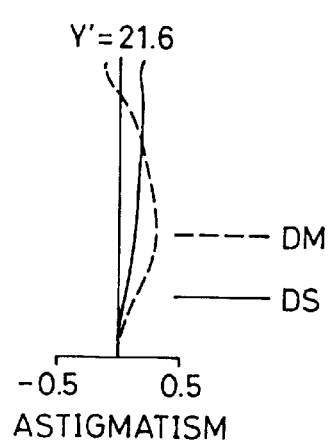
Figure 8I:
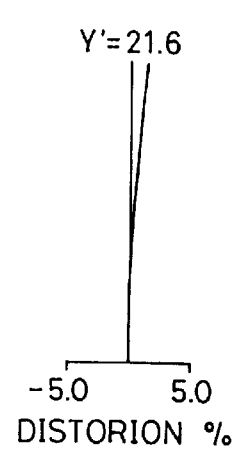
Figure 9:
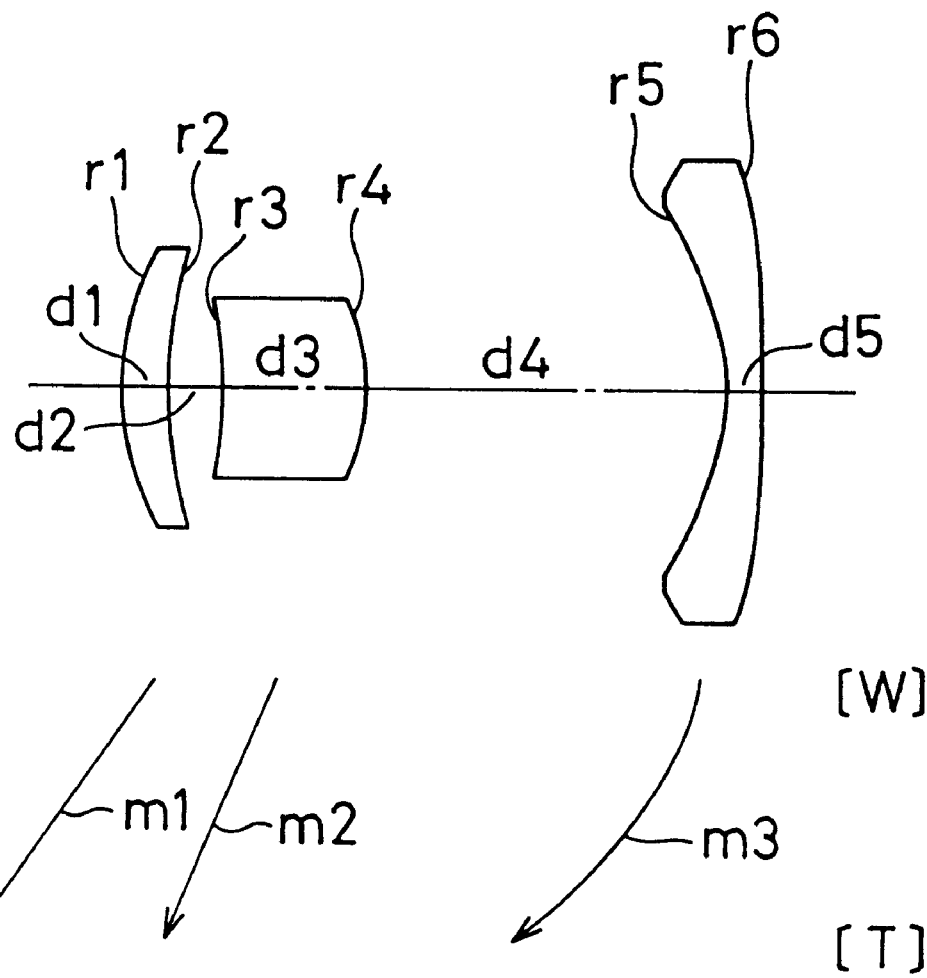
FIG. 9 shows the lens arrangement of a fifth embodiment of the present invention.
Figure 10A:
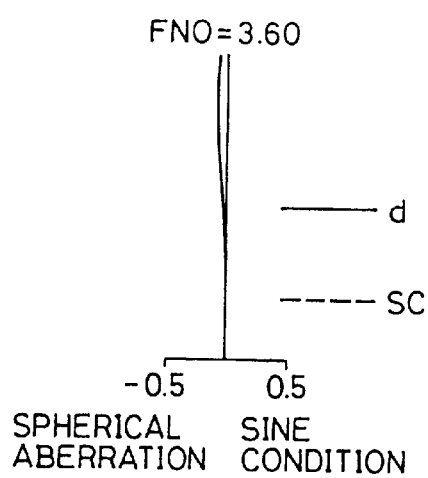
FIGS. 10A to 10I show aberrations of the fifth embodiment of the present invention.
Figure 10B:
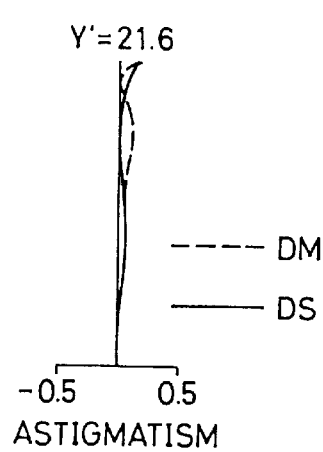
Figure 10C:
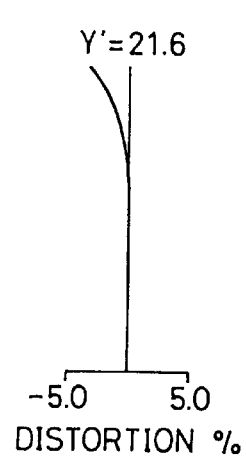
Figure 10D:
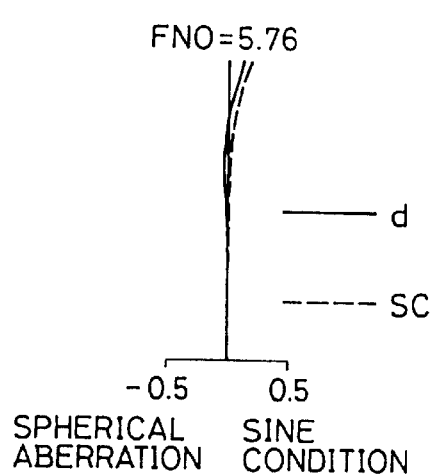
Figure 10E:
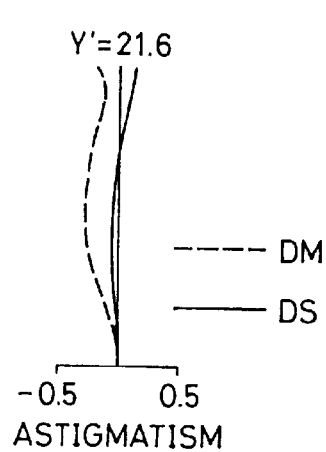
Figure 10F:
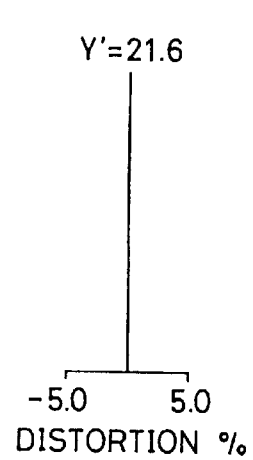
Figure 10G:
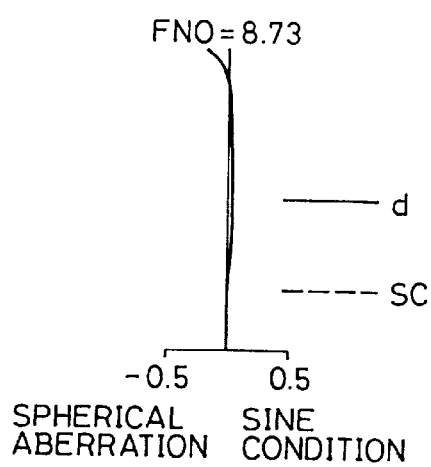
Figure 10H:
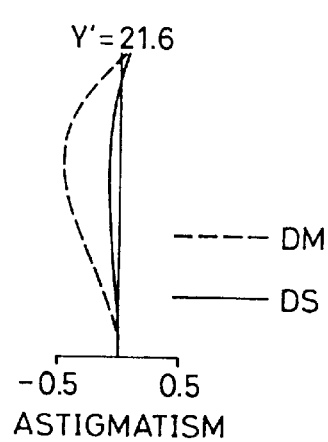
Figure 10I:
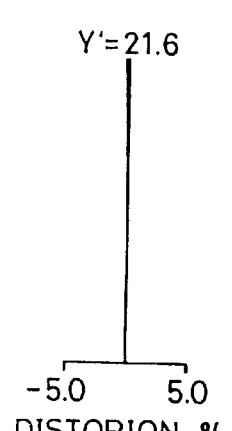
Figure 11:
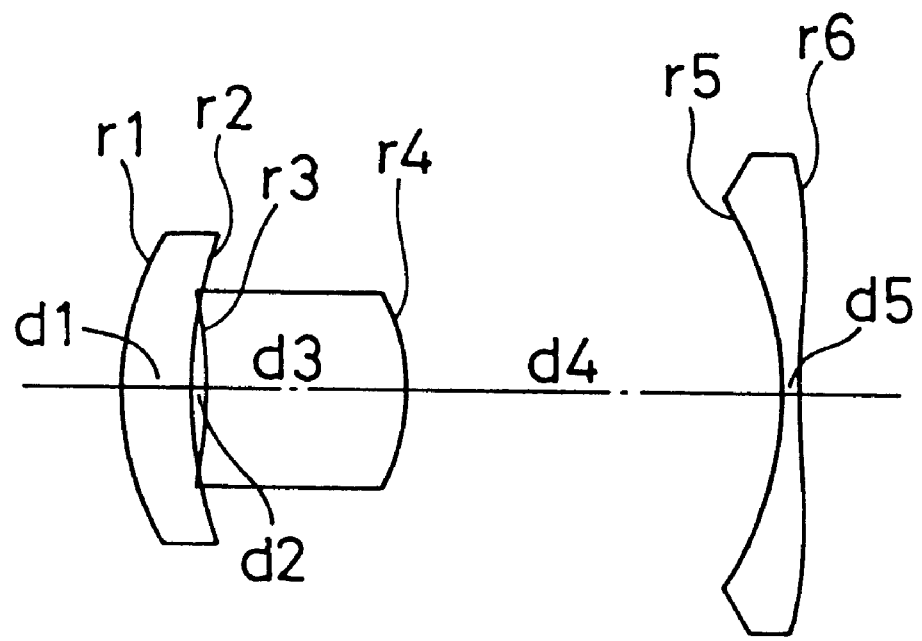
FIG. 11 shows the lens arrangement of a sixth embodiment of the present invention.
Figure 11:
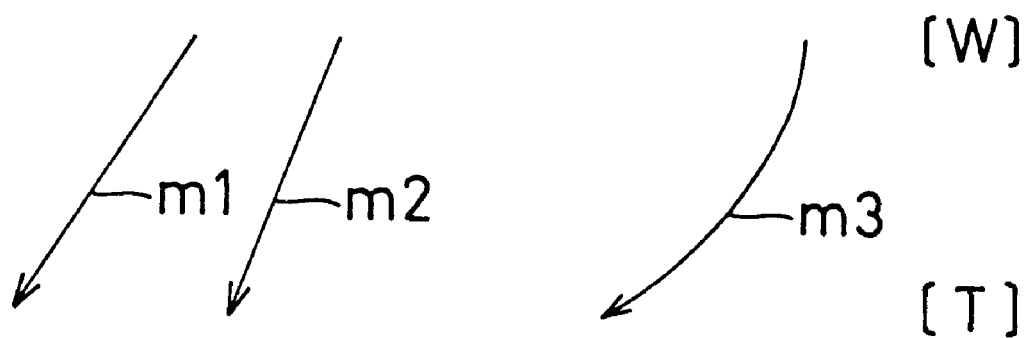
Figure 12A:
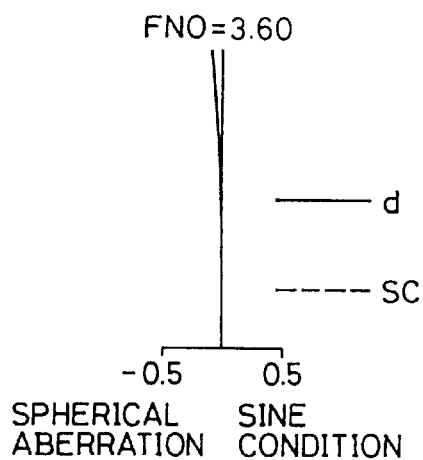
FIGS. 12A to 12I show aberrations of the sixth embodiment of the present invention.
Figure 12B:
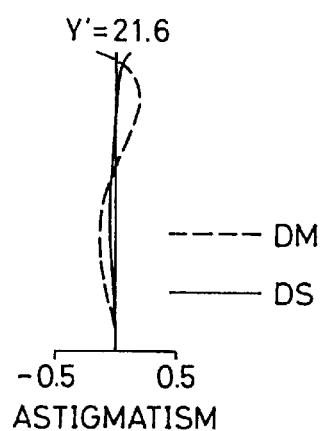
Figure 12C:
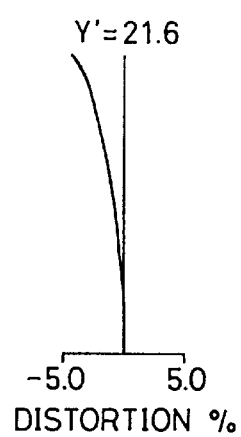
Figure 12D:
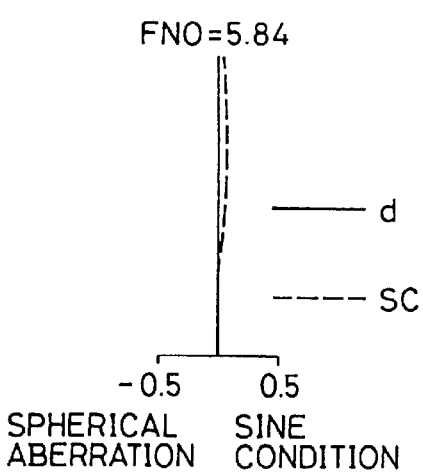
Figure 12E:
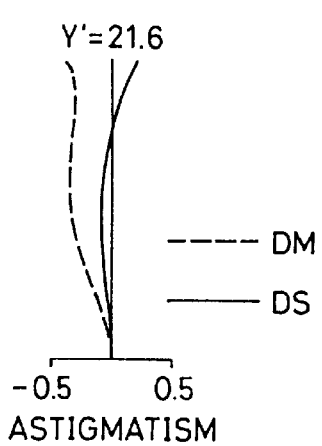
Figure 12F:
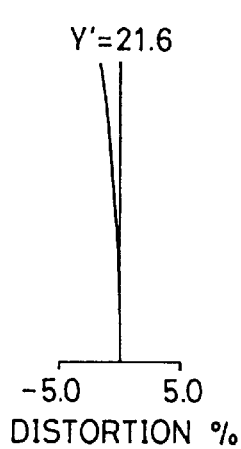
Figure 12G:
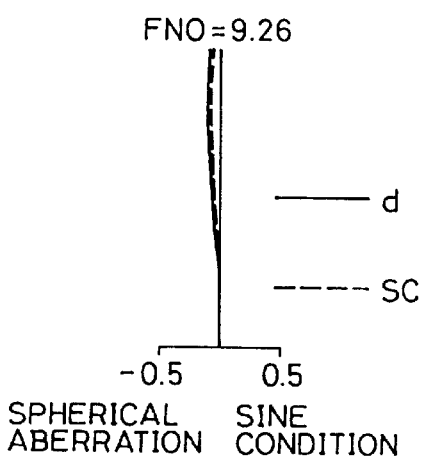
Figure 12H:
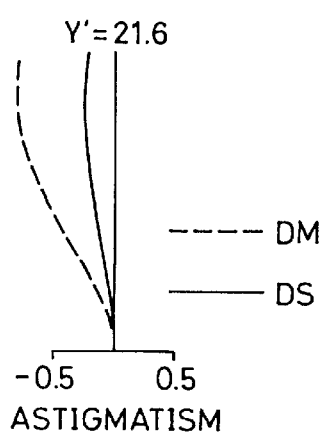
Figure 12I:
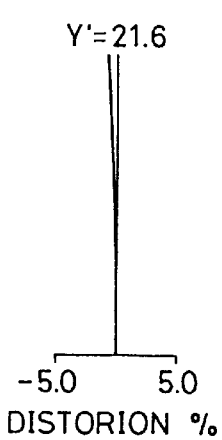
Figure 13:
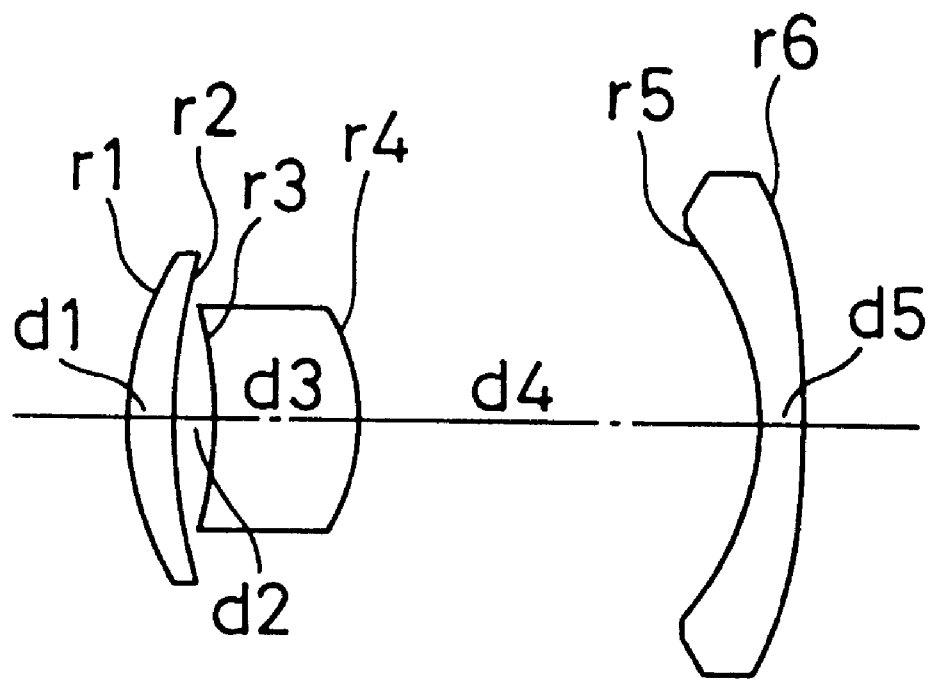
FIG. 13 shows the lens arrangement of a seventh embodiment of the present invention.
Figure 13:
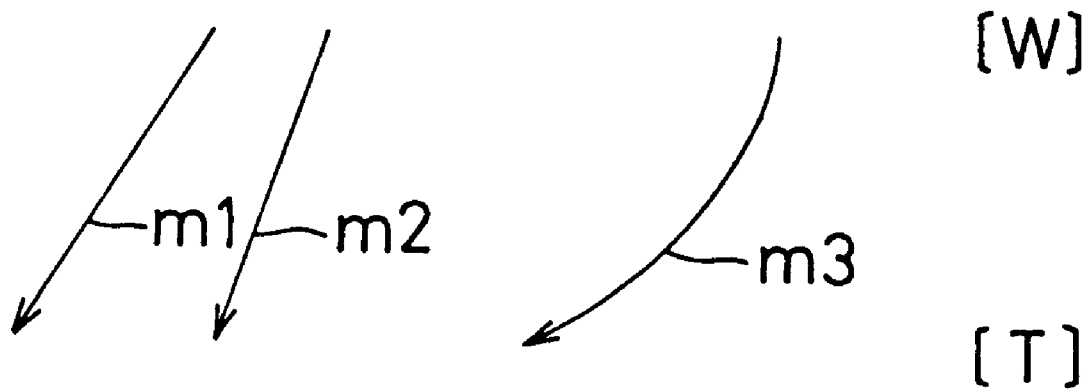
Figure 14A:
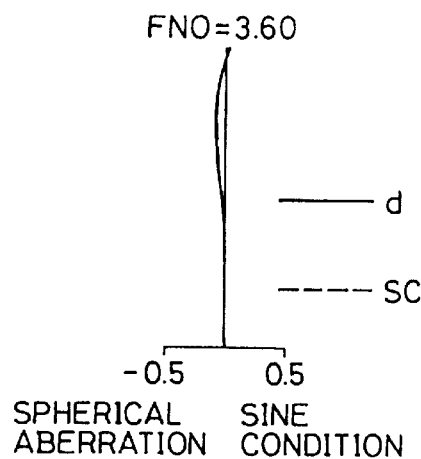
FIGS. 14A to 14I show aberrations of the seventh embodiment of the present invention.
Figure 14B:
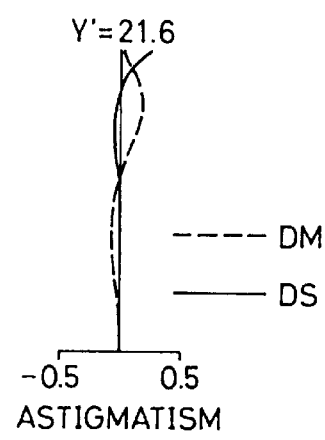
Figure 14C:
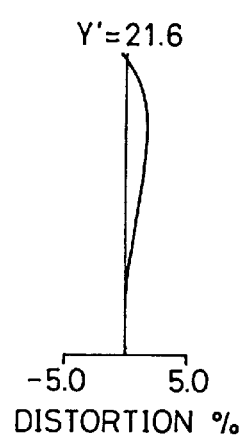
Figure 14D:
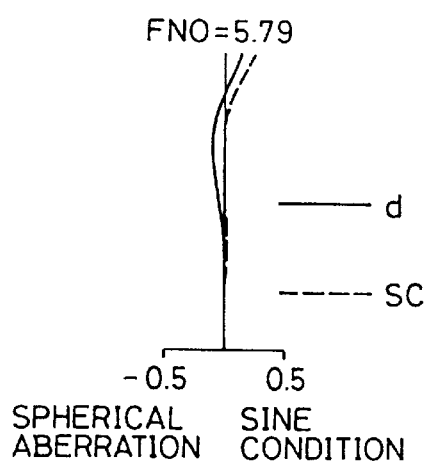
Figure 14E:
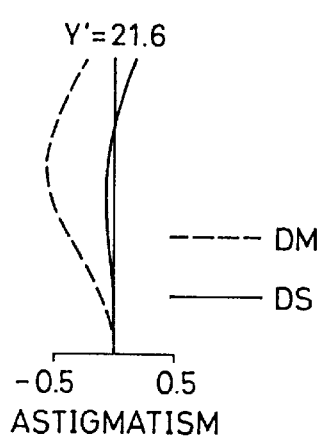
Figure 14F:
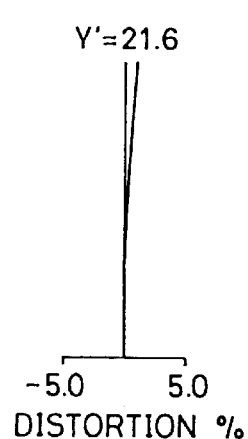
Figure 14G:
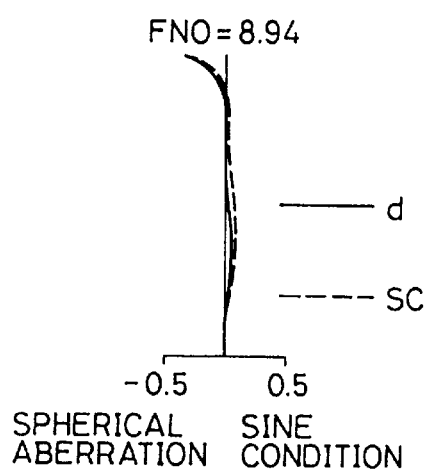
Figure 14H:
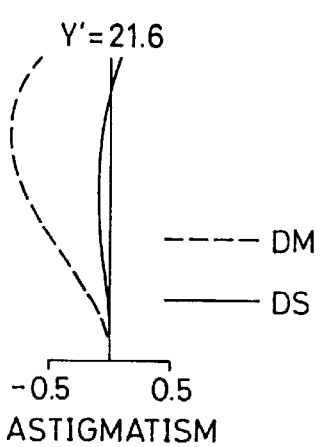
Figure 14I:
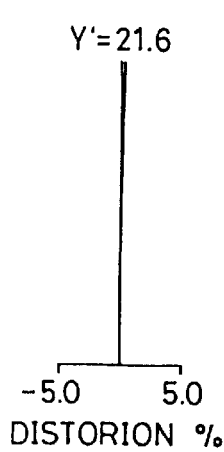
Figure 15:
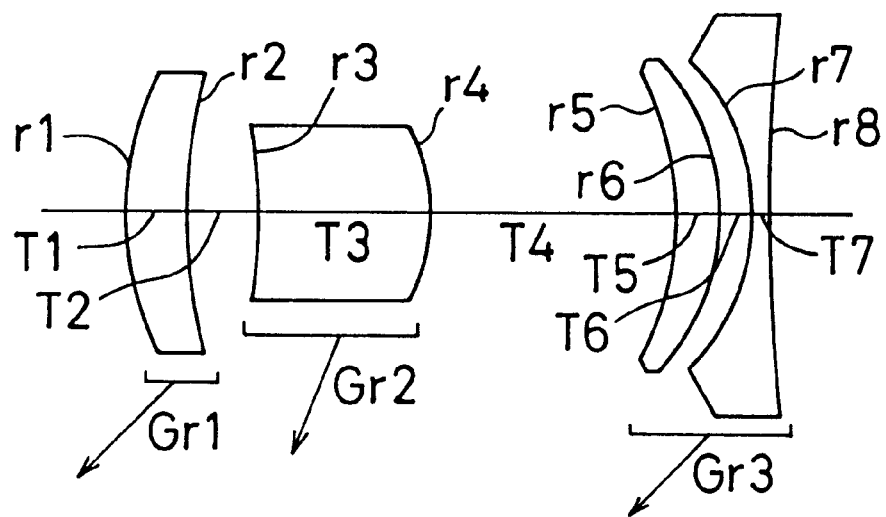
FIG. 15 is the lens arrangement of an eighth embodiment of the present invention at the shortest focal length condition.
Figure 16:
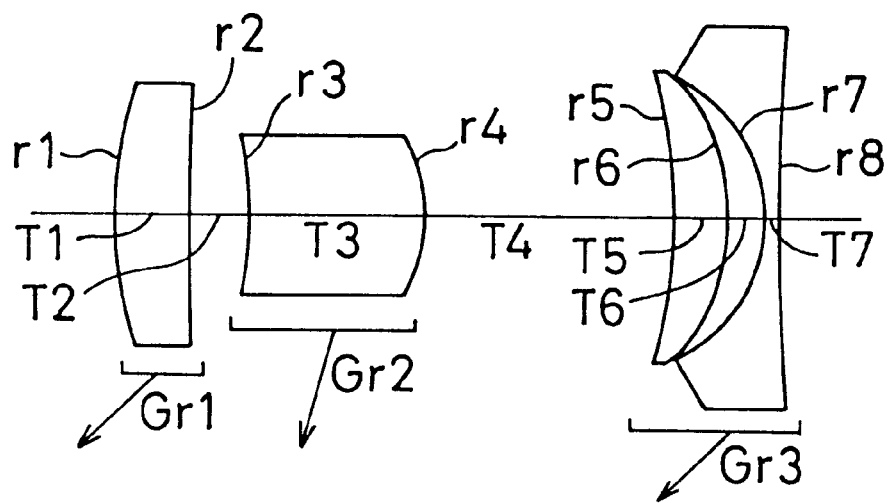
FIG. 16 is the lens arrangement of a ninth embodiment of the present invention at the shortest focal length condition.
Figure 17:
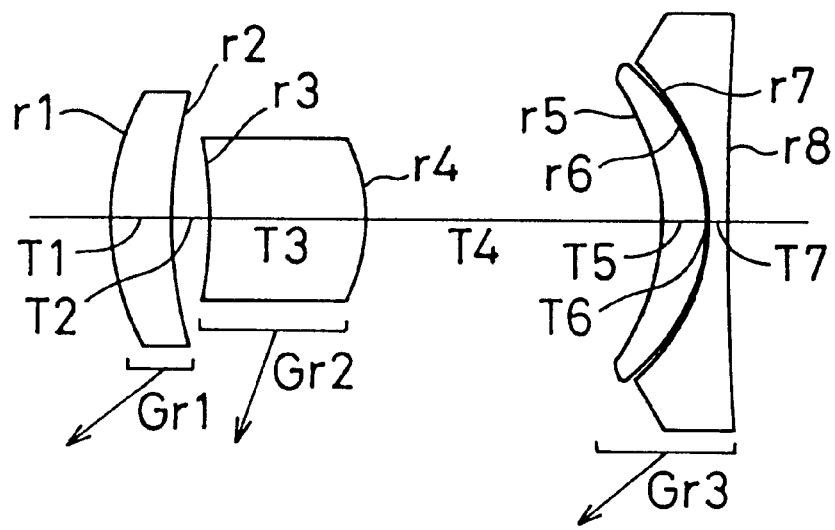
FIG. 17 is the lens arrangement of a tenth embodiment of the present invention at the shortest focal length condition.
Figure 18:
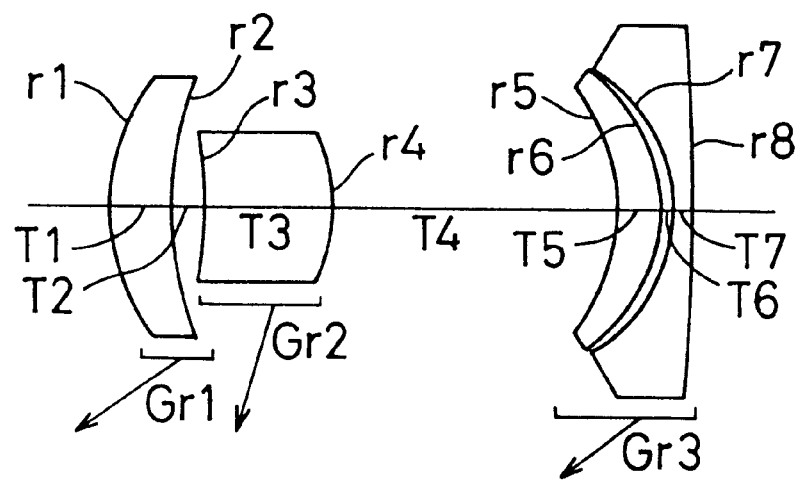
FIG. 18 is the lens arrangement of an eleventh embodiment of the present invention at the shortest focal length condition.
Figure 19A:
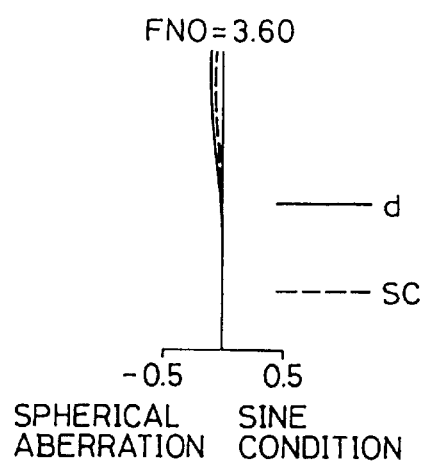
FIGS. 19A to 19I show aberrations of the eighth embodiment.
Figure 19B:
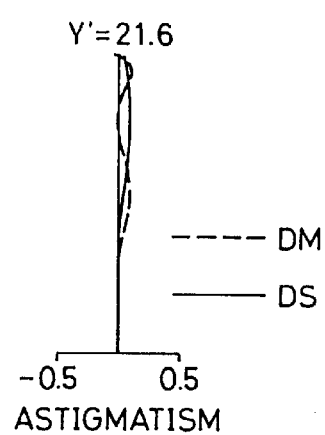
Figure 19C:
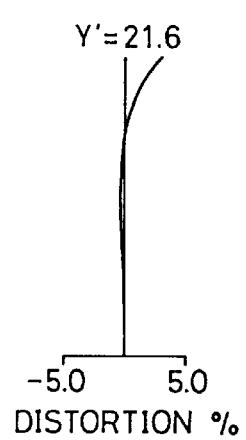
Figure 19D:
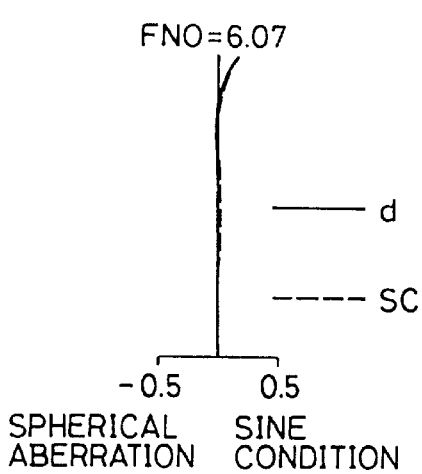
Figure 19E:
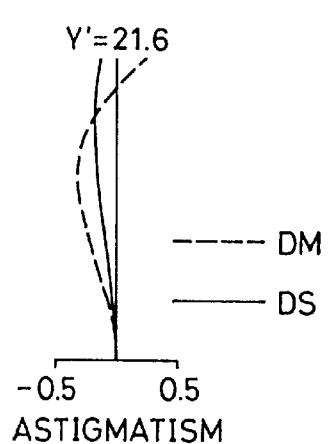
Figure 19F:
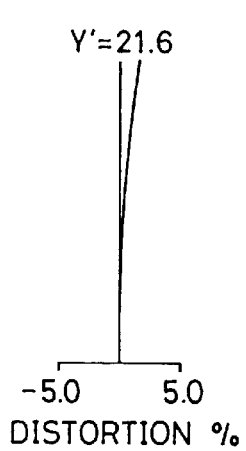
Figure 19G:
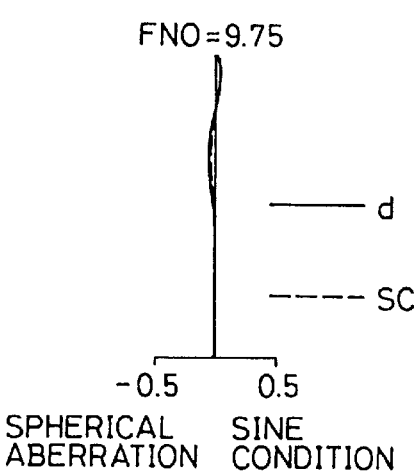
Figure 19H:
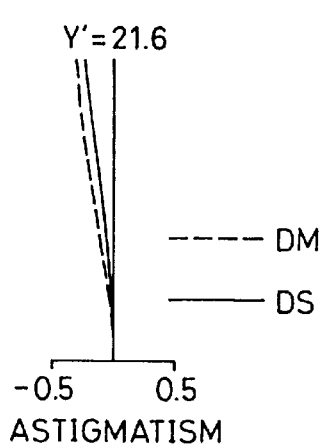
Figure 19I:
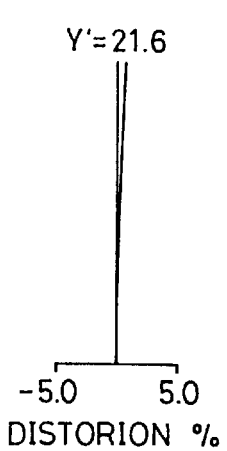
Figure 21A:
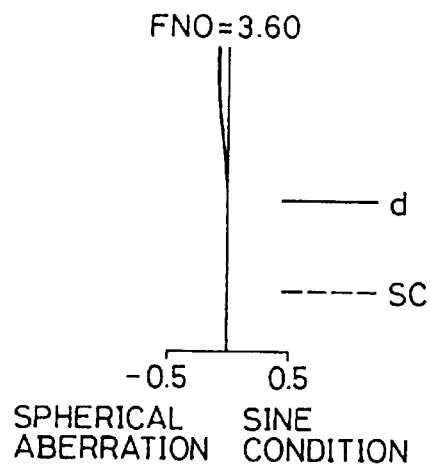
FIGS. 21A to 21I show aberrations of the tenth embodiment.
Figure 21B:
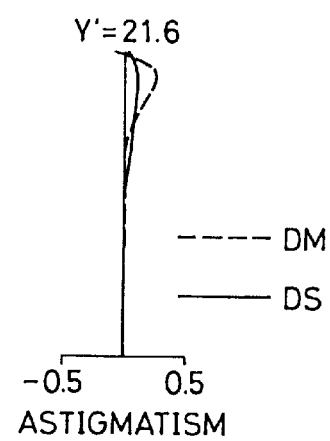
Figure 21C:
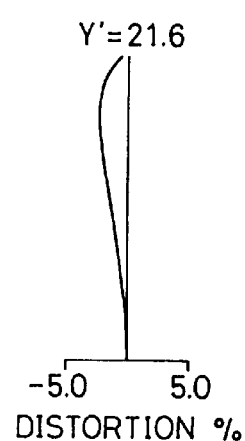
Figure 21D:
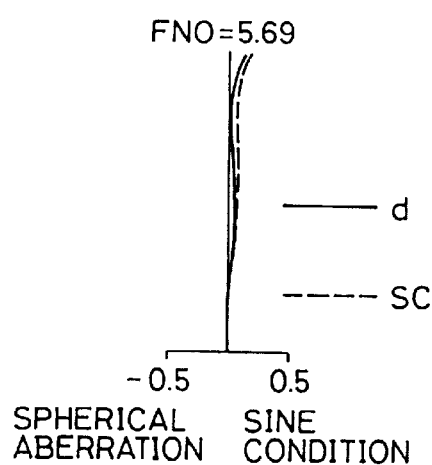
Figure 21E:
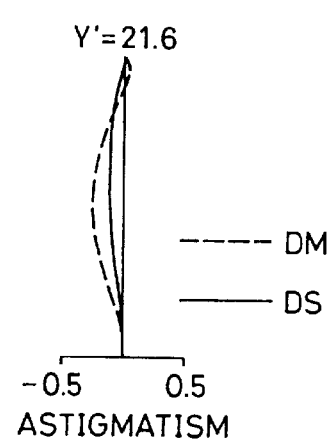
Figure 21F:
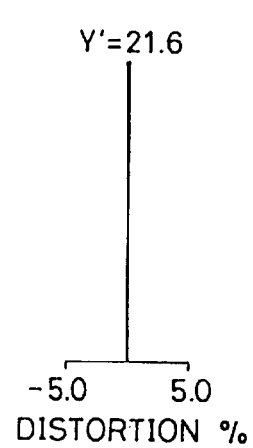
Figure 21G:
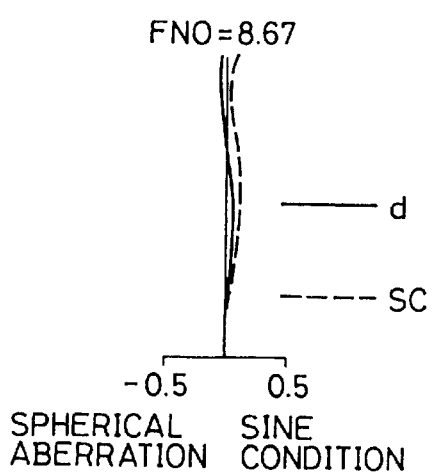
Figure 21H:
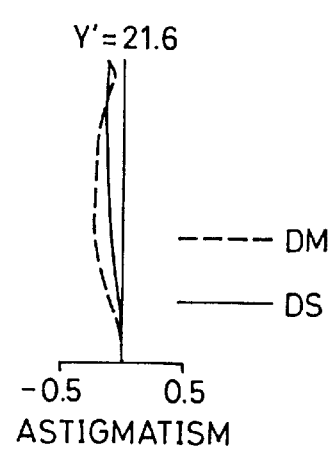
Figure 21I:
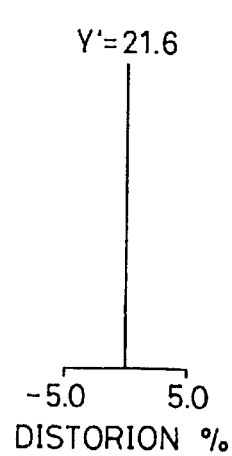
Figure 22A:
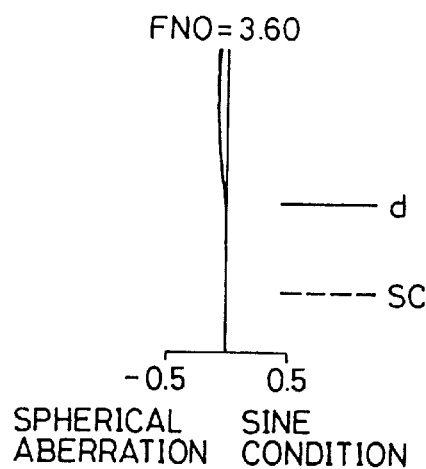
FIGS. 22A to 22I show aberrations of the eleventh embodiment.
Figure 22B:
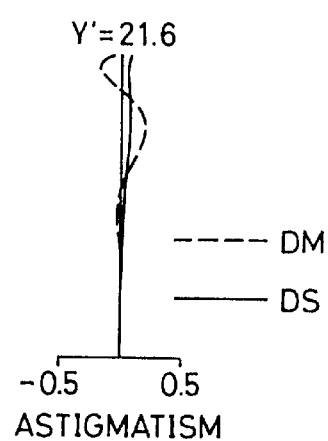
Figure 22C:
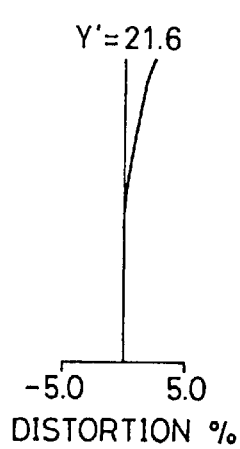
Figure 22D:
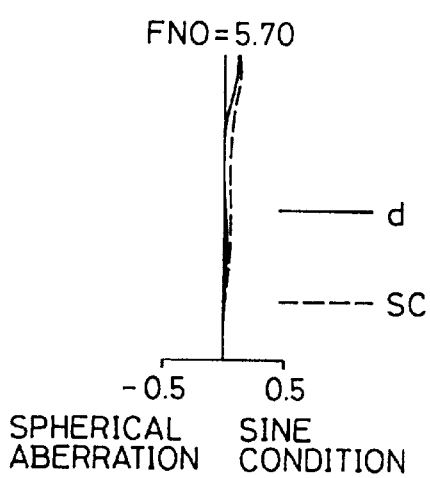
Figure 22E:
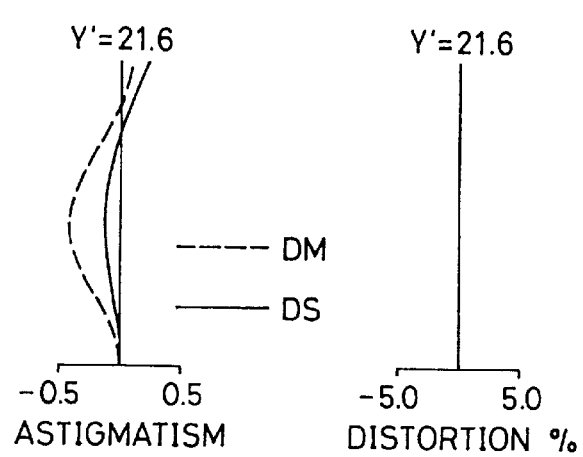
Figure 22F:
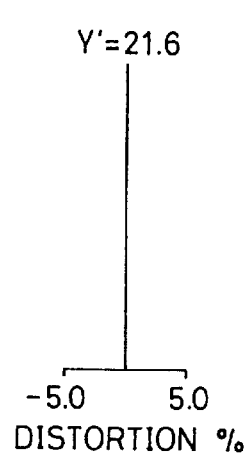
Figure 22G:
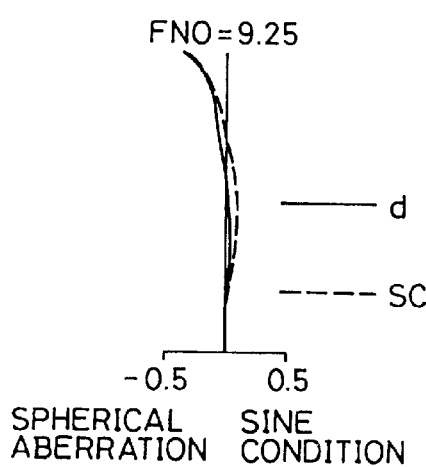
Figure 22H:
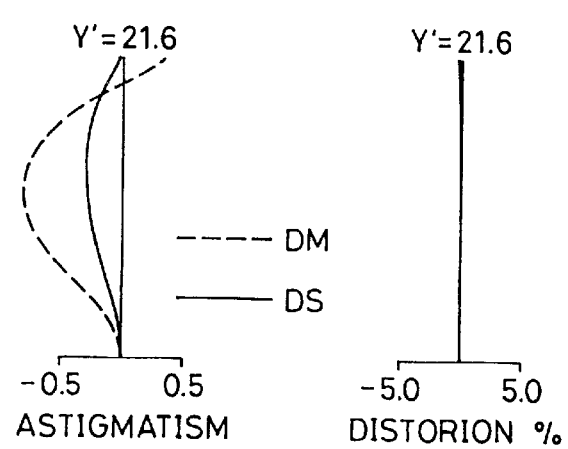
Figure 22I:
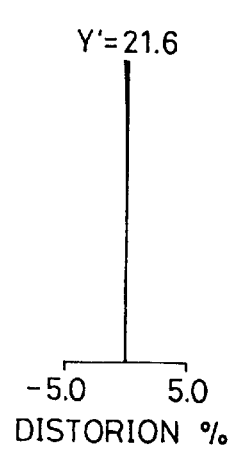

FIGS. 3A to 3I and 4A to 4I show aberrations of the first and second embodiments. FIGS. 3A to 3C and 4A to 4C show aberrations at the shortest focal length condition. FIGS. 3D to 3F and 4D to 4F show aberrations at the middle focal length condition. FIGS. 3G to 3I show aberrations at the longest focal length condition. The minimum F numbers at the shortest, middle and longest focal length conditions are respectively 4.60, 6.25 and 8.53 in the first embodiment and 3.60, 4.89 and 6.68 in the second embodiment. In FIGS. 3A, 3D, 3G, 4A, 4D and 4G, the solid line (d) represents spherical aberration to d-line and the dotted line (SC) represents sine condition. In FIGS. 3B, 3E, 3H, 4B, 4E and 4H, the dotted line (DM) and the solid line (DS) represent astigmatisms on the meridional and sagittal image planes, respectively.

Numerical data of third to seventh embodiments of the present invention are shown in Tables 7 to 11. With respect to third to seventh embodiments, the gradient index coefficients of the GRIN lenses (GRIN1 to GRIN3) are shown in Tables 12 to 14, 18 to 19, 23 to 25, 29 to 31 and 35 to 37.

FIGS. 5, 7, 9, 11 and 13 show the lens arrangements of the third to seventh embodiments at the shortest focal length condition (W). In these figures, the loci m1, m2 and m3 schematically show the movements of a first lens unit Gr1, a second lens unit Gr2 and a third lens unit Gr3 from the shortest focal length condition (W) to the longest focal length condition (T).

The third to seventh embodiments are three-unit zoom lens systems each comprising from the object side the first lens unit Gr1 of a positive refractive power, the second lens unit Gr2 of a positive refractive power and the third lens unit Gr3 of a negative refractive power. The first lens unit Gr1 has a positive lens configuration strongly convex to the object side. The second lens unit Gr2 has a positive lens configuration strongly convex to the image side. The third lens unit Gr3 has a negative lens configuration strongly concave to the object side.

In the third and sixth embodiments, the first lens unit Gr1 consists of a positive meniscus lens element convex to the object side, the second lens unit Gr2 consists of a positive meniscus lens element convex to the image side, and the third lens unit consists of a bi-convex negative lens element. In the fourth embodiment, the first lens unit Gr1 consists of a positive meniscus lens element convex to the object side, the second lens unit Gr2 consists of a positive meniscus lens element convex to the image side, and the third lens unit Gr3 consists of a positive meniscus lens element convex to the image side and a bi-concave negative lens element. In the fifth and seventh embodiments, the first lens unit Gr1 consists of a positive meniscus lens element convex to the object side, the second lens unit Gr2 consists of a positive meniscus lens element convex to the image side, and the third lens unit Gr3 consists of a negative meniscus lens element concave to the object side.

The third to seventh embodiments fulfill the following condition (13):

$$0.15 < \frac{\phi_1}{\phi_2} < 1.0 \tag{13}$$

$\phi_1$ is the refractive power of the first lens unit, and $\phi_2$ is the refractive power of the second lens unit.

According to the third to seventh embodiments, the aberration correcting function is provided to each lens unit with good balance by the three-unit zoom lens system of positive, positive, negative configuration fulfilling the condition (13), the magnification of the zoom lens system can be increased.

When the upper limit of the condition (13) is exceeded, the lateral magnification of the second lens unit increases, so that the load of aberration correction on the second lens unit is very great. As a result, it is difficult to correct aberrations, particularly chromatic aberration, generated in the second lens unit. This is undesirable in view of the achievement of a higher magnification (e.g. in the case of a three-unit zoom lens system shown in U.S. Pat. No. 5,087,988, there is no way other than to decrease the zoom ratio or to increase the F number). On the other hand, when the lower limit of the condition (13) is exceeded, the refractive power of the first lens unit is too weak, so that the movement amount of the first lens unit increases, which is undesirable.

In the zoom lens system, it is preferable that at least one of the lens units consists of a radial GRIN lens expressed by the expression (A).

In the zoom lens system, it is preferable that the first lens unit has a positive lens configuration strongly convex to the object side, the second lens unit has a positive lens configuration strongly convex to the image side and the third lens unit has a negative lens configuration strongly concave to the object side.

By forming the first lens unit of one positive lens element strongly convex to the object side, the image side principal point is located relatively on the front side (object side), and by forming the second lens unit of one positive lens element strongly convex to the image side, the object side principal point of the second lens unit is located relatively on the rear side (image side). Consequently, the distance between the first and second lens units can be reduced. Providing the first and second lens units with such arrangements is advantageous in reducing the size of the optical system.

Further, by forming the second lens unit of one positive lens element strongly convex to the image side, the image side principal point of the second lens unit is located relatively on the rear side (image side), and by forming the third lens unit to include a negative lens element strongly concave to the image side, the object side principal point of the second lens unit is located relatively on the front side (object side). Consequently, a sufficient distance can be secured between the second and third lens units at the longest focal length condition. As a result, a problem is avoided that the magnification of the zoom lens system cannot be increased because the second and third lens units collide with each other when the magnification is increased.

Hereinafter, preferable conditions in the third to seventh embodiments will be described. With respect to the movements of the lens units, in zooming from a shorter focal length condition to a longer focal length condition, it is preferable that the lens units are all moved toward the object side so that the distance between the first and second lens units increases and that the distance between the second and third lens units decreases. Thereby, the size of the lens system at the shortest focal length condition is reduced.

When a radial GRIN lens is used in a lens unit having a positive refractive power, the following condition (14) is preferably fulfilled:

$$-30 < \frac{N_{1d}}{\phi_p^2} < 20 \tag{14}$$

where $N_{1d}$ is the quadratic gradient index coefficient of the GRIN lens to d-line, and $\phi_p$ is the refractive power of the positive lens unit.

The condition (14) is a condition to control Petzval sum in the lens unit. When the lower limit of the condition (14) is exceeded, Petzval sum increases toward the negative side, which is undesirable. On the other hand, when the upper limit of the condition (14) is exceeded, Petzval sum increases toward the positive side, so that it is difficult to correct the total Petzval sum in the optical system.

When a radial GRIN lens is used in a lens unit having a negative refractive power, the following condition (15) is preferably fulfilled:

$$-20 < \frac{N_{1d}}{\phi_m^2} < 30 \qquad (15)$$

where $\phi_m$ is the refractive power of the negative lens unit.

The condition (15) is a condition to control Petzval sum in the lens unit. When the lower limit of the condition (15) is exceeded, Petzval sum increases toward the positive side, which is undesirable. On the other hand, when the upper limit of the condition (15) is exceeded, Petzval sum increases toward the negative side, so that it is difficult to correct the total Petzval sum in the optical system.

The gradient index of the GRIN lens preferably fulfills the above-described condition (1):

When an aspherical surface is used in the GRIN lens, the aspherical surface preferably fulfills the following condition (16):

$$-6.0 < \frac{\phi a(H) - \phi a 0}{\phi g} < 5.0 \qquad (16)$$

Here, $\phi a$ and $\phi a 0$ have been described with respect to the condition (4).

The condition (16) is a condition to be fulfilled by an aspherical surface when the aspherical surface is used in the GRIN lens. When the upper limit of the condition (16) is exceeded, aberrations generated in a spherical system in the lens unit are further degraded by the aspherical surface, which is undesirable. On the other hand, when the lower limit of the condition (16) is exceeded, the aberrations are over-corrected by the aspherical surface, so that even if a plurality of aspherical surfaces are used, it is difficult to counteract the over-correction with another aspherical surface, which is undesirable.

When an aspherical surface is used in the GRIN lens, it is very preferable that both side surfaces of the GRIN lens are formed to be aspherical. If the both side surfaces are aspherical, the degree of freedom increases by the increase in number of aspherical surfaces and the over-correction of aberrations by one aspherical surface can be compensated for by the other aspherical surface, so that further aberration correction effect is obtained. In that case, it is preferable that the aberrations over-corrected by one aspherical surface is corrected by the other aspherical surface.

When an aspherical surface is used in the first lens unit, the aspherical surface preferably fulfills the following condition (6):

$$-6.0 < \frac{\phi a(H) - \phi a 0}{\phi 1} < 5.0 \qquad (17)$$

where $0<H<Hmax$.

The condition (17) is a preferable condition to be fulfilled by an aspherical surface when the aspherical surface is used in the first lens unit. When the upper limit of the condition (17) is exceeded, since the aspherical surface works to increase the positive refractive power, spherical aberration and coma generated in the spherical system are further degraded, which is undesirable. On the other hand, when the lower limit of the condition (17) is exceeded, conversely, the positive refractive power is decreased so much that the aberrations are over-corrected by the aspherical surface.

Consequently, for example, even if a plurality of aspherical surfaces are used, it is difficult to counteract the over-correction with another aspherical surface.

When a bi-aspherical lens element is used in the first lens unit, it is preferable that one aspherical surface fulfills a condition $(\phi a(H)-\phi 0a)/\phi 1<0.0$ (aspherical surface working to decrease the positive refractive power) at least in a range of $0.8Hmax<H<Hmax$ and the other aspherical surface fulfills a condition $(\phi a(H)-\phi 0a)/\phi 1>0.0$ (aspherical surface working to increase the positive refractive power) at least in a range of $0.8<H<Hmax$.

Further, in that case, the aspherical surfaces preferably fulfill the following condition (18) in a range of $0.8Hmax<H<Hmax$:

$$|A_{m1}|>A_{p1} \qquad (18)$$

where $A_{m1}$ is the value of $(\phi a(H)-\phi 0a)/\phi 1$ of the aspherical surface working to decrease the positive refractive power, and $A_{p1}$ is the value of $(\phi a(H)-\phi 0a)/100\,1$ of the aspherical surface working to increase the positive refractive power.

The condition (18) is a preferable condition to be fulfilled by the aspherical surfaces of the bi-aspherical lens element in the first lens unit. If the condition (18) is fulfilled, the bi-aspherical lens element corrects the aberrations generated (by the positive refractive power) in the first lens unit with the aspherical surface working to decrease the positive refractive power and corrects the over-corrected aberrations (particularly, higher-order aberrations) with the other aspherical surface working to increase the positive refractive power.

When an aspherical surface is used in the second lens unit, the aspherical surface preferably fulfills the following condition (19):

$$-3.0 < \frac{\phi a(H) - \phi 0a}{\phi 2} < 2.0 \qquad (19)$$

where $0<H<Hmax$.

The condition (19) is a preferable condition to be fulfilled by an aspherical surface when the aspherical surface is used in the second lens unit. When the upper limit of the condition (19) is exceeded, since the aspherical surface works to increase the positive refractive power, spherical aberration and coma generated in the spherical system are further degraded by the aspherical surface, which is undesirable. On the other hand, when the lower limit of the condition (19) is exceeded, conversely, the positive refractive power is decreased so much that the aberrations are over-corrected by the aspherical surface. Consequently, for example, even if a plurality of aspherical surfaces are used, it is difficult to counteract the over-correction with another aspherical surface, which is undesirable.

When a bi-aspherical lens element is used in the second lens unit, it is preferable that one aspherical surface fulfills a condition $(\phi a(H)-\phi 0a)/\phi 2<0.0$ (aspherical surface working to decrease the positive refractive power) at least in a range of $0.8Hmax<H<Hmax$ and the other aspherical surface fulfills a condition $(\phi a(H)-\phi 0a)/\phi 2>0.0$ (aspherical surface working to increase the positive refractive power) at least in a range of $0.8Hmax<H<Hmax$.

Further, in that case, the aspherical surfaces preferably fulfills the following condition (20) in a range of $0.8Hmax<H<Hmax$:

$$|A_{m2}|>A_{p2} \qquad (20)$$

where $A_{m2}$ is the value of $(\phi a(H)-\phi 0a)/\phi 2$ of the aspherical surface working to decrease the positive refractive power, and $A_{p2}$ is the value of $(\phi a(H)-\phi 0a)/\phi 2$ of the aspherical surface working to increase the positive refractive power.

The condition (20) is a preferable condition to be fulfilled by the aspherical surfaces of the bi-aspherical lens element. If the condition (20) is fulfilled, the bi-aspherical lens element corrects the aberrations generated (by the positive refractive power) in the second lens unit with the aspherical surface working to decrease the positive refractive power and corrects the over-corrected aberrations (particularly, higher-order aberrations) with the other aspherical surface working to increase the positive refractive power.

When an aspherical surface is used in the negative lens element of the third lens unit, the aspherical surface preferably fulfills the following condition (21):

$$-6.0 < \frac{\phi a(H) - \phi 0a}{\phi 3} < 5.0 \tag{21}$$

where 0<H<Hmax. Here, $\phi_3$ is the refractive power of the third lens unit.

The condition (21) is a preferable condition to be fulfilled by an aspherical surface when the aspherical surface is used in the negative lens element of the third lens unit. When the upper limit of the condition (21) is exceeded, since the aspherical surface works to increase the negative refractive power, spherical aberration and coma generated in the spherical system (particularly, at the longest focal length condition) are further degraded by the aspherical surface and distortion at the shortest focal length condition is not sufficiently corrected, which is undesirable. On the other hand, when the lower limit of the condition (21) is exceeded, conversely, the negative refractive power is decreased so much that the aberrations are over-corrected by the aspherical surface. Consequently, for example, even if a plurality of aspherical surfaces are used, it is difficult to counteract the over-correction with another aspherical surface, which is undesirable.

When a bi-aspherical lens element is used as the negative lens element of the third lens unit, it is preferable that one aspherical surface fulfills a condition $(\phi a(H)-\phi 0a)/\phi 3<0.0$ (aspherical surface working to decrease the negative refractive power) at least in a range of 0.8Hmax<H<Hmax and the other aspherical surface fulfills a condition $(\phi a(H)-\phi 0a)/\phi 3>0.0$ (aspherical surface working to increase the negative refractive power) at least in a range of 0.8Hmax<H<Hmax.

Further, in that case, the aspherical surfaces preferably fulfill the following condition (22) in a range of 0.8Hmax<H<Hmax:

$$|A_{m3}|>A_{p3} \tag{22}$$

where $A_{m3}$ is the value of $(\phi a(H)-\phi 0a)/\phi 3$ of the aspherical surface working to decrease the negative refractive power, and $A_{p3}$ is the value of $(\phi a(H)-\phi 0a)/\phi 3$ of the aspherical surface working to increase the negative refractive power.

The condition (22) is a preferable condition to be fulfilled by the aspherical surfaces of the bi-aspherical lens element used as the negative lens element of the third lens unit. If the condition (22) is fulfilled, the bi-aspherical lens element corrects the aberrations generated (by the negative refractive power) in the third lens unit with the aspherical surface working to decrease the negative refractive power and corrects the over-corrected aberrations (particularly, higher-order aberrations) with the other aspherical surface working to increase the negative refractive power.

Further, when a bi-aspherical lens element is used as the negative lens unit of the third lens unit, the bi-aspherical lens element may be of a configuration in which one aspherical surface fulfills a condition $(\phi a(H)-\phi 0a)/\phi 3<0.0$ (aspherical surface working to decrease the negative refractive power) at least in a range of 0.8Hmax<H<Hmax and the other aspherical surface fulfills a condition $(\phi a(H)-\phi 0a)/\phi 3<0.0$ (aspherical surface working to decrease the negative refractive power) at least in a range of 0.8Hmax<H<Hmax.

When an aspherical surface is used in the positive lens element of the third lens unit, the aspherical surface preferably fulfills the above-shown condition (21) where 0<H<Hmax. Here, the condition (21) is a preferable condition to be fulfilled by an aspherical surface when the aspherical surface is used in the positive lens element of the third lens unit. When the upper limit of the condition (21) is exceeded, since the aspherical surface works to increase the negative refractive power, spherical aberration and coma generated in the spherical system (particularly, at the longest focal length condition) are further degraded and distortion at the shortest focal length condition is not sufficiently corrected, which is undesirable. On the other hand, when the lower limit of the condition (21) is exceeded, conversely, the negative refractive power is decreased so much that the aberrations are over-corrected by the aspherical surface. Consequently, even if a plurality of aspherical surfaces are used, it is difficult to counteract the over-correction with another aspherical surface, which is undesirable.

When a bi-aspherical lens element is used as the positive lens element of the third lens unit, it is preferable that one aspherical surface fulfills a condition $(\phi a(H)-\phi 0a)/\phi 3<0.0$ (aspherical surface working to decrease the negative refractive power) and the other aspherical surface fulfills a condition $(\phi a(H)-\phi 0a)/\phi 3>0.0$ (aspherical surface working to increase the negative refractive power).

When the first lens unit consists of a GRIN lens, its dispersion preferably fulfills the above-described condition (B) in a range of 0<H<0.5Hmax and the following condition (23) in a range of 0<H<Hmax:

$$-1.0 < \frac{v_d(H) - v_d(0)}{v_d(0)} \leq 0.0 \tag{23}$$

Here, $v_d(H)$ has been described with respect to the condition (7).

The conditions (B) and (23) are conditions to be fulfilled a GRIN lens when the first lens unit of the three-unit zoom lens system of positive, positive, negative configuration consists of the GRIN lens. When the limits of the conditions (B) and (23) are exceeded, the correction of chromatic aberration in the entire optical system is very difficult because of the chromatic aberration generated in the first lens unit.

When the second lens unit consists of a GRIN lens, its dispersion preferably fulfills the condition (B) in a range of 0<H<0.5Hmax and the condition (23) in a range of 0<H<Hmax. Here, the conditions (B) and (23) show desirable dispersion distributions to be fulfilled by a GRIN lens when the second lens unit of the three-unit zoom lens system of positive, positive, negative configuration consists of the GRIN lens. When the limits of the conditions (B) and (23) are exceeded, the correction of chromatic aberration (particularly, axial chromatic aberration) in the entire optical system is very difficult because of the chromatic aberration generated in the second lens unit.

When the third lens unit consists of a GRIN lens, its dispersion preferably fulfills the following condition (24) in a range of 0<H<0.5Hmax and the following condition (25) in a range of 0<H<Hmax:

$$\frac{d\,v_d(H)}{dH} > 0 \qquad (24)$$

$$0.0 \le \frac{v_d(H) - v_d(0)}{v_d(0)} < 1.0 \qquad (25)$$

The conditions (24) and (25) show desirable dispersion distributions to be fulfilled by a GRIN lens when the third lens unit of the three-unit zoom lens system of positive, positive, negative configuration consists of the GRIN lens. When the limits of the conditions (24) and (25) are exceeded, the correction of chromatic aberration (particularly, lateral chromatic aberration, and axial chromatic aberration at the longest focal length condition) in the entire optical system is very difficult because of the chromatic aberration generated in the third lens unit.

When the first lens unit consists of one lens element, the lens element preferably fulfills the following condition (26):

$$0.0 < \frac{R_{12} + R_{11}}{R_{12} - R_{11}} < 5.0 \qquad (26)$$

where $R_{11}$ is the radius of curvature of the object side surface of the first lens element, and $R_{12}$ is the radius of curvature of the image side surface of the first lens element.

The condition (26) is a condition relating to the aberration correction when the first lens unit consists of one lens element. When the upper limit of the condition (26) is exceeded, particularly, spherical aberration inclines toward the over side, which is undesirable. On the other hand, when the lower limit of the condition (26) is exceeded, spherical aberration inclines toward the under side, which is undesirable.

Likewise, when the first lens unit consists of one GRIN lens, it preferably fulfills the following condition (27):

$$0.02 \le \frac{T_1}{f_1} \le 0.4 \qquad (27)$$

where $f_1$ is the focal length of the first lens unit, and $T_1$ is the axial thickness of the first lens unit.

The condition (27) is a condition relating to the axial thickness of the lens when the first lens unit consists of one GRIN lens. When the upper limit of the condition (27) is exceeded, the axial thickness of the lens is too great, so that the reduction in size of the lens system cannot be achieved. On the other hand, when the lower limit of the condition (27) is exceeded, particularly, the gradient index of the GRIN lens increases in order to control Petzval sum of the lens system and the curvature of the rear surface of the lens increases, so that the manufacture of such a lens is difficult. Further, in this case, higher-order aberrations are generated because of the large gradient index, which is undesirable.

When the second lens unit consists of one lens element, the lens element preferably fulfills the following condition (28):

$$-5.0 < \frac{R_{22} + R_{21}}{R_{22} - R_{21}} < 0.0 \qquad (28)$$

where $R_{21}$ is the radius of curvature of the object side surface of the second lens unit, and $R_{22}$ is the radius of curvature of the image side surface of the second lens unit.

The condition (28) is a condition relating to the aberration correction when the second lens unit consists of one lens element. When the upper limit of the condition (28) is exceeded, particularly, spherical aberration inclines toward the over side, which is undesirable. On the other hand, when the lower limit of the condition (28) is exceeded, spherical aberration inclines toward the under side and the curvature of the surface $R_{22}$ (the image side surface of the second lens unit) increases, so that the manufacture of such a lens is difficult, which is undesirable.

Likewise, when the second lens unit consists of one GRIN lens, it preferably fulfills the following condition (29):

$$0.08 \le \frac{T_2}{f_2} \le 1.0 \qquad (29)$$

where $f_2$ is the focal length of the second lens unit, and $T_2$ is the axial thickness of the second lens unit.

The condition (29) is a condition relating to the axial thickness of the lens when the second lens unit consists of one GRIN lens. When the upper limit of the condition (29) is exceeded, since the axial thickness of the lens is so great, the thickness of the lens unit increases, so that the reduction in size of the lens system cannot be achieved. On the other hand, when the lower limit of the condition (29) is exceeded, particularly, the gradient index of the GRIN lens increases in order to control Petzval sum of the lens system and the curvature of the rear surface of the lens increases, so that the manufacture of such a lens is difficult. Further, in this case, higher-order aberrations are generated because of the large gradient index, which is undesirable.

When the third lens unit consists of one lens element, the lens element preferably fulfills the following condition (30):

$$0.0 < \frac{R_{32} + R_{31}}{R_{32} - R_{31}} < 5.0 \qquad (30)$$

where $R_{31}$ is the radius of curvature of the object side surface of the third lens unit, and $R_{32}$ is the radius of curvature of the image side surface of the third lens unit.

The condition (30) is a condition relating to the aberration correction when the third lens unit consists of one lens element. When the upper limit of the condition (30) is exceeded, particularly, spherical aberration at the longest focal length condition inclines toward the over side, which is undesirable. When the lower limit of the condition (30) is exceeded, conversely, spherical aberration inclines toward the under side, which is undesirable. In addition, when these limits are exceeded, coma also degrades, which is undesirable.

Likewise, when the third lens unit consists of one GRIN lens, it preferably fulfills the following condition (31):

$$0.02 \le \frac{T_3}{|f_3|} \le 0.7 \qquad (31)$$

where $f_3$ is the focal length of the third lens unit, and $T_3$ is the axial thickness of the third lens unit.

The condition (31) is a condition relating to the axial thickness of the lens when the third lens unit consists of one GRIN lens. When the upper limit of the condition (31) is exceeded, since the axial thickness of the lens is too great, the thickness of the lens unit increases, so that the reduction in size of the lens system cannot be achieved. On the other hand, when the lower limit of the condition (31) is exceeded, particularly, the gradient index of the GRIN lens increases in order to control Petzval sum of the lens system and the curvature of the rear surface of the lens increases, so that the manufacture of such a lens is difficult. Further, in this case, higher-order aberrations are generated because of the large gradient index, which is undesirable.

In the three-unit zoom lens system of positive, positive, negative configuration, the first lens unit preferably fulfills the following condition (32):

$$0.1 \le \frac{\phi_1}{\phi_W} \le 1.0 \tag{32}$$

where $\phi_W$ is the refractive power of the entire optical system at the shortest focal length condition.

The condition (32) is a condition relating to the refractive power of the first lens unit. When the upper limit of the condition (32) is exceeded, the refractive power of the lens unit is too strong, so that the correction of aberrations (particularly, spherical aberration and coma) is difficult. On the other hand, when the lower limit of the condition (32) is exceeded, the refractive power of the lens unit is too weak, so that the size of the optical system increases and the amounts of movements of the lens units for zooming increase, which is undesirable.

In the three-unit zoom lens system of positive, positive, negative configuration, the third lens unit preferably fulfills the following condition (33):

$$0.4 \le \left|\frac{\phi_3}{\phi_W}\right| \le 2.5 \tag{33}$$

The condition (33) is a condition relating to the refractive power of the third lens unit. When the upper limit of the condition (33) is exceeded, the refractive power of the lens unit is too strong, the correction of aberrations (particularly spherical aberration at the longest focal length condition and distortion at the shortest focal length condition) is difficult. On the other hand, when the lower limit of the condition (33) is exceeded, the refractive power of the lens unit is too weak, so that the size of the optical system increases and the amounts of movements of the lens units for zooming increase, which is undesirable.

Subsequently, paraxial ray tracing in the radial GRIN lens will be described. When the gradient index is expressed by the previously-shown expression (A), the optical paths in the radial GRIN media are expressed by paraxial ray tracing expressions with respect to cases (a) and (b) shown below. As is apparent from the expressions, in the GRIN lens, the light ray is not directed linearly but is directed while being gradually bent by the gradient index. Therefore, the GRIN lens has a refractive power although it is a plano lens.

(a) When $N_1 < 0$ (radial gradient index of convergent type), $$\begin{bmatrix} H \\ \alpha' \end{bmatrix} = \begin{bmatrix} \cos(k \cdot z) & \frac{-\sin(k \cdot z)}{(k \cdot N_0)} \\ k \cdot N_0 \cdot \sin(k \cdot z) & \cos(k \cdot z) \end{bmatrix} \begin{bmatrix} H_0 \\ \alpha \end{bmatrix}$$

where $k^2 = -2N_1/N_0$.

(b) When $N_1 > 0$ (radial gradient index of divergent type), $$\begin{bmatrix} H \\ \alpha' \end{bmatrix} = \begin{bmatrix} \cosh(k \cdot z) & \frac{\sinh(k \cdot z)}{(k \cdot N_0)} \\ -k \cdot N_0 \cdot \sinh(k \cdot z) & \cosh(k \cdot z) \end{bmatrix} \begin{bmatrix} H_0 \\ \alpha \end{bmatrix}$$

where $k^2 = 2N_1/N_0$.

Here, $\alpha'$ is the direction (inclination) of the light ray, $\alpha$ is the inclination of incidence, $H_0$ is the height of incidence, and z is the distance from the object side vertex of the lens in a direction parallel to the optical axis.

Subsequently, effects of the radial GRIN lens on the correction of Petzval sum will be described. If the optical system is assumed to be a thin lens system, a Petzval sum PT when the radial GRIN lens is used is expressed as follows:

$$PT = \frac{\phi_S}{N_0} + \frac{\phi_M}{N_0^2} \tag{E}$$

where $\phi_S$ is the refractive power (refractive power when the lens is homogeneous) $\phi_M$ is the refractive power of the medium, and:

$$\phi = \phi_S + \phi_M \tag{F}$$

Here, $\phi$ is the refractive power of the lens system.

From the expressions (E) and (F), the refractive powers $\phi_S$ and $\phi_M$ are given by the following expressions (G) and (H) (i.e. the refractive powers $\phi_S$ and $\phi_M$ are obtained from the refractive power $\phi$ of the lens system and the Petzval sum PT with the axial refractive index $N_0$ as the parameter):

$$\phi_S = \frac{N_0^2 \cdot PT - \phi}{N_0 - 1} \tag{G}$$

$$\phi_M = \frac{N_0(N_0 \cdot PT - \phi)}{1 - N_0} \tag{H}$$

When the axial thickness of the lens is t, the refractive power $\phi_M$ is expressed as $$\phi_M \approx -2N_1 \cdot t \tag{I}$$

Therefore, by giving the Petzval sum PT with the axial refractive index $N_0$ and the axial thickness t as the parameters from the refractive power $\phi_M$ obtained by the expression (H), the quadratic gradient index $N_1$ is univocally determined by the expression (I). Thus, if a target of the Petzval sum PT of the lens system is determined, the Petzval sum PT of the lens system is corrected by using the quadratic gradient index coefficient $N_1$ obtained by the above calculation.

Subsequently, the handling of chromatic aberration will be described. An axial chromatic aberration PAC of a thin lens system is expressed by the expression (J) shown below. From the expression (J), it is apparent that the quadratic coefficient of the gradient index at each wavelength is important (i.e. $v_1$ is important) for the correction of chromatic aberration of the system.

$$PAC \propto \frac{\phi_S}{\nu_0} + \frac{\phi_M}{\nu_1} \quad \text{(J)}$$

where $\nu_0$ is the Abbe number when the lens is homogeneous, and $\nu_1$ is the Abbe number by the medium being a GRIN lens. $\nu_0$ and $\nu_1$ are expressed as follows:

$$\nu_0 = \frac{N_{0d} - 1}{N_{0F} - N_{0C}} \quad \text{(K)}$$

$$\nu_1 = \frac{N_{1d}}{N_{1F} - N_{1C}} \quad \text{(L)}$$

where $N_{1d}$ is the axial refractive index to d-line, $N_{OF}$ is the axial refractive index to F-line, $N_{OC}$ is the axial refractive index to C-line, $N_{1d}$ is the quadratic gradient index coefficient to d-line, $N_{1F}$ is the quadratic gradient index coefficient to F-line, and $N_{1C}$ is the quadratic gradient index coefficient to C-line.

Subsequently, the third-order aberration coefficient of the GRIN lens will be described. As mentioned previously, in the GRIN lens, the light ray is directed while being bent. This effect is obtained since the medium of the GRIN lens has a gradient index. Therefore, the effect of the medium is present as a contribution also in the aberration coefficient. In a paper "Third-Order Aberrations of Inhomogeneous Lenses" by P. J. Sands (J. Opt. Soc. Am, Vol. 60, Nov. 11, 1970, 1436–1443), aberration coefficients of lenses including the GRIN lens are discussed. According to the paper, the aberration coefficient of the GRIN lens is expressed by the sum of four terms as shown in the following:

[aberration coefficient of GRIN lens]=+[contribution of spherical surface]+[contribution of aspherical surface]+[contribution of surface by GRIN lens]+[contribution by medium of GRIN lens]

The terms of [contribution of spherical surface] and [contribution of aspherical surface] are the same as the aberration coefficients of conventional homogeneous lenses. The aspherical contribution by the lens being a GRIN lens and the contribution by the light being bent in the medium of the GRIN lens are added thereto to obtain the total aberration coefficient. The total aberration coefficient is expressed as follows:

$$S_i = S_{0i} + \frac{-1}{2\alpha'}\left(\sum_{j=1}^{k} a_{ij} + \sum_{j=1}^{k} a_{ij}^*\right) \quad (i = 1, 2, \ldots, 5)$$

where $S_i$ is the third-order aberration coefficient (Seidel aberrations) of the GRIN lens, $S_{0i}$ is [contribution of spherical surface]+[contribution of aspherical surface], $a_{ij}$ is the [contribution of surface by GRIN lens] of a jth surface, $a_{ij}^*$ is the [contribution by medium of GRIN lens] of the jth surface, and k is the number of surfaces of the optical system.

The [contribution of surface by GRIN lens] $a_{ij}$ is expressed as follows:

$$a_{1j} = \kappa_j \cdot y_{aj}^4$$

$$a_{2j} = \kappa_j \cdot y_{aj}^3 \cdot y_{bj}$$

$$a_{3j} = \kappa_j \cdot y_{aj}^2 \cdot y_{bj}^2$$

$$a_{4j} = 0$$

$$a_{5j} = \kappa_j \cdot y_{aj} \cdot y_{bj}^3$$

where $\kappa_j = -C_j \cdot \Delta\{4N_1 + C_j(dN_0/dz)\}$ (in the case of the radial GRIN lens, $dN_0/dz \equiv 0$ (z is the direction along the optical axis)), $C_j$ is the curvature of the jth surface, $\Delta$ is the difference between various amounts before and after the light ray is refracted at the lens surface, $y_{aj}$ is the height of the paraxial principal ray of the jth surface, and $y_{bj}$ is the height of the paraxial marginal ray of the jth surface.

The [contribution by medium of GRIN lens] $a_{ij}^*$ is expressed by the following expressions. In the expressions, ' is the value after the light ray is refracted at the surface (e.g. the jth surface), and the affix j is omitted.

$$a_{1j}^* = \nabla(N_0 \cdot y_a \cdot v_a'^3) + \int_0^t (8N_2 \cdot y_a^4 + 4N_1 \cdot y_a^2 \cdot v_a'^4) dz$$

$$a_{2j}^* = \nabla(N_0 \cdot y_a \cdot v_a'^2 \cdot v_b') + \int_0^t (8N_2 \cdot y_a^3 \cdot y_b + 2N_1 \cdot y_a \cdot v_a'[y_a \cdot v_b' + y_b \cdot v_a'] - N_0 \cdot v_a'^3 \cdot v_b') dz$$

$$a_{3j}^* = \nabla(N_0 \cdot y_a \cdot v_a' \cdot v_b'^2) + \int_0^t (8N_2 \cdot y_a^2 \cdot y_b^2 + 4N_1 \cdot y_a \cdot y_b \cdot v_a' \cdot v_b' - N_0 \cdot v_a'^2 \cdot v_b'^2) dz$$

$$a_{4j}^* = \int_0^t (N_1/N_0^2) dz$$

$$a_{5j}^* = \nabla(N_0 \cdot y_a \cdot v_b'^3) + \int_0^t (8N_2 \cdot y_a \cdot y_b^3 + 2N_1 \cdot y_b \cdot v_b'[y_a \cdot v_b' + y_b \cdot v_a'] - N_0 \cdot v_a' \cdot v_b'^3) dz$$

where $\nabla$ is the difference between various amounts before and after the start to end of the propagation in the medium, $y_a$ is the height of the paraxial principal ray, $y_b$ is the height of the paraxial marginal ray, $v_a$ is the angle of the paraxial principal ray, and $v_b$ is the angle of the paraxial marginal ray.

According to the third to seventh embodiments, since a radial GRIN lens is used, chromatic aberration and Petzval sum can excellently be corrected. Further, since the degree of freedom for aberration correction is secured by the aspherical surface provided in the GRIN lens, each lens unit of the zoom lens system can consist of one lens element.

According to the thirteenth feature, even though the lens unit each consist of one lens element, the aberrations of the lens units can excellently be corrected by fulfilling the condition (13) relating to the refractive power of the first and second lens units.

Numerical data of third to seventh embodiments of the present invention are shown in Tables 7 to 11. In each table, ri (i=1, 2, 3, . . . ) represents a radius of curvature of an ith surface Si (i=1, 2, 3, . . . ) counted from the object side, di (i=1, 2, 3, . . . ) is an ith axial distance counted from the object side, Ni (i=1, 2, 3, . . . ) and vi (i=1, 2, 3, . . . ) are a refractive index to d-line and an Abbe number of an ith lens counted from the object side, respectively. The focal lengths f and the F numbers of the entire lens system at the shortest focal length condition (W), at the middle focal length condition (M) and at the longest focal length condition (L) are also shown.

In third to seventh embodiments, the surfaces marked with asterisks are aspherical and defined by the following expression showing the configuration of the aspherical surface:

$$X = \frac{C \cdot Y^2}{1 + (1 - \varepsilon \cdot Y^2 \cdot C^2)^{\frac{1}{2}}} + \sum_i A_i Y^i$$

where X is the displacement amount from the reference surface along the optical axis, Y is the height in a direction vertical to the optical axis, C is the paraxial curvature, $\varepsilon$ is the conic constant, and Ai is the ith-power aspherical coefficient.

With respect to third to seventh embodiments, the values of the conditions (1) and (13) to (33) are shown in Tables 15 to 17, 20 to 22, 26 to 28, 32 to 34 and 38 to 40.

FIGS. 6A to 6I, 8A to 8I, 10A to 10I, 12A to 12I and 14A to 14I show aberrations of the third to seventh embodiments. FIGS. 6A to 6C, 8A to 8C, 10A to 10C, 12A to 12C and 14A to 14C show aberrations at the shortest focal length condition (W). FIGS. 6D to 6F, 8D to 8F, 10D to 10F, 12D to 12F and 14D to 14F show aberrations at the middle focal length condition (M). FIGS. 6G to 6I, 8G to 8I, 10G to 10I, 12G to 12I and 14G to 14I show aberrations at the longest focal length condition.

Numerical data of eighth to eleventh embodiments of the present invention are shown in Tables 41 to 44. In each table, ri (i=1, 2, 3, . . . ) represents a radius of curvature of an ith surface counted from the object side, Ti (i=1, 2, 3, . . . ) represents an ith axial distance counted from the object side, FL represents a focal length of the entire lens system, and Fno. represents a minimum F number. Nd represents a refractive index to d-line, and νd represents an Abbe number. In the tables, GRIN1 and GRIN2 represent GRIN lenses, which will be described later in detail.

The GRIN lenses (designated GRIN1 and GRIN2 in Tables 41 to 44) of the present invention have a gradient index in a direction vertical to the optical axis (hereinafter, a GRIN lens of this type will be referred to as a radial GRIN lens) and the gradient index is expressed as the above-described condition (A).

Glass data of the eighth to eleventh embodiments are shown in Tables 45 to 48. In each table, Ni (i=1, 2, 3, . . . ) represents the 2ith power gradient index coefficient of the radial GRIN lens to d-line. In the coefficients, the numerals after the letter E correspond to the index portion like in the aspherical coefficients.

FIGS. 15 to 18 show the lens arrangements of the eighth to eleventh embodiments at the shortest focal length condition. The eighth to eleventh embodiments each comprise from the object side a first lens unit GR1 of a positive refractive power, a second lens unit Gr2 of a positive refractive power and a third lens unit Gr3 of a negative refractive power. In these embodiments, the lens units are all moved toward the object side in zooming from the shortest focal length condition to the longest focal length condition, and the distance between the first lens unit Gr1 and the second lens unit GR2 increases and the distance between the second lens unit Gr2 and the third lens unit Gr3 decreases.

The first lens unit Gr1 consists of a first lens element which is a radial GRIN lens whose both side surfaces r1 and r2 are aspherical. The first lens element has a positive meniscus configuration concave to the image side.

The second lens unit Gr2 consists of a second lens element which is a radial GRIN lens whose both side surfaces r3 and r4 are aspherical. The second lens element has a negative meniscus configuration convex to the image side.

The third lens unit Gr3 consists of a third lens element whose both side surfaces r5 and r6 are aspherical and a fourth lens element. The third lens element has a positive meniscus configuration convex to the image side. The fourth lens element has a bi-concave lens configuration in the eighth to tenth embodiments shown in FIGS. 15 to 17 and has a negative meniscus configuration convex to the image side in the eleventh embodiment shown in FIG. 18.

Subsequently, conditions will be described which are to be fulfilled by the zoom lens system of the present invention comprising from the object side the first lens unit of a positive refractive power, the second lens unit of a positive refractive power and the third lens unit of a negative refractive power wherein zooming is performed by varying the distances between the lens units (hereinafter, this type of zoom lens system will be referred to as a three-unit zoom lens system). The refractive power of the first lens unit and the refractive power of the second lens unit fulfill the above-described condition (13).

In the three-unit zoom lens system, by forming the first lens unit of one positive lens element strongly convex to the object side, the image side principal point of the first lens unit is located closer to the object, and by forming the second lens unit of one positive lens element strongly convex to the image side, the object side principal point of the second lens unit is located closer to the image. Thereby, the axial distance between the first and second lens units can be reduced, so that the size of the zoom lens system can be reduced.

Further, in the three-unit zoom lens system, by forming the second lens unit of one positive lens element strongly convex to the image side, the image side principal point of the second lens unit is located closer to the image side, so that the axial distance between the second and third lens units can be increased. If the axial distance between the second and third lens units increases, the relative movement amounts of the second and third lens units increase, so that the focal length at the longest focal length condition can be increased.

Thus, in the three-unit zoom lens system, by forming the first lens unit of one positive lens element strongly convex to the object sid and forming the second lens unit of one positive lens element strongly convex to the image side, the size of the zoom lens system can be reduced and the magnification of the zoom lens system can be increased.

The radial GRIN lens included in the three-unit zoom lens system fulfills the above-described condition (16).

When an aspherical surface is used in the radial GRIN lens, it is preferable that both side surfaces are aspherical since the aberrations over-corrected by one aspherical surface can be corrected by the other aspherical surface.

The condition (1) is preferably fulfilled by the radial GRIN lens when the radial GRIN lens is used in the three-unit zoom lens system.

The condition (2) is fulfilled to control Petzval sum in the lens units of a positive refractive power (i.e. the first lens unit and the second lens unit) when radial GRIN lenses are used as the lens elements constituting the lens units in the three-unit zoom lens system.

The condition (17) is fulfilled by an aspherical surface when the aspherical surface is used in the first lens unit of the three-unit zoom lens system.

The condition (19) is fulfilled by an aspherical surface when the aspherical surface is used in the second lens unit of the three-unit zoom lens system.

The condition (21) is fulfilled by an aspherical surface when the aspherical surface is used in the third lens unit of the three-unit zoom lens system.

$$\frac{\phi a1(H) - \phi a10}{\phi BA} < 0.0 \tag{34}$$

$$\frac{\phi a2(H) - \phi a20}{\phi BA} > 0.0 \tag{35}$$

$$\left|\frac{\phi a1(H) - \phi a10}{\phi BA}\right| - \frac{\phi a2(H) - \phi a20}{\phi BA} > 0 \tag{36}$$

where $0.8 H_{max} < H < H_{max}$. Here, $\phi a1(H)$ is the refractive power by a local curvature at the height H of a first aspherical surface, φa10 is the refractive power by a reference curvature of the first aspherical surface, φa2(H) is the refractive power by a local curvature at the height H of a second aspherical surface, φa20 is the refractive power by a reference curvature of the second aspherical surface, and φBA is the refractive power of a lens unit including the first and second aspherical surfaces.

When a lens unit of the three-unit zoom lens system includes a bi-aspherical lens element, the bi-aspherical lens element preferably has a first aspherical surface working to decrease the refractive power of the lens unit and a second aspherical surface working to increase the refractive power of the lens unit. The above conditions (34) to (36) are conditions to be fulfilled by the bi-aspherical lens element.

The aspherical surface fulfilling the condition (34) works to decrease the refractive power. Specifically, the aspherical surface fulfilling the condition (34) in the three-unit zoom lens system decreases the positive refractive power in the case of a bi-aspherical lens element used in the first or second lens unit and decreases the negative refractive power in the case of a bi-aspherical lens element used in the third lens unit. Moreover, the aspherical surface fulfilling the condition (35) works to increase the refractive power. Specifically, the aspherical surface fulfilling the condition (35) in the three-unit zoom lens system increases the positive refractive power in the case of a bi-aspherical lens element used in the first or second lens unit and increases the negative refractive power in the case of a bi-aspherical lens element used in the third lens unit.

In the three-unit zoom lens system, if the bi-aspherical lens element fulfills the conditions (34) to (36), the lower-order components of aberrations generated in the lens unit including the bi-aspherical lens element can be corrected by the first aspherical surface which decreases the refractive power and the higher-order components of the aberrations over-corrected by the first aspherical surface can be corrected by the second aspherical surface which increases the refractive power, so that the aberrations are corrected with good balance.

The conditions (B) and (23) are fulfilled by a radial GRIN lens when the radial GRIN lens is used in the first or second lens unit in the three-unit zoom lens system.

$$-5.0 < \frac{N\lambda 1 - Nd1}{\phi 1^2} < 5.0 \qquad (37)$$

where Nλ1 is the quadratic gradient index coefficient of the radial GRIN lens to F-line and C-line, and Nd1 is the quadratic gradient index coefficient of the radial GRIN lens to d-line.

The condition (37) is a condition to be fulfilled by a radial GRIN lens when the radial GRIN lens is used in the first lens unit in the three-unit zoom lens system. When the limits of the condition (37) are exceeded, the correction of chromatic aberration in the entire lens system is difficult because of the chromatic aberration generated in the lens unit including the radial GRIN lens.

$$-1.0 < \frac{N\lambda 1 - Nd1}{\phi 2^2} < 1.0 \qquad (38)$$

The condition (38) is a condition to be fulfilled by a radial GRIN lens when the radial GRIN lens is used in the second lens unit in the three-unit zoom lens system. When the limits of the condition (38) are exceeded, the correction of chromatic aberration in the entire lens system is difficult because of the chromatic aberration generated in the lens unit including the radial GRIN lens.

The condition (26) is fulfilled by the radial GRIN lens when the first lens unit of the three-unit zoom lens system consists of the radial GRIN lens. When the upper limit of the condition (26) is exceeded, spherical aberration at the longest focal length condition inclines toward the over side, which is undesirable. On the other hand, when the lower limit of the condition (26) is exceeded, spherical aberration inclines toward the under side, which is undesirable.

The condition (27) is fulfilled by the radial GRIN lens when the first lens unit of the three-unit zoom lens system consists of the radial GRIN lens.

The condition (28) is fulfilled by a radial GRIN lens when the first lens unit of the three-unit zoom lens system consists of the radial GRIN lens.

The condition (29) is fulfilled by the radial GRIN lens when the second lens unit of the three-unit zoom lens system consists of the radial GRIN lens.

The condition (32) is fulfilled by the first lens unit.

The condition (33) is fulfilled by the third lens unit.

The eighth to eleventh embodiments fulfill the conditions (1), (2), (13), (16), (17), (21), (23), (26), (27), (28), (29), (32), (33), (34), (35), (36), (37), (38) and (B) (however, the conditions (34) to (36) are fulfilled with respect to r3 and r4 in the case of the eighth embodiment, r1, r2, r3 and r4 in the case of the ninth embodiment, r3, r4, r5 and r6 in the case of the tenth embodiment, and r3, r4, r5 and r6 in the case of the eleventh embodiment). The values of conditions of the embodiments are shown in Tables 49 to 79. In the tables, R11, R12, R21, R22, TT1 and TT2 correspond to r1, r2, r3, r4, T1 and T3, respectively. Nd1, NC1 and NF1 correspond to quadratic gradient index coefficients to d-line, C-line and F-line, respectively. Nd2 corresponds to the fourth power coefficient to d-line.

FIGS. 19A to 19I through 22A to 22I show aberrations of the eighth to eleventh embodiments. FIGS. 19A to 19C, 20A to 20C, 21A to 21C and 22A to 22C show aberrations at the shortest focal length condition. FIGS. 19D to 19F, 20D to 20F, 21D to 21F and 22D to 22F show aberrations at the middle focal length condition. FIGS. 19G to 19I, 20G to 20I, 21G to 21I and 22G to 22I show aberrations at the longest focal length condition. The minimum F number at the shortest, middle and longest focal length conditions are respectively 3.60, 6.07 and 9.75 in the eighth embodiment, 3.60, 5.93 and 9.24 in the ninth embodiment, 3.60, 5.69 and 8.67 in the tenth embodiment, and 3.60, 5.70 and 9.25 in the eleventh embodiment. The maximum image height Y' of the off-axial principal ray in astigmatism and distortion is 21.6 in each embodiment. In FIGS. 19A, 19D, 19G, 20A, 20D, 20G, 21A, 21D, 21G, 22A, 22D and 22G, the solid line (d) represents spherical aberration to d-line and the dotted line (SC) represents sine condition. In FIGS. 19B, 19E, 19H, 20B, 20E, 20H, 21B, 21E, 21H, 22B, 22E and 22H, the dotted line (DM) and the solid line (DS) represent astigmatisms on the meridional and sagittal image planes, respectively.

Obviously, many modifications and variations of the present invention are possible in light of the above teachings. It is therefore to be understood that within the scope of the appended claims, the invention may be practiced other than as specifically described.

TABLE 1

(1st Embodiment)

FL = 36.3 to 49.4 to 67.4    Fno. = 4.60 to 6.25 to 8.53

| | Radius of Curvature | | Axial Distance | Refractive Index | Abbe Number |
|---|---|---|---|---|---|
| r1* | 339.361 | T1 | 12.771 | GRIN1 | |
| r2* | −15.902 | T2 | 19.328 to 15.537 to 12.712 | | |
| r3 | −17.625 | T3 | 4.000 | GRIN2 | |
| r4* | 37.097 | | | | |

Aspherical Coefficients

| | r1 | r2 | r4 |
|---|---|---|---|
| $\epsilon$ | 1.00000 | 1.00000 | 1.00000 |
| A4 | −0.25285E − 03 | 0.97405E − 04 | −0.26704E − 03 |
| A6 | 0.59970E − 06 | 0.52821E − 06 | 0.18646E − 05 |
| A8 | −0.49764E − 07 | −0.30640E − 07 | −0.18335E − 07 |
| A10 | 0.83994E − 09 | −0.12389E − 09 | 0.10045E − 09 |
| A12 | −0.52259E − 11 | 0.17413E − 10 | −0.18774E − 12 |

Glass Data

| | d-line | C-line | F-line |
|---|---|---|---|
| GRIN1 | | | |
| N0 | 1.77250 | 1.76781 | 1.78333 |
| N1 | 5.11004990E − 04 | 5.02263580E − 04 | 5.32871620E − 04 |
| N2 | −1.60869770E − 05 | −1.60869770E − 05 | −1.60869770E − 05 |
| N3 | −8.46804010E − 09 | −8.46804010E − 09 | −8.46804010E − 09 |
| N4 | 1.46298190E − 10 | 1.46298190E − 10 | 1.46298190E − 10 |
| GRIN2 | | | |
| N0 | 1.51680 | 1.51432 | 1.52237 |
| N1 | 5.38080110E − 04 | 5.35754560E − 04 | 5.45225460E − 04 |
| N2 | 2.34058790E − 05 | 2.34058790E − 05 | 2.34058790E − 05 |
| N3 | −6.51959790E − 09 | −6.51959790E − 09 | −6.51959790E − 09 |
| N4 | −4.93535710E − 10 | −4.93535710E − 10 | −4.93535710E − 10 |

*represents an aspherical surface.

TABLE 2

(2nd Embodiment)

FL = 36.3 to 49.4 to 67.4    Fno. = 3.60 to 4.89 to 6.68

| | Radius of Curvature | | Axial Distance | Refractive Index | Abbe Number |
|---|---|---|---|---|---|
| r1* | −190.026 | T1 | 12.756 | GRIN3 | |
| r2* | −14.674 | T2 | 14.223. to 9.748 to 6.414 | | |
| r3* | −31.828 | T3 | 3.350 | 1.58340 | 30.23 |
| r4 | −22.123 | T4 | 4.450 | | |
| r5 | −10.085 | T5 | 1.000 | 1.74400 | 44.93 |
| r6 | −33.247 | | | | |

Aspherical Coefficients

| | r1 | r2 | r4 |
|---|---|---|---|
| $\epsilon$ | 1.00000 | 1.00000 | 1.00000 |
| A4 | −0.18672E − 03 | 0.76907E − 04 | 0.91983E − 04 |
| A6 | −0.93347E − 06 | −0.87215E − 06 | −0.13044E − 05 |
| A8 | 0.42649E − 07 | 0.29849E − 07 | 0.72807E − 07 |
| A10 | −0.15572E − 08 | −0.68341E − 09 | −0.20993E − 08 |
| A12 | 0.18548E − 10 | 0.66590E − 11 | 0.41801E − 10 |
| A14 | | | −0.44877E − 12 |
| A16 | | | 0.19289E − 14 |

TABLE 2-continued (2nd Embodiment)

Glass Data

| GRIN3 | d-line | C-line | F-line |
|---|---|---|---|
| N0 | 1.77250 | 1.76781 | 1.78333 |
| N1 | 5.11004990E − 04 | 5.02263580E − 04 | 5.32871620E − 04 |
| N2 | −8.47235940E − 06 | −8.47000000E − 06 | −8.47000000E − 06 |

*represents an aspherical surface.

TABLE 3

Values of Conditions of 1st Embodiment (1)

| Condition | Value |
|---|---|
| $\left|\dfrac{Nd2}{\phi g^4}\right|$ of first lens element | 6.814 |
| $\left|\dfrac{Nd2}{\phi g^4}\right|$ of second lens element | 4.096 |
| $\dfrac{Nd1}{\phi p^2}$ (condition (2)) | 0.333 |
| $\dfrac{Nd1}{\phi m^2}$ (condition (3)) | 0.225 |
| $\left|\dfrac{\phi R}{\phi W}\right|$ (condition (5)) | 1.777 |
| $\dfrac{RF2 + RF1}{RF2 - RF1}$ (condition (8)) | −0.910 |
| $\dfrac{TF}{fT}$ (condition (9)) | 0.501 |
| $\dfrac{RR2 + RR1}{RR2 - RR1}$ (condition (11)) | 0.356 |
| $\dfrac{TR}{|fR|}$ (condition (12)) | 0.196 |

TABLE 4

Values of conditions of 1st Embodiment (2)

$$\dfrac{\phi a(H) - \phi a0}{\phi g}$$

$$\left(\dfrac{\phi a(H) - \phi a0}{\phi R}\right)$$

| | | | | $\dfrac{vd(H) - vd(0)}{vd(0)}$ | |
|---|---|---|---|---|---|
| | Condition (4) (r4 is also for condition (6)) | | | | |
| Height of incidence | r1 | r2 | r4 (rear unit) | Condition (7) GRIN1 | Condition (11) GRIN2 |
| 0.0 H | 0.000 | 0.000 | 0.000 | 0.000 | 0.000 |
| 0.1 H | −0.018 | −0.004 | −0.055 | 0.000 | 0.000 |
| 0.2 H | −0.072 | −0.016 | −0.203 | −0.002 | 0.001 |

TABLE 4-continued

Values of conditions of 1st Embodiment (2)

$$\frac{\phi a(H) - \phi a0}{\phi g}$$

$$\left(\frac{\phi a(H) - \phi a0}{\phi R}\right)$$

Condition (4)
(r4 is also for condition (6))

$$\frac{vd(H) - vd(0)}{vd(0)}$$

| Height of incidence | r1 | r2 | r4 (rear unit) | Condition (7) GRIN1 | Condition (11) GRIN2 |
|---|---|---|---|---|---|
| 0.3 H | −0.161 | −0.037 | −0.410 | −0.004 | 0.008 |
| 0.4 H | −0.287 | −0.066 | −0.664 | −0.007 | 0.028 |
| 0.5 H | −0.453 | −0.102 | −0.985 | −0.011 | 0.068 |
| 0.6 H | −0.663 | −0.144 | −1.374 | −0.016 | 0.134 |
| 0.7 H | −0.927 | −0.189 | −1.657 | −0.023 | 0.225 |
| 0.8 H | −1.247 | −0.233 | −1.435 | −0.032 | 0.327 |
| 0.9 H | −1.618 | −0.277 | −0.404 | −0.043 | 0.398 |
| 1.0 H | −2.023 | −0.324 | 0.963 | −0.056 | 0.359 |

TABLE 5

Values of Conditions of 2nd Embodiment (1)

| Condition | Value |
|---|---|
| $\left\|\frac{Nd2}{\phi g^4}\right\|$ of first lens element | 3.589 |
| $\frac{Nd1}{\phi p^3}$ (condition (2)) | 0.333 |
| $\left\|\frac{\phi R}{\phi W}\right\|$ (condition (5)) | 1.506 |
| $\frac{RF2 + RF1}{RF2 - RF1}$ (condition (8)) | −1.167 |
| $\frac{TF}{fT}$ (condition (9)) | 0.500 |

TABLE 6

Values of Conditions of 2nd Embodiment (2)

$$\frac{\phi a(H) - \phi a0}{\phi g}$$

$$\left(\frac{\phi a(H) - \phi a0}{\phi R}\right)$$

$$\frac{vd(H) - vd(0)}{vd(0)}$$

| Height of incidence | Condition (4) r1 | Condition (6) r2 | r4 (rear unit) | Condition (7) GRIN3 |
|---|---|---|---|---|
| 0.0 H | 0.000 | 0.000 | 0.194 | 0.000 |
| 0.1 H | −0.013 | −0.006 | 0.206 | 0.000 |
| 0.2 H | −0.054 | −0.022 | 0.237 | −0.002 |
| 0.3 H | −0.124 | −0.047 | 0.286 | −0.004 |
| 0.4 H | −0.223 | −0.078 | 0.359 | −0.007 |
| 0.5 H | −0.354 | −0.113 | 0.471 | −0.012 |
| 0.6 H | −0.519 | −0.150 | 0.654 | −0.017 |

TABLE 6-continued

Values of Conditions of 2nd Embodiment (2)

$$\frac{\phi a(H) - \phi a0}{\phi g}$$

$$\left(\frac{\phi a(H) - \phi a0}{\phi R}\right)$$

$$\frac{vd(H) - vd(0)}{vd(0)}$$

| Height of incidence | Condition (4) r1 | Condition (6) r2 | r4 (rear unit) | Condition (7) GRIN3 |
|---|---|---|---|---|
| 0.7 H | −0.722 | −0.187 | 0.965 | −0.024 |
| 0.8 H | −0.973 | −0.222 | 1.435 | −0.032 |
| 0.9 H | −1.271 | −0.256 | 2.122 | −0.042 |
| 1.0 H | −1.573 | −0.309 | 5.108 | −0.053 |

TABLE 7

(3rd Embodiment)

f = 38.9 to 75.5 to 133.0    FNO. = 3.60 to 5.91 to 9.18

| Surface | | Radius of Curvature | Axial Distance | GRIN Lens |
|---|---|---|---|---|
| {Gr1} | | | | |
| S1* | r1 | 35.214 | | |
| | | | d1   6.000 | GRIN1 |
| S2* | r2 | 182.059 | | |
| | | | d2   4.902 to 17.320 to 25.192 | |
| {Gr2} | | | | |
| S3* | r3 | −38.891 | | |
| | | | d3   13.766 | GRIN2 |
| S4* | r4 | −14.094 | | |
| | | | d4   25.325 to 14.551 to 8.520 | |
| {Gr3} | | | | |
| S5* | r5 | −22.237 | | |
| | | | d5   2.817 | GRIN3 |
| S6* | r6 | 58.823 | | |
| | | Σd = 52.809 to 54.453 to 56.295 | | |

Aspherical Data

```
S1:  ε =    1.0000
     A4 =  −0.13708 × 10⁻⁴
     A6 =  −0.29259 × 10⁻⁷
     A8 =  −0.12399 × 10⁻⁹
     A10 = −0.75694 × 10⁻¹³
     A12 =  0.12456 × 10⁻¹⁶
S2:  ε =    1.000
     A4 =  −0.13611 × 10⁻⁴
     A6 =  −0.34168 × 10⁻⁷
     A8 =  −0.47310 × 10⁻¹⁰
     A10 =  0.28331 × 10⁻¹³
     A12 =  0.13843 × 10⁻¹⁶
S3:  ε =    1.0000
     A4 =  −0.68634 × 10⁻⁴
     A6 =   0.62144 × 10⁻⁷
     A8 =  −0.85042 × 10⁻⁸
     A10 =  0.19116 × 10⁻⁹
     A12 = −0.14989 × 10⁻¹¹
S4:  ε =    1.0000
     A4 =   0.56337 × 10⁻⁵
     A6 =  −0.92913 × 10⁻⁸
     A8 =  −0.49274 × 10⁻⁸
     A10 =  0.35667 × 10⁻¹⁰
     A12 = −0.27362 × 10⁻¹³
S5:  ε =    1.0000
     A4 =   0.72812 × 10⁻⁴
     A6 =  −0.50640 × 10⁻⁶
     A8 =   0.24029 × 10⁻⁸
```

TABLE 7-continued (3rd Embodiment)

|  |  |  |
|---|---|---|
|  | A10 = | $0.15908 \times 10^{-11}$ |
|  | A12 = | $-0.22905 \times 10^{-13}$ |
| S6: | $\epsilon$ = | 1.000 |
|  | A4 = | $0.78956 \times 10^{-5}$ |
|  | A6 = | $-0.25503 \times 10^{-6}$ |
|  | A8 = | $0.75480 \times 10^{-9}$ |
|  | A10 = | $-0.80557 \times 10^{-13}$ |
|  | A12 = | $-0.22267 \times 10^{-14}$ |

TABLE 8

<3rd Embodiment>
Refractive Index Distribution Coefficients of GRIN1

| d-line | $N_2$ | $6.9828574 \times 10^{-4}$ | $N_4$ | $7.4090000 \times 10^{-7}$ |
|---|---|---|---|---|
|  | $N_6$ | $1.7680000 \times 10^{-9}$ | $N_8$ | $-1.1040000 \times 10^{-11}$ |
| C-line | $N_2$ | $6.9100000 \times 10^{-4}$ | $N_4$ | $7.2400000 \times 10^{-7}$ |
|  | $N_6$ | $1.7510000 \times 10^{-9}$ | $N_8$ | $-1.1020000 \times 10^{-11}$ |
| F-line | $N_2$ | $7.1430000 \times 10^{-4}$ | $N_4$ | $7.6710000 \times 10^{-7}$ |
|  | $N_6$ | $1.7930000 \times 10^{-9}$ | $N_8$ | $-1.0920000 \times 10^{-11}$ |

TABLE 9

<3rd Embodiment>
Refractive Index Distribution Coefficients of GRIN2

| d-line | $N_2$ | $5.9657688 \times 10^{-4}$ | $N_4$ | $2.9940000 \times 10^{-6}$ |
|---|---|---|---|---|
|  | $N_6$ | $1.8210000 \times 10^{-8}$ | $N_8$ | $6.4260000 \times 10^{-10}$ |
| C-line | $N_2$ | $5.8760000 \times 10^{-4}$ | $N_4$ | $2.9060000 \times 10^{-6}$ |
|  | $N_6$ | $2.0050000 \times 10^{-8}$ | $N_8$ | $6.0610000 \times 10^{-10}$ |
| F-line | $N_2$ | $6.2230000 \times 10^{-4}$ | $N_4$ | $3.0630000 \times 10^{-6}$ |
|  | $N_6$ | $1.9260000 \times 10^{-8}$ | $N_8$ | $6.5990000 \times 10^{-10}$ |

TABLE 10

<3rd Embodiment>
Refractive Index Distribution Coefficients of GRIN3

| d-line | $N_2$ | $5.3330000 \times 10^{-4}$ | $N_4$ | $1.7470000 \times 10^{-7}$ |
|---|---|---|---|---|
|  | $N_6$ | $4.3040000 \times 10^{-9}$ | $N_8$ | $9.4280000 \times 10^{-12}$ |
| C-line | $N_2$ | $5.5110000 \times 10^{-4}$ | $N_4$ | $-7.0280000 \times 10^{-8}$ |
|  | $N_6$ | $5.5100000 \times 10^{-9}$ | $N_8$ | $7.3830000 \times 10^{-12}$ |
| F-line | $N_2$ | $4.8120000 \times 10^{-4}$ | $N_4$ | $8.2570000 \times 10^{-7}$ |
|  | $N_6$ | $1.1380000 \times 10^{-9}$ | $N_8$ | $1.5100000 \times 10^{-11}$ |

TABLE 11

<3rd Embodiment>
Values of Conditions (1), (13) to (15), and (26) to (33)

| | Gr1 | | Gr2 | | Gr3 | | Gr1, Gr2 |
|---|---|---|---|---|---|---|---|
| Condition (14) | 7.207 | Condition (14) | 0.707 | Condition (15) | 0.423 | Condition (13) | 0.339 |
| Condition (1) | 78.928 | Condition (1) | 4.199 | Condition (1) | 0.110 | | |
| Condition (26) | 1.480 | Condition (28) | -2.137 | Condition (30) | 0.451 | | |
| Condition (27) | 0.059 | Condition (29) | 0.400 | Condition (31) | 0.100 | | |
| Condition (32) | 0.383 | | | Condition (33) | 1.383 | | |

TABLE 12

<3rd Embodiment>
Values of Conditions (16) to (22)

Conditions (16) to (22)

| H | S1 | S2 | S3 | S4 | S5 | S6 |
|---|---|---|---|---|---|---|
| $0.0H_{max}$ | 0.000 | 0.000 | 0.000 | 0.000 | 0.000 | 0.000 |
| $0.1H_{max}$ | -0.011 | 0.009 | -0.008 | 0.000 | -0.020 | 0.003 |
| $0.2H_{max}$ | -0.046 | 0.037 | -0.030 | 0.000 | -0.070 | 0.006 |
| $0.3H_{max}$ | -0.107 | 0.085 | -0.068 | -0.001 | -0.130 | -0.014 |
| $0.4H_{max}$ | -0.199 | 0.156 | -0.120 | 0.000 | -0.181 | -0.080 |
| $0.5H_{max}$ | -0.329 | 0.256 | -0.189 | 0.004 | -0.219 | -0.204 |
| $0.6H_{max}$ | -0.512 | 0.390 | -0.275 | 0.014 | -0.269 | -0.373 |
| $0.7H_{max}$ | -0.771 | 0.567 | -0.379 | 0.032 | -0.385 | -0.547 |
| $0.8H_{max}$ | -1.139 | 0.799 | -0.499 | 0.064 | -0.609 | -0.703 |
| $0.9H_{max}$ | -1.673 | 1.099 | -0.633 | 0.111 | -0.829 | -1.023 |
| $1.0H_{max}$ | -2.458 | 1.487 | -0.780 | 0.174 | -0.330 | -2.477 |

TABLE 13

<1st Embodiment>
Values of Conditions (B), (23), (24) and (25)

| | Conditions (B), (24) | | | Conditions (23), (25) | | |
|---|---|---|---|---|---|---|
| H | Gr1 | Gr2 | Gr3 | Gr1 | Gr2 | Gr3 |
| $0.0H_{max}$ | 0.00000 | 0.00000 | 0.00000 | 0.000 | 0.000 | 0.000 |
| $0.1H_{max}$ | -0.00006 | -0.00006 | 0.00033 | -0.001 | -0.001 | 0.025 |
| $0.2H_{max}$ | -0.00013 | -0.00013 | 0.00054 | -0.003 | -0.002 | 0.096 |
| $0.3H_{max}$ | -0.00019 | -0.00019 | 0.00055 | -0.006 | -0.005 | 0.201 |
| $0.4H_{max}$ | -0.00027 | -0.00026 | 0.00037 | -0.010 | -0.009 | 0.310 |
| $0.5H_{max}$ | -0.00035 | -0.00034 | 0.00008 | -0.016 | -0.013 | 0.383 |
| $0.6H_{max}$ | -0.00044 | -0.00042 | -0.00016 | -0.024 | -0.019 | 0.401 |
| $0.7H_{max}$ | -0.00054 | -0.00051 | -0.00021 | -0.033 | -0.026 | 0.397 |
| $0.8H_{max}$ | -0.00066 | -0.00062 | -0.00011 | -0.043 | -0.035 | 0.416 |
| $0.9H_{max}$ | -0.00080 | -0.00075 | -0.00031 | -0.056 | -0.045 | 0.460 |
| $1.0H_{max}$ | -0.00096 | -0.00094 | -0.00210 | -0.071 | -0.056 | 0.397 |

TABLE 14

(4th Embodiment)

f = 38.9 to 75.5 to 133.0    FNO = 3.60 to 5.93 to 9.24

| Surface | | Radius of Curvature | Axial Distance | | GRIN1 Lens | | |
|---|---|---|---|---|---|---|---|
| {Gr1} | | | | | | | |
| S1* | r1 | 35.214 | | | | | |
| | | | d1 | 6.000 | GRIN1 | | |
| S2* | r2 | 182.059 | | | | | |
| | | | d2 | 4.902 to 17.320 to 25.192 | | | |
| {Gr2} | | | | | | | |
| S3* | r3 | -38.891 | | | | | |
| | | | d3 | 13.766 | GRIN2 | | |
| S4* | r4 | -14.094 | | | | | |
| | | | d4 | 20.034 to 9.260 to 3.229 | | | |
| | | | | | Refractive Index | | Abbe Number |
| {Gr3} | | | | | | | |
| S5* | r5 | -41.554 | | | | | |
| | | | d5 | 4.300 | N3 | 1.58340 | v3 30.23 |
| S6* | r6 | -21.599 | | | | | |
| | | | d6 | 3.100 | | | |
| S7 | r7 | -13.226 | | | | | |
| | | | d7 | 1.200 | N4 | 1.61800 | v4 63.39 |
| S8 | r8 | 208.332 | | | | | |
| | | | $\Sigma d$ = 53.301 to 54.946 to 56.787 | | | | |

TABLE 14-continued (4th Embodiment)

Aspherical Data

S1: $\epsilon =$ 1.0000
A4 = $-0.56592 \times 10^{-5}$
A6 = $-0.89214 \times 10^{-8}$
A8 = $-0.96609 \times 10^{-10}$
A10 = $0.99980 \times 10^{-14}$
A12 = $0.36852 \times 10^{-15}$
S2: $\epsilon =$ 1.0000
A4 = $-0.67805 \times 10^{-5}$
A6 = $-0.15083 \times 10^{-7}$
A8 = $-0.20319 \times 10^{-10}$
A10 = $0.71035 \times 10^{-13}$
A12 = $0.11265 \times 10^{-15}$
S3: $\epsilon =$ 1.0000
A4 = $-0.49905 \times 10^{-4}$
A6 = $0.45911 \times 10^{-7}$
A8 = $-0.56389 \times 10^{-8}$
A10 = $0.11205 \times 10^{-9}$
A12 = $-0.36621 \times 10^{-12}$
S4: $\epsilon =$ 1.0000
A4 = $-0.77066 \times 10^{-5}$
A6 = $-0.73209 \times 10^{-7}$
A8 = $-0.42058 \times 10^{-8}$
A10 = $0.14064 \times 10^{-10}$
A12 = $0.46336 \times 10^{-12}$
S5: $\epsilon =$ 1.0000
A4 = $0.21158 \times 10^{-4}$
A6 = $-0.63080 \times 10^{-6}$
A8 = $0.10295 \times 10^{-7}$
A10 = $-0.22328 \times 10^{-10}$
A12 = $-0.43167 \times 10^{-12}$
A14 = $0.13292 \times 10^{-14}$
A16 = $0.38291 \times 10^{-17}$
S6: $\epsilon =$ 1.0000
A4 = $-0.17555 \times 10^{-4}$
A6 = $-0.53307 \times 10^{-6}$
A8 = $0.56899 \times 10^{-8}$
A10 = $-0.32546 \times 10^{-10}$
A12 = $0.30347 \times 10^{-12}$
A14 = $-0.32467 \times 10^{-14}$
A16 = $0.88590 \times 10^{-17}$

TABLE 15

<4th Embodiment>
Refractive Index Distribution Coefficients of GRIN1

| | | | | |
|---|---|---|---|---|
| d-line | $N_2$ | $6.9828574 \times 10^{-4}$ | $N_4$ | $1.3376069 \times 10^{-6}$ |
| | $N_6$ | $2.9596931 \times 10^{-9}$ | $N_8$ | $-4.4988106 \times 10^{-12}$ |
| C-line | $N_2$ | $6.9062697 \times 10^{-4}$ | $N_4$ | $1.3470755 \times 10^{-6}$ |
| | $N_6$ | $2.7360468 \times 10^{-9}$ | $N_8$ | $-4.0896304 \times 10^{-12}$ |
| F-line | $N_2$ | $7.1657136 \times 10^{-4}$ | $N_4$ | $1.2800868 \times 10^{-6}$ |
| | $N_6$ | $3.8099888 \times 10^{-9}$ | $N_8$ | $-6.3554923 \times 10^{-12}$ |

TABLE 16

<4th Embodiment>
Refractive Index Distribution Coefficients of GRIN2

| | | | | |
|---|---|---|---|---|
| d-line | $N_2$ | $5.9657688 \times 10^{-4}$ | $N_4$ | $4.6736053 \times 10^{-6}$ |
| | $N_6$ | $3.3323203 \times 10^{-8}$ | $N_8$ | $7.2129725 \times 10^{-10}$ |
| C-line | $N_2$ | $5.8733003 \times 10^{-4}$ | $N_4$ | $4.6292227 \times 10^{-6}$ |
| | $N_6$ | $3.2388897 \times 10^{-8}$ | $N_8$ | $7.1484902 \times 10^{-10}$ |
| F-line | $N_2$ | $6.1738625 \times 10^{-4}$ | $N_4$ | $5.0191017 \times 10^{-6}$ |
| | $N_6$ | $2.6747748 \times 10^{-8}$ | $N_8$ | $8.4886287 \times 10^{-10}$ |

TABLE 17

<4th Embodiment>
Values of Conditions (1), (13) to (15), and (26) to (33)

| | Gr1 | | Gr2 | | Gr3 | Gr1, Gr2 |
|---|---|---|---|---|---|---|
| Condition (14) | 7.207 | Condition (14) | 0.707 | Condition (15) | — | Condition (13) 0.339 |
| Condition (1) | 142.495 | Condition (1) | 6.555 | Condition (1) | — | |
| Condition (26) | 1.480 | Condition (28) | -2.137 | Condition (30) | — | |
| Condition (27) | 0.059 | Condition (29) | 0.400 | Condition (31) | — | |
| Condition (32) | 0.383 | | | Condition (33) | 1.383 | |

TABLE 18

<4th Embodiment>
Values of Conditions (16) to (22)

| | Conditions (16) to (22) | | | | | |
|---|---|---|---|---|---|---|
| H | S1 | S2 | S3 | S4 | S5 | S6 |
| $0.0H_{max}$ | 0.000 | 0.000 | 0.000 | 0.000 | 0.000 | 0.000 |
| $0.1H_{max}$ | -0.003 | 0.004 | -0.005 | 0.001 | 0.004 | -0.005 |
| $0.2H_{max}$ | -0.014 | 0.018 | -0.019 | 0.006 | 0.014 | -0.024 |
| $0.3H_{max}$ | -0.032 | 0.041 | -0.043 | 0.013 | 0.020 | -0.065 |
| $0.4H_{max}$ | -0.060 | 0.075 | -0.076 | 0.024 | 0.024 | -0.130 |
| $0.5H_{max}$ | -0.101 | 0.122 | -0.120 | 0.040 | 0.049 | -0.205 |
| $0.6H_{max}$ | -0.161 | 0.185 | -0.174 | 0.064 | 0.123 | -0.268 |
| $0.7H_{max}$ | -0.251 | 0.268 | -0.239 | 0.098 | 0.223 | -0.333 |
| $0.8H_{max}$ | -0.385 | 0.374 | -0.314 | 0.144 | 0.189 | -0.543 |
| $0.9H_{max}$ | -0.586 | 0.510 | -0.397 | 0.200 | -0.227 | -1.127 |
| $1.0H_{max}$ | -0.880 | 0.680 | -0.477 | 0.257 | -0.538 | -1.545 |

TABLE 19

<4th Embodiment>
Values of Conditions (B), (23), (24) and (25)

| | Conditions (B), (24) | | Conditions (23), (25) | |
|---|---|---|---|---|
| H | Gr1 | Gr2 | Gr1 | Gr2 |
| $0.0H_{max}$ | 0.00000 | 0.00000 | 0.000 | 0.000 |
| $0.1H_{max}$ | -0.00007 | -0.00005 | -0.001 | 0.000 |
| $0.2H_{max}$ | -0.00014 | -0.00011 | -0.003 | -0.002 |
| $0.3H_{max}$ | -0.00020 | -0.00017 | -0.007 | -0.004 |
| $0.4H_{max}$ | -0.00026 | -0.00024 | -0.011 | -0.007 |
| $0.5H_{max}$ | -0.00032 | -0.00032 | -0.016 | -0.012 |
| $0.6H_{max}$ | -0.00039 | -0.00041 | -0.022 | -0.017 |
| $0.7H_{max}$ | -0.00048 | -0.00051 | -0.029 | -0.024 |
| $0.8H_{max}$ | -0.00060 | -0.00064 | -0.037 | -0.032 |
| $0.9H_{max}$ | -0.00077 | -0.00082 | -0.047 | -0.042 |
| $1.0H_{max}$ | -0.00100 | -0.00108 | -0.060 | -0.055 |

TABLE 20

(5th Embodiment)

f = 39.0 to 75.6 to 13.2    FNO = 3.60 to 5.76 to 8.73

| Surface | Radius of Curvature | Axial Distance | GRIN Lens |
|---|---|---|---|
| {Gr1} | | | |
| S1* | r1  19.236 | | |
| | | d1  3.376 | GRIN1 |
| S2* | r2  31.690 | | |
| | | d2  3.826 to 15.158 to 22.338 | |
| {Gr2} | | | |
| S3* | r3  −38.660 | | |
| | | d3  10.371 | GRIN2 |
| S4* | r4  −13.723 | | |
| | | d4  25.419 to 14.673 to 8.500 | |
| {Gr3} | | | |
| S5* | r5  −14.854 | | |
| | | d5  2.500 | GRIN3 |
| S6* | r6  −143.032 | | |

$\Sigma d = 45.492$ to $46.077$ to $47.084$

Aspherical Data

S1: $\epsilon = 1.0000$
  $A4 = -0.11101 \times 10^{-4}$
  $A6 = -0.31213 \times 10^{-7}$
  $A8 = -0.25714 \times 10^{-9}$
  $A10 = -0.21090 \times 10^{-11}$
  $A12 = -0.10704 \times 10^{-13}$
S2: $\epsilon = 1.0000$
  $A4 = -0.92959 \times 10^{-5}$
  $A6 = -0.70696 \times 10^{-7}$
  $A8 = -0.71400 \times 10^{-9}$
  $A10 = -0.25534 \times 10^{-11}$
  $A12 = 0.22470 \times 10^{-13}$
S3: $\epsilon = 1.0000$
  $A4 = -0.72892 \times 10^{-4}$
  $A6 = 0.18671 \times 10^{-6}$
  $A8 = -0.10447 \times 10^{-7}$
  $A10 = 0.21617 \times 10^{-9}$
  $A12 = -0.19349 \times 10^{-11}$
S4: $\epsilon = 1.000$
  $A4 = -0.79424 \times 10^{-5}$
  $A6 = -0.25155 \times 10^{-6}$
  $A8 = -0.19348 \times 10^{-8}$
  $A10 = -0.59649 \times 10^{-10}$
  $A12 = 0.11942 \times 10^{-11}$
S5: $\epsilon = 1.0000$
  $A4 = 0.14140 \times 10^{-3}$
  $A6 = -0.34045 \times 10^{-6}$
  $A8 = 0.16645 \times 10^{-8}$
  $A10 = -0.11636 \times 10^{-10}$
  $A12 = 0.53017 \times 10^{-13}$
S6: $\epsilon = 1.0000$
  $A4 = 0.33472 \times 10^{-5}$
  $A6 = -0.12069 \times 10^{-6}$
  $A8 = 0.44230 \times 10^{-9}$
  $A10 = -0.16035 \times 10^{-11}$
  $A12 = 0.31384 \times 10^{-14}$

TABLE 21

<5th Embodiment>
Refractive Index Distribution Coefficients of GRIN1

| d-line | $N_2$ | $8.2780000 \times 10^{-4}$ | $N_4$ | $2.7860000 \times 10^{-6}$ |
| | $N_6$ | $2.0290000 \times 10^{-8}$ | $N_8$ | $1.6150000 \times 10^{-10}$ |
| C-line | $N_2$ | $8.1310000 \times 10^{-4}$ | $N_4$ | $2.7690000 \times 10^{-6}$ |
| | $N_6$ | $1.9270000 \times 10^{-8}$ | $N_8$ | $1.6400000 \times 10^{-10}$ |

TABLE 21-continued

<5th Embodiment>
Refractive Index Distribution Coefficients of GRIN1

| F-line | $N_2$ | $8.5830000 \times 10^{-4}$ | $N_4$ | $2.9270000 \times 10^{-6}$ |
| | $N_6$ | $2.0320000 \times 10^{-8}$ | $N_8$ | $1.6960000 \times 10^{-10}$ |

TABLE 22

<5th Embodiment>
Refractive Index Distribution Coefficients of GRIN2

| d-line | $N_2$ | $8.9900000 \times 10^{-4}$ | $N_4$ | $5.5890000 \times 10^{-6}$ |
| | $N_6$ | $6.4640000 \times 10^{-8}$ | $N_8$ | $1.0290000 \times 10^{-9}$ |
| C-line | $N_2$ | $8.8630000 \times 10^{-4}$ | $N_4$ | $5.5230000 \times 10^{-6}$ |
| | $N_6$ | $6.3480000 \times 10^{-8}$ | $N_8$ | $1.0300000 \times 10^{-9}$ |
| F-line | $N_2$ | $9.3140000 \times 10^{-4}$ | $N_4$ | $5.6930000 \times 10^{-6}$ |
| | $N_6$ | $6.9370000 \times 10^{-8}$ | $N_8$ | $1.0040000 \times 10^{-9}$ |

TABLE 23

<5th Embodiment>
Refractive Index Distribution Coefficients of GRIN3

| d-line | $N_2$ | $1.4040000 \times 10^{-3}$ | $N_4$ | $-1.3770000 \times 10^{-7}$ |
| | $N_6$ | $1.9750000 \times 10^{-9}$ | $N_8$ | $-1.5970000 \times 10^{-11}$ |
| C-line | $N_2$ | $1.4240000 \times 10^{-3}$ | $N_4$ | $-4.0950000 \times 10^{-7}$ |
| | $N_6$ | $3.3610000 \times 10^{-9}$ | $N_8$ | $-1.8450000 \times 10^{-11}$ |
| F-line | $N_2$ | $1.3470000 \times 10^{-3}$ | $N_4$ | $6.3620000 \times 10^{-7}$ |
| | $N_6$ | $-1.6410000 \times 10^{-9}$ | $N_8$ | $-1.0150000 \times 10^{-11}$ |

TABLE 24

<5th Embodiment>
Values of Conditions (1), (13) to (15), and (26) to (33)

| | Gr1 | | Gr2 | | Gr3 | | Gr1, Gr2 | |
|---|---|---|---|---|---|---|---|---|
| Condition (14) | 5.620 | Condition (14) | 1.328 | Condition (15) | 0.963 | Condition (13) | 0.466 |
| Condition (1) | 128.415 | Condition (1) | 12.190 | Condition (1) | 0.065 | | |
| Condition (26) | 4.089 | Condition (28) | −2.101 | Condition (30) | 1.232 | | |
| Condition (27) | 0.041 | Condition (29) | 0.270 | Condition (31) | 0.095 | | |
| Condition (32) | 0.473 | | | Condition (33) | 1.488 | | |

TABLE 25

<5th Embodiment>
Values of Conditions (16) to (22)

| | Conditions (16) to (22) | | | | | |
|---|---|---|---|---|---|---|
| H | S1 | S2 | S3 | S4 | S5 | S6 |
| $0.0H_{max}$ | 0.000 | 0.000 | 0.000 | 0.000 | 0.000 | 0.000 |
| $0.1H_{max}$ | −0.004 | 0.004 | −0.008 | 0.002 | −0.034 | 0.000 |
| $0.2H_{max}$ | −0.017 | 0.015 | −0.032 | 0.007 | −0.125 | −0.002 |
| $0.3H_{max}$ | −0.038 | 0.038 | −0.072 | 0.017 | −0.248 | −0.015 |
| $0.4H_{max}$ | −0.069 | 0.077 | −0.128 | 0.034 | −0.374 | −0.054 |
| $0.5H_{max}$ | −0.112 | 0.143 | −0.199 | 0.058 | −0.474 | −0.132 |
| $0.6H_{max}$ | −0.176 | 0.255 | −0.287 | 0.094 | −0.513 | −0.265 |
| $0.7H_{max}$ | −0.280 | 0.441 | −0.393 | 0.145 | −0.465 | −0.464 |

TABLE 25-continued

<5th Embodiment>
Values of Conditions (16) to (22)

Conditions (16) to (22)

| H | S1 | S2 | S3 | S4 | S5 | S6 |
|---|---|---|---|---|---|---|
| $0.8H_{max}$ | -0.462 | 0.746 | -0.517 | 0.215 | -0.368 | -0.688 |
| $0.9H_{max}$ | -0.803 | 1.230 | -0.661 | 0.304 | -0.418 | -0.711 |
| $1.0H_{max}$ | -1.469 | 1.965 | -0.830 | 0.405 | -0.421 | 0.166 |

TABLE 26

<5th Embodiment>
Values of Conditions (B), (23), (24) and (25)

| | Conditions (B), (24) | | | Conditions (23), (25) | | |
|---|---|---|---|---|---|---|
| H | Gr1 | Gr2 | Gr3 | Gr1 | Gr2 | Gr3 |
| $0.0H_{max}$ | 0.00000 | 0.00000 | 0.00000 | 0.000 | 0.000 | 0.000 |
| $0.1H_{max}$ | -0.00012 | -0.00038 | 0.00038 | -0.002 | -0.001 | 0.031 |
| $0.2H_{max}$ | -0.00025 | -0.00015 | 0.00062 | -0.006 | -0.002 | 0.120 |
| $0.3H_{max}$ | -0.00039 | -0.00023 | 0.00064 | -0.014 | -0.005 | 0.257 |
| $0.4H_{max}$ | -0.00055 | -0.00031 | 0.00042 | -0.025 | -0.009 | 0.406 |
| $0.5H_{max}$ | -0.00073 | -0.00041 | 0.00006 | -0.040 | -0.014 | 0.511 |
| $0.6H_{max}$ | -0.00096 | -0.00051 | -0.00026 | -0.058 | -0.021 | 0.542 |
| $0.7H_{max}$ | -0.00125 | -0.00063 | -0.00035 | -0.080 | -0.028 | 0.532 |
| $0.8H_{max}$ | -0.00164 | -0.00077 | -0.00018 | -0.106 | -0.037 | 0.537 |
| $0.9H_{max}$ | -0.00217 | -0.00095 | -0.00011 | -0.136 | -0.048 | 0.576 |
| $1.0H_{max}$ | -0.00291 | -0.00115 | -0.00134 | -0.171 | -0.060 | 0.532 |

TABLE 27

(6th Embodiment)

f = 39.0 to 75.3 to 132.2    FNO = 3.60 to 5.84 to 9.26

| Surface | Radius of Curvature | Axial Distance | GRIN Lens |
|---|---|---|---|
| {Gr1} | | | |
| S1* | r1   19.763 | | |
| | | d1   4.546 | GRIN1 |
| S2* | r2   28.143 | | |
| | | d2   1.000 to 17.320 to 25.192 | |
| {Gr2} | | | |
| S3* | r3   -54.468 | | |
| | | d3   13.000 | GRIN2 |
| S4* | r4   -14.545 | | |
| | | d4   25.348 to 14.551 to 8.520 | |
| {Gr3} | | | |
| S5* | r5   -20.519 | | |
| | | d5   1.107 | GRIN3 |
| S6* | r6   68.036 | | |
| | | Σd = 45.000 to 50.523 to 52.365 | |

Aspherical Data

S1: ε = 1.0000
A4 = -0.14605 × 10⁻⁴
A6 = -0.38770 × 10⁻⁷
A8 = -0.20976 × 10⁻⁹
A10 = -0.85100 × 10⁻¹²
A12 = -0.56174 × 10⁻¹⁴
S2: ε = 1.0000
A4 = -0.12474 × 10⁻⁴
A6 = -0.46235 × 10⁻⁷
A8 = -0.40022 × 10⁻⁹
A10 = -0.32334 × 10⁻¹¹
A12 = 0.14197 × 10⁻¹³

TABLE 27-continued (6th Embodiment)

S3: ε = 1.0000
A4 = -0.72911 × 10⁻⁴
A6 = 0.94527 × 10⁻⁷
A8 = -0.92016 × 10⁻⁸
A10 = 0.17892 × 10⁻⁹
A12 = -0.92520 × 10⁻¹²
S4: ε = 1.0000
A4 = 0.57695 × 10⁻⁵
A6 = -0.47917 × 10⁻⁷
A8 = -0.54778 × 10⁻⁸
A10 = 0.24387 × 10⁻¹¹
A12 = 0.64533 × 10⁻¹²
S5: ε = 1.0000
A4 = 0.37359 × 10⁻⁴
A6 = -0.38061 × 10⁻⁶
A8 = 0.22097 × 10⁻⁸
A10 = 0.30354 × 10⁻¹¹
A12 = -0.29399 × 10⁻¹³
S6: ε = 1.0000
A4 = -0.45821 × 10⁻⁴
A6 = -0.58353 × 10⁻⁷
A8 = 0.69408 × 10⁻⁹
A10 = -0.11103 × 10⁻¹¹
A12 = -0.11518 × 10⁻¹⁴

S3: $\epsilon = 1.0000$
$A4 = -0.72911 \times 10^{-4}$
$A6 = 0.94527 \times 10^{-7}$
$A8 = -0.92016 \times 10^{-8}$
$A10 = 0.17892 \times 10^{-9}$
$A12 = -0.92520 \times 10^{-12}$

TABLE 28

<6th Embodiment>
Refractive Index Distribution Coefficients of GRIN1

| | | | | |
|---|---|---|---|---|
| d-line | $N_2$ | $7.2620000 \times 10^{-4}$ | $N_4$ | $1.0510000 \times 10^{-6}$ |
| | $N_6$ | $5.0860000 \times 10^{-9}$ | $N_8$ | $4.0210000 \times 10^{-12}$ |
| C-line | $N_2$ | $7.1650000 \times 10^{-4}$ | $N_4$ | $1.0520000 \times 10^{-6}$ |
| | $N_6$ | $4.6500000 \times 10^{-9}$ | $N_8$ | $6.3210000 \times 10^{-12}$ |
| F-line | $N_2$ | $7.4450000 \times 10^{-4}$ | $N_4$ | $1.1580000 \times 10^{-6}$ |
| | $N_6$ | $3.9990000 \times 10^{-9}$ | $N_8$ | $1.0270000 \times 10^{-11}$ |

TABLE 29

<6th Embodiment>
Refractive Index Distribution Coefficients of GRIN2

| | | | | |
|---|---|---|---|---|
| d-line | $N_2$ | $6.5760000 \times 10^{-4}$ | $N_4$ | $2.6310000 \times 10^{-6}$ |
| | $N_6$ | $2.0490000 \times 10^{-8}$ | $N_8$ | $7.1490000 \times 10^{-10}$ |
| C-line | $N_2$ | $6.4800000 \times 10^{-4}$ | $N_4$ | $2.5220000 \times 10^{-6}$ |
| | $N_6$ | $2.3820000 \times 10^{-8}$ | $N_8$ | $6.4880000 \times 10^{-10}$ |
| F-line | $N_2$ | $6.8390000 \times 10^{-4}$ | $N_4$ | $2.7040000 \times 10^{-6}$ |
| | $N_6$ | $2.2690000 \times 10^{-8}$ | $N_8$ | $7.0530000 \times 10^{-10}$ |

TABLE 30

<6th Embodiment>
Refractive Index Distribution Coefficients of GRIN3

| | | | | |
|---|---|---|---|---|
| d-line | $N_2$ | $6.5780000 \times 10^{-4}$ | $N_4$ | $1.6270000 \times 10^{-7}$ |
| | $N_6$ | $5.3300000 \times 10^{-9}$ | $N_8$ | $-1.1430000 \times 10^{-13}$ |
| C-line | $N_2$ | $6.9200000 \times 10^{-4}$ | $N_4$ | $-4.3630000 \times 10^{-7}$ |
| | $N_6$ | $9.1100000 \times 10^{-9}$ | $N_8$ | $-8.2220000 \times 10^{-12}$ |
| F-line | $N_2$ | $5.5080000 \times 10^{-4}$ | $N_4$ | $1.7590000 \times 10^{-6}$ |
| | $N_6$ | $-3.2560000 \times 10^{-9}$ | $N_8$ | $1.5890000 \times 10^{-11}$ |

TABLE 31

<6th Embodiment>
Values of Conditions (1), (13) to (15), and (26) to (33)

| | Gr1 | | Gr2 | | Gr3 | | Gr1, Gr2 |
|---|---|---|---|---|---|---|---|
| Condition (14) | 11.705 | Condition (14) | 0.752 | Condition (15) | 0.556 | Condition (13) | 0.266 |
| Condition (1) | 273.034 | Condition (1) | 3.437 | Condition (1) | 0.116 | | |
| Condition (26) | 5.717 | Condition (28) | −1.729 | Condition (30) | 0.537 | | |
| Condition (27) | 0.036 | Condition (29) | 0.385 | Condition (31) | 0.038 | | |
| Condition (32) | 0.307 | | | Condition (33) | 1.340 | | |

TABLE 32

<6th Embodiment>
Values of Conditions (16) to (22)

Conditions (16) to (22)

| H | S1 | S2 | S3 | S4 | S5 | S6 |
|---|---|---|---|---|---|---|
| $0.0H_{max}$ | 0.000 | 0.000 | 0.000 | 0.000 | 0.000 | 0.000 |
| $0.1H_{max}$ | −0.012 | 0.008 | −0.007 | 0.000 | −0.009 | −0.019 |
| $0.2H_{max}$ | −0.047 | 0.034 | −0.028 | 0.000 | −0.031 | −0.078 |
| $0.3H_{max}$ | −0.108 | 0.079 | −0.063 | 0.000 | −0.050 | −0.181 |
| $0.4H_{max}$ | −0.195 | 0.149 | −0.112 | 0.001 | −0.056 | −0.325 |
| $0.5H_{max}$ | −0.314 | 0.253 | −0.176 | 0.006 | −0.057 | −0.496 |
| $0.6H_{max}$ | −0.478 | 0.409 | −0.256 | 0.018 | −0.089 | −0.664 |
| $0.7H_{max}$ | −0.713 | 0.649 | −0.353 | 0.040 | −0.204 | −0.793 |
| $0.8H_{max}$ | −1.070 | 1.022 | −0.468 | 0.077 | −0.418 | −0.910 |
| $0.9H_{max}$ | −1.652 | 1.604 | −0.595 | 0.132 | −0.554 | −1.269 |
| $1.0H_{max}$ | −2.660 | 2.501 | −0.727 | 0.198 | 0.186 | −2.618 |

TABLE 33

<6th Embodiment>
Values of Conditions (B), (23), (24) and (25)

| | Conditions (B), (24) | | | Conditions (23), (25) | | |
|---|---|---|---|---|---|---|
| H | Gr1 | Gr2 | Gr3 | Gr1 | Gr2 | Gr3 |
| $0.0H_{max}$ | 0.00000 | 0.00000 | 0.00000 | 0.000 | 0.000 | 0.000 |
| $0.1H_{max}$ | −0.00008 | −0.00006 | 0.00063 | −0.001 | 0.000 | 0.045 |
| $0.2H_{max}$ | −0.00015 | −0.00013 | 0.00099 | −0.003 | −0.002 | 0.181 |
| $0.3H_{max}$ | −0.00024 | −0.00019 | 0.00093 | −0.008 | −0.004 | 0.397 |
| $0.4H_{max}$ | −0.00033 | −0.00026 | 0.00048 | −0.014 | −0.008 | 0.616 |
| $0.5H_{max}$ | −0.00043 | −0.00034 | −0.00015 | −0.022 | −0.013 | 0.697 |
| $0.6H_{max}$ | −0.00055 | −0.00042 | −0.00060 | −0.032 | −0.018 | 0.611 |
| $0.7H_{max}$ | −0.00067 | −0.00051 | −0.00055 | −0.044 | −0.025 | 0.498 |
| $0.8H_{max}$ | −0.00080 | −0.00061 | −0.00014 | −0.057 | −0.033 | 0.475 |
| $0.9H_{max}$ | −0.00097 | −0.00074 | −0.00053 | −0.072 | −0.042 | 0.504 |
| $1.0H_{max}$ | −0.00118 | −0.00091 | −0.00493 | −0.090 | −0.053 | 0.252 |

TABLE 34

(7th Embodiment)

f = 38.9 to 75.5 to 133.2   FNO = 3.60 to 5.79 to 8.94

| Surface | Radius of Curvature | | Axial Distance | | GRIN Lens |
|---|---|---|---|---|---|
| {Gr1} | | | | | |
| S1* | r1 | 17.338 | | | |
| | | | d1 | 2.723 | GRIN1 |
| S2* | r2 | 29.975 | | | |
| | | | d2 | 2.364 to 11.673 to 17.187 | |
| {Gr2} | | | | | |
| S3* | r3 | −28.504 | | | |
| | | | d3 | 8.473 | GRIN2 |
| S4* | r4 | −12.202 | | | |
| | | | d4 | 23.204 to 13.876 to 8.500 | |
| {Gr3} | | | | | |
| S5* | r5 | −13.226 | | | |
| | | | d5 | 2.500 | GRIN3 |
| S6* | r6 | −77.123 | | | |

Σd = 39.264 to 39.244 to 39.382

Aspherical Data

S1: $\epsilon$ = 1.0000
  A4 = −0.82445 × $10^{-5}$
  A6 = −0.58420 × $10^{-7}$
  A8 = −0.66920 × $10^{-9}$
  A10 = −0.77340 × $10^{-11}$
  A12 = −0.74900 × $10^{-13}$
S2: $\epsilon$ = 1.0000
  A4 = −0.89565 × $10^{-5}$
  A6 = −0.11364 × $10^{-6}$
  A8 = −0.14265 × $10^{-8}$
  A10 = −0.79825 × $10^{-11}$
  A12 = 0.15285 × $10^{-13}$
S3: $\epsilon$ = 1.0000
  A4 = −0.92407 × $10^{-4}$
  A6 = 0.12823 × $10^{-6}$
  A8 = −0.10094 × $10^{-7}$
  A10 = 0.35499 × $10^{-9}$
  A12 = −0.57203 × $10^{-11}$
S4: $\epsilon$ = 1.0000
  A4 = −0.88335 × $10^{-5}$
  A6 = −0.32982 × $10^{-6}$
  A8 = −0.58897 × $10^{-8}$
  A10 = −0.18343 × $10^{-9}$
  A12 = 0.31830 × $10^{-11}$
S5: $\epsilon$ = 1.0000
  A4 = 0.16591 × $10^{-3}$
  A6 = −0.74943 × $10^{-6}$
  A8 = 0.45270 × $10^{-8}$
  A10 = −0.25022 × $10^{-10}$
  A12 = 0.10431 × $10^{-12}$
S6: $\epsilon$ = 1.0000
  A4 = −0.46558 × $10^{-4}$
  A6 = 0.10056 × $10^{-6}$
  A8 = −0.24196 × $10^{-9}$
  A10 = 0.22951 × $10^{-12}$
  A12 = 0.10685 × $10^{-14}$

TABLE 35

<7th Embodiment>
Refractive Index Distribution Coefficients of GRIN1

| | | | | |
|---|---|---|---|---|
| d-line | $N_2$ | 8.7183313 × $10^{-4}$ | $N_4$ | 5.0578397 × $10^{-6}$ |
| | $N_6$ | 4.6270523 × $10^{-8}$ | $N_8$ | 3.5120360 × $10^{-10}$ |
| C-line | $N_2$ | 8.4918329 × $10^{-4}$ | $N_4$ | 5.0139883 × $10^{-6}$ |
| | $N_6$ | 4.4010744 × $10^{-8}$ | $N_8$ | 3.5099539 × $10^{-10}$ |

TABLE 35-continued

<7th Embodiment>
Refractive Index Distribution Coefficients of GRIN1

| F-line | $N_2$ | $9.1242012 \times 10^{-4}$ | $N_4$ | $5.4899383 \times 10^{-6}$ |
|---|---|---|---|---|
|  | $N_6$ | $4.3686896 \times 10^{-8}$ | $N_8$ | $3.9752244 \times 10^{-10}$ |

TABLE 36

<7th Embodiment>
Refractive Index Distribution Coefficients of GRIN2

| d-line | $N_2$ | $1.2406871 \times 10^{-3}$ | $N_4$ | $9.7227424 \times 10^{-6}$ |
|---|---|---|---|---|
|  | $N_6$ | $8.8371284 \times 10^{-8}$ | $N_8$ | $3.9395622 \times 10^{-9}$ |
| C-line | $N_2$ | $1.2259353 \times 10^{-3}$ | $N_4$ | $9.5783434 \times 10^{-6}$ |
|  | $N_6$ | $8.8869189 \times 10^{-8}$ | $N_8$ | $3.8829297 \times 10^{-9}$ |
| F-line | $N_2$ | $1.2825405 \times 10^{-3}$ | $N_4$ | $9.9520197 \times 10^{-6}$ |
|  | $N_6$ | $9.0031109 \times 10^{-8}$ | $N_8$ | $4.0624904 \times 10^{-9}$ |

TABLE 37

<7th Embodiment>
Refractive Index Distribution Coefficients of GRIN3

| d-line | $N_2$ | $2.4899355 \times 10^{-3}$ | $N_4$ | $2.1553868 \times 10^{-7}$ |
|---|---|---|---|---|
|  | $N_6$ | $-5.5843600 \times 10^{-9}$ | $N_8$ | $-7.8721214 \times 10^{-11}$ |
| C-line | $N_2$ | $2.5023585 \times 10^{-3}$ | $N_4$ | $-3.4320938 \times 10^{-8}$ |
|  | $N_6$ | $-3.9398350 \times 10^{-9}$ | $N_8$ | $-8.2440727 \times 10^{-11}$ |
| F-line | $N_2$ | $2.4321654 \times 10^{-3}$ | $N_4$ | $1.0907644 \times 10^{-6}$ |
|  | $N_6$ | $-9.8692456 \times 10^{-9}$ | $N_8$ | $-7.1862672 \times 10^{-11}$ |

TABLE 38

<7th Embodiment>
Values of Conditions (1), (13) to (15), and (26) and (33)

| Gr1 | | Gr2 | | Gr3 | | Gr1, Gr2 | |
|---|---|---|---|---|---|---|---|
| Condition (14) | 3.464 | Condition (14) | 1.984 | Condition (15) | 1.243 | Condition (13) | 0.634 |
| Condition (1) | 79.829 | Condition (1) | 24.863 | Condition (1) | 0.054 | | |
| Condition (26) | 3.744 | Condition (28) | −2.497 | Condition (30) | 1.414 | | |
| Condition (27) | 0.043 | Condition (29) | 0.212 | Condition (31) | 0.112 | | |
| Condition (32) | 0.617 | | | Condition (33) | 1.741 | | |

TABLE 39

<7th Embodiment>
Values of Conditions (16) to (22)

| H | S1 | S2 | S3 | S4 | S5 | S6 |
|---|---|---|---|---|---|---|
| $0.0H_{max}$ | 0.000 | 0.000 | 0.000 | 0.000 | 0.000 | 0.000 |
| $0.1H_{max}$ | −0.001 | 0.003 | −0.009 | 0.002 | −0.023 | −0.014 |
| $0.2H_{max}$ | −0.006 | 0.011 | −0.036 | 0.010 | −0.083 | −0.056 |
| $0.3H_{max}$ | −0.014 | 0.029 | −0.080 | 0.025 | −0.160 | −0.124 |
| $0.4H_{max}$ | −0.030 | 0.065 | −0.142 | 0.049 | −0.230 | −0.217 |
| $0.5H_{max}$ | −0.062 | 0.134 | −0.222 | 0.087 | −0.267 | −0.330 |
| $0.6H_{max}$ | −0.130 | 0.266 | −0.318 | 0.147 | −0.247 | −0.455 |
| $0.7H_{max}$ | −0.282 | 0.515 | −0.024 | 0.240 | −0.144 | −0.578 |

TABLE 39-continued

<7th Embodiment>
Values of Conditions (16) to (22)

| H | S1 | S2 | S3 | S4 | S5 | S6 |
|---|---|---|---|---|---|---|
| $0.8H_{max}$ | −0.629 | 0.979 | −0.563 | 0.374 | 0.055 | −0.664 |
| $0.9H_{max}$ | −1.422 | 1.832 | −0.715 | 0.550 | 0.343 | −0.644 |
| $1.0H_{max}$ | −3.295 | 3.401 | −0.902 | 0.743 | 0.838 | −0.385 |

TABLE 40

<7th Embodiment>
Values of Conditions (B), (23), (24) and (25)

| | Conditions (B), (24) | | | Conditions (23), (25) | | |
|---|---|---|---|---|---|---|
| H | Gr1 | Gr2 | Gr3 | Gr1 | Gr2 | Gr3 |
| $0.0H_{max}$ | 0.00000 | 0.00000 | 0.00000 | 0.000 | 0.000 | 0.000 |
| $0.1H_{max}$ | −0.00018 | −0.00009 | 0.00034 | −0.002 | −0.001 | 0.026 |
| $0.2H_{max}$ | −0.00037 | −0.00019 | 0.00057 | −0.010 | −0.003 | 0.104 |
| $0.3H_{max}$ | −0.00059 | −0.00029 | 0.00062 | −0.022 | −0.006 | 0.225 |
| $0.4H_{max}$ | −0.00085 | −0.00040 | 0.00047 | −0.040 | −0.011 | 0.366 |
| $0.5H_{max}$ | −0.00117 | −0.00052 | 0.00017 | −0.063 | −0.017 | 0.489 |
| $0.6H_{max}$ | −0.00159 | −0.00067 | −0.00015 | −0.093 | −0.025 | 0.562 |
| $0.7H_{max}$ | −0.00217 | −0.00084 | −0.00036 | −0.128 | −0.035 | 0.585 |
| $0.8H_{max}$ | −0.00303 | −0.00106 | −0.00034 | −0.171 | −0.046 | 0.589 |
| $0.9H_{max}$ | −0.00435 | −0.00137 | −0.00019 | −0.222 | −0.059 | 0.594 |
| $1.0H_{max}$ | −0.00649 | −0.00182 | −0.00042 | −0.281 | −0.076 | 0.571 |

TABLE 41

Construction Data of 8th Embodiment

FL = 38.9 to 75.5 to 133.2  Fno. = 3.60 to 6.07 to 9.75

| | Radius of Curvature | | Axial Distance | Refractive Index (Nd) | Abbe Number (vd) |
|---|---|---|---|---|---|
| r1* | 23.088 | T1 | 5.000 | GRIN1 | |
| r2* | 40.656 | T2 | 5.758 to 16.265 to 22.316 | | |
| R3* | −45.300 | T3 | 13.648 | GRIN2 | |
| r4* | −14.030 | T4 | 19.841 to 9.212 to 3.500 | | |
| r5* | −21.139 | T5 | 3.500 | 1.58340 | 30.23 |
| r6* | −17.534 | T6 | 2.630 | | |
| r7 | −16.607 | T7 | 1.500 | 1.61800 | 63.39 |
| r8 | 160.538 | | | | |

Aspherical Coefficients

| | r1 | r2 | r3 |
|---|---|---|---|
| $\epsilon$ | 1.00000 | 1.00000 | 1.00000 |
| A4 | −0.65100E − 05 | −0.68302E − 05 | −0.56550E − 04 |
| A6 | −0.16131E − 07 | −0.19212E − 07 | 0.38336E − 07 |
| A8 | −0.11855E − 09 | −0.10363E − 09 | −0.44156E − 08 |
| A10 | −0.13852E − 13 | −0.91008E − 12 | 0.14054E − 09 |
| A12 | −0.45902E − 14 | −0.26591E − 14 | −0.97367E − 12 |

| | r4 | r5 | r6 |
|---|---|---|---|
| $\epsilon$ | 1.00000 | 1.00000 | 1.00000 |
| A4 | −0.62875E − 05 | 0.28389E − 04 | 0.38741E − 05 |
| A6 | −0.14073E − 06 | −0.67309E − 06 | −0.40480E − 06 |
| A8 | −0.42397E − 08 | 0.99627E − 08 | 0.53112E − 08 |
| A10 | 0.23570E − 10 | −0.22750E − 10 | −0.33483E − 10 |
| A12 | 0.59092E − 13 | −0.42019E − 12 | 0.31153E − 12 |
| A14 | | 0.15142E − 14 | −0.30641E − 14 |
| A16 | | 0.60271E − 17 | 0.11333E − 16 |

*represents an aspherical surface.

TABLE 42

Construction Data of 9th Embodiment

FL = 38.9 to 75.5 to 133.0    Fno. = 3.60 to 5.93 to 9.24

| | Radius of Curvature | | Axial Distance | Refractive Index (Nd) | Abbe Number (vd) |
|---|---|---|---|---|---|
| r1* | 35.214 | T1 | 6.000 | GRIN1 | |
| r2* | 182.059 | T2 | 4.902 to 17.320 to 25.192 | | |
| r3* | −38.891 | T3 | 13.766 | GRIN2 | |
| r4* | −14.094 | T4 | 20.034 to 9.260 to 3.229 | | |
| r5* | −41.554 | T5 | 4.300 | 1.58340 | 30.23 |
| r6* | −21.599 | T6 | 3.100 | | |
| r7 | −13.226 | T7 | 1.200 | 1.61800 | 63.39 |
| r8 | 208.332 | | | | |

Aspherical Coefficients

| | r1 | r2 | r3 |
|---|---|---|---|
| ε | 1.00000 | 1.00000 | 1.00000 |
| A4 | −0.56592E − 05 | −0.67805E − 05 | −0.49905E − 04 |
| A6 | −0.89214E − 08 | −0.15083E − 07 | 0.45911E − 07 |
| A8 | −0.96609E − 10 | −0.20319E − 10 | −0.56389E − 08 |
| A10 | 0.99980E − 14 | 0.71035E − 13 | 0.11205E − 09 |
| A12 | 0.36852E − 15 | 0.11265E − 15 | −0.36621E − 12 |

| | r4 | r5 | r6 |
|---|---|---|---|
| ε | 1.00000 | 1.00000 | 1.00000 |
| A4 | −0.77066E − 05 | 0.21158E − 04 | −0.17555E − 04 |
| A6 | −0.73209E − 07 | −0.63080E − 06 | −0.53307E − 06 |
| A8 | −0.42058E − 08 | 0.10295E − 07 | 0.56899E − 08 |
| A10 | 0.14064E − 10 | −0.22328E − 10 | −0.32546E − 10 |
| A12 | 0.46336E − 12 | −0.43167E − 12 | 0.30347E − 12 |
| A14 | | 0.13292E − 14 | −0.32467E − 14 |
| A16 | | 0.38291E − 17 | 0.88590E − 17 |

*represents an aspherical surface.

TABLE 43

Construction Data of 11th Embodiment

FL = 38.9 to 75.5 to 133.2    Fno. = 3.60 to 5.70 to 9.25

| | Radius of Curvature | | Axial Distance | Refractive Index (Nd) | Abbe Number (vd) |
|---|---|---|---|---|---|
| r1* | 18.212 | T1 | 5.000 | GRIN1 | |
| r2* | 28.745 | T2 | 2.650 to 14.641 to 22.015 | | |
| r3* | −46.593 | T3 | 10.382 | GRIN2 | |
| r4* | −14.528 | T4 | 22.803 to 12.148 to 6.000 | | |
| r5* | −15.033 | T5 | 3.500 | 1.58340 | 30.23 |
| r6* | −14.233 | T6 | 1.000 | | |
| r7 | −14.245 | T7 | 1.500 | 1.61800 | 63.39 |
| r8 | −219.931 | | | | |

Aspherical Coefficients

| | r1 | r2 | r3 |
|---|---|---|---|
| ε | 1.00000 | 1.00000 | 1.00000 |
| A4 | −0.67519E − 05 | −0.38682E − 05 | −0.77517E − 04 |
| A6 | 0.49844E − 08 | −0.43815E − 08 | 0.36765E − 06 |
| A8 | −0.12223E − 09 | −0.44936E − 09 | −0.14696E − 07 |
| A10 | −0.79919E − 12 | −0.46616E − 11 | 0.37847E − 09 |
| A12 | −0.16350E − 14 | 0.45077E − 13 | −0.43081E − 11 |

| | r4 | r5 | r6 |
|---|---|---|---|
| ε | 1.00000 | 1.00000 | 1.00000 |
| A4 | −0.51638E − 05 | 0.40782E − 04 | −0.66214E − 05 |
| A6 | −0.64961E − 06 | 0.39978E − 06 | 0.40316E − 06 |
| A8 | 0.36638E − 08 | 0.27107E − 08 | −0.24387E − 08 |
| A10 | 0.74740E − 10 | −0.60168E − 10 | 0.91266E − 11 |
| A12 | −0.21000E − 11 | −0.96360E − 13 | 0.23712E − 12 |

TABLE 43-continued

Construction Data of 11th Embodiment

| | | |
|---|---|---|
| A14 | 0.34222E − 14 | −0.43202E − 14 |
| A16 | −0.82038E − 17 | 0.11714E − 16 |

*represents an aspherical surface.

TABLE 44

Construction Data of 11th Embodiment

FL = 38.9 to 75.5 to 133.2    Fno. = 3.60 to 5.70 to 9.25

| | Radius of Curvature | | Axial Distance | Refractive Index (Nd) | Abbe Number (vd) |
|---|---|---|---|---|---|
| r1* | 18.212 | T1 | 5.000 | GRIN1 | |
| r2* | 28.745 | T2 | 2.650 to 14.641 to 22.015 | | |
| r3* | −46.593 | T3 | 10.382 | GRIN2 | |
| r4* | −14.528 | T4 | 22.803 to 12.148 to 6.000 | | |
| r5* | −15.033 | T5 | 3.500 | 1.58340 | 30.23 |
| r6* | −14.233 | T6 | 1.000 | | |
| r7 | −14.245 | T7 | 1.500 | 1.61800 | 63.39 |
| 48 | −219.931 | | | | |

Aspherical Coefficients

| | r1 | r2 | r3 |
|---|---|---|---|
| ε | 1.00000 | 1.00000 | 1.00000 |
| A4 | −0.67519E−05 | −0.38682E−05 | −0.77517E−04 |
| A6 | 0.49844E−08 | −0.43815E−08 | 0.36765E−06 |
| A8 | −0.12223E−09 | −0.44936E−09 | −0.14696E−07 |
| A10 | −0.79919E−12 | −0.46616E−11 | 0.37847E−09 |
| A12 | −0.16350E−14 | 0.45077E−13 | −0.43081E−11 |

| | r4 | r5 | r6 |
|---|---|---|---|
| ε | 1.00000 | 1.00000 | 1.00000 |
| A4 | −0.51638E−05 | 0.40782E−04 | −0.66214E−05 |
| A6 | −0.64961E−06 | 0.39978E−06 | 0.40316E−06 |
| A8 | 0.36638E−08 | 0.27107E−08 | −0.24387E−08 |
| A10 | 0.74740E−10 | −0.60168E−10 | 0.91266E−11 |
| A12 | −0.21000E−11 | −0.96360E−13 | 0.23712E−12 |
| A14 | | 0.34222E−14 | −0.43202E−14 |
| A16 | | −0.82038E−17 | 0.11714E−16 |

*represents an aspherical surface.

TABLE 45

Glass Data of 8th Embodiment

| | d-line | C-line | F-line |
|---|---|---|---|
| GRIN1 | | | |
| N0 | 1.77250 | 1.76781 | 1.78333 |
| N1 | 6.96787770E − 04 | 6.87478270E − 04 | 7.16735070E − 04 |
| N2 | 1.40994150E − 06 | 1.41452000E − 06 | 1.50196140E − 06 |
| N3 | 4.79839160E − 09 | 4.38143090E − 09 | 3.55766240E − 09 |
| N4 | −6.75773490E − 12 | −5.77962250E − 12 | 3.66668180E − 12 |
| GRIN2 | | | |
| N0 | 1.77250 | 1.76781 | 1.78333 |
| N1 | 6.02924640E − 04 | 5.95143750E − 04 | 6.22724010E − 04 |
| N2 | 4.79077870E − 06 | 4.64900740E − 06 | 4.85781240E − 06 |
| N3 | 3.10481950E − 08 | 3.44758130E − 08 | 3.73193880E − 08 |
| N4 | 9.91799770E − 10 | 9.28989500E − 10 | 9.14751620E − 10 |

TABLE 46

Glass Data of 9th Embodiment

| | d-line | C-line | F-line |
|---|---|---|---|
| GRIN1 | | | |
| N0 | 1.77250 | 1.76781 | 1.78333 |
| N1 | 6.98285740E − 04 | 6.90626970E − 04 | 7.16571360E − 04 |
| N2 | 1.33760690E − 06 | 1.34707550E − 06 | 1.28008680E − 06 |
| N3 | 2.95969310E − 09 | 2.73604680E − 09 | 3.80998880E − 09 |
| N4 | −4.49881060E − 12 | −4.08963040E − 12 | −6.35549230E − 12 |
| GRIN2 | | | |
| N0 | 1.77250 | 1.76781 | 1.78333 |
| N1 | 5.96576880E − 04 | 5.87330030E − 04 | 6.17386250E − 04 |
| N2 | 4.67360530E − 06 | 4.62922270E − 06 | 5.01910170E − 06 |
| N3 | 3.33232030E − 08 | 3.23888970E − 08 | 2.67477480E − 08 |
| N4 | 7.21297250E − 10 | 7.14849020E − 10 | 8.48862870E − 10 |

TABLE 47

Glass Data of 10th Embodiment

| | d-line | C-line | F-line |
|---|---|---|---|
| GRIN1 | | | |
| N0 | 1.77250 | 1.76781 | 1.78333 |
| N1 | 6.96500205E − 04 | 6.85619435E − 04 | 7.19337243E − 04 |
| N2 | 1.56001385E − 06 | 1.55889715E − 06 | 1.66082580E − 06 |
| N3 | 1.47889202E − 09 | 4.95343258E − 09 | 5.10105377E − 09 |
| N4 | 1.05740200E − 12 | 3.24061062E − 12 | 4.09171788E − 12 |
| GRIN2 | | | |
| N0 | 1.77250 | 1.76781 | 1.78333 |
| N1 | 6.15736678E − 04 | 6.08990807E − 04 | 6.33598544E − 04 |
| N2 | 4.56482907E − 06 | 4.34007903E − 06 | 4.68212186E − 06 |
| N3 | 3.41921224E − 08 | 4.38628728E − 08 | 3.40389573E − 08 |
| N4 | 5.72127231E − 10 | 4.81272178E − 10 | 7.35923787E − 10 |

TABLE 48

Glass Data of 11th Embodiment

| | d-line | C-line | F-line |
|---|---|---|---|
| GRIN1 | | | |
| N0 | 1.77250 | 1.76781 | 1.78333 |
| N1 | 7.18186672E − 04 | 7.05113969E − 04 | 7.45042251E − 04 |
| N2 | 2.07470146E − 06 | 2.08007202E − 06 | 2.24542917E − 06 |
| N3 | 1.30296922E − 08 | 1.20262278E − 08 | 1.19021406E − 08 |
| N4 | 6.50589854E − 11 | 6.90185707E − 11 | 7.56346350E − 11 |
| GRIN2 | | | |
| N0 | 1.77250 | 1.76781 | 1.78333 |
| N1 | 7.82786376E − 04 | 7.76034543E − 04 | 8.02618264E − 04 |
| N2 | 3.92184349E − 06 | 3.56802537E − 06 | 4.09325429E − 06 |
| N3 | 9.10172087E − 08 | 1.07657744E − 07 | 8.63083854E − 08 |
| N4 | 4.12911689E − 10 | 7.88582416E − 11 | 6.34873935E − 10 |

TABLE 49

Values of Conditions of 8th Embodiment (1)

| Condition | Value |
|---|---|
| $\dfrac{\phi 1}{\phi 2}$ (condition (13)) | 0.303 |
| $\left\lvert \dfrac{Nd2}{\phi 1^4} \right\rvert$ of 1st lens (condition (1)) | 179.932 |
| $\left\lvert \dfrac{Nd2}{\phi 2^4} \right\rvert$ of 2nd lens (condition (1)) | 5.175 |
| $\left\lvert \dfrac{Nd1}{\phi 1^2} \right\rvert$ of 1st lens (condition (2)) | 7.871 |
| $\dfrac{Nd1}{\phi 2^2}$ of 2nd lens (condition (2)) | 0.627 |
| $\dfrac{NC1 - Nd1}{\phi 1^2}$ of 1st lens (condition (37)) | −0.105 |
| $\dfrac{NF1 - Nd1}{\phi 1^2}$ of 1st lens (condition (37)) | 0.225 |
| $\dfrac{NC1 - Nd1}{\phi 2^2}$ of 2nd lens (condition (38)) | −0.008 |
| $\dfrac{NF1 - Nd1}{\phi 2^2}$ of 2nd lens (condition (38)) | 0.021 |
| $\dfrac{R12 + R11}{R12 - R11}$ (condition (26)) | 3.628 |
| $\dfrac{TT1}{f1}$ (condition (27)) | 0.047 |
| $\dfrac{R22 + R21}{R22 - R21}$ (condition (28)) | −1.897 |
| $\dfrac{TT2}{f2}$ (condition (29)) | 0.423 |
| $\dfrac{\phi 1}{\phi W}$ (condition (32)) | 0.366 |
| $\left\lvert \dfrac{\phi 3}{\phi W} \right\rvert$ (condition (33)) | 1.367 |

TABLE 50

Values of Conditions of 8th Embodiment (2)

| | $\dfrac{\phi a(H) - \phi a0}{\phi 1}$ | $\dfrac{\phi a(H) - \phi a0}{\phi 1}$ |
|---|---|---|
| 0.0 Hmax | 0.000 | 0.000 |
| 0.1 Hmax | −0.003 | 0.004 |
| 0.2 Hmax | −0.013 | 0.016 |
| 0.3 Hmax | −0.031 | 0.038 |
| 0.4 Hmax | −0.058 | 0.071 |
| 0.5 Hmax | −0.097 | 0.121 |
| 0.6 Hmax | −0.157 | 0.194 |

TABLE 50-continued

Values of Conditions of 8th Embodiment (2)

| | $\dfrac{\phi a(H) - \phi a0}{\phi 1}$ | $\dfrac{\phi a(H) - \phi a0}{\phi 1}$ |
|---|---|---|
| 0.7 Hmax | −0.252 | 0.306 |
| 0.8 Hmax | −0.418 | 0.487 |
| 0.9 Hmax | −0.724 | 0.791 |
| 1.0 Hmax | −1.318 | 1.320 |

TABLE 51

Values of Conditions of 8th Embodiment (3)

| | $\dfrac{\phi a(H) - \phi a0}{\phi 2}$ | $\dfrac{\phi a(H) - \phi a0}{\phi 2}$ |
|---|---|---|
| 0.0 Hmax | 0.000 | 0.000 |
| 0.1 Hmax | −0.005 | 0.001 |
| 0.2 Hmax | −0.022 | 0.004 |
| 0.3 Hmax | −0.049 | 0.010 |
| 0.4 Hmax | −0.087 | 0.019 |
| 0.5 Hmax | −0.136 | 0.033 |
| 0.6 Hmax | −0.196 | 0.054 |
| 0.7 Hmax | −0.265 | 0.085 |
| 0.8 Hmax | −0.342 | 0.128 |
| 0.9 Hmax | −0.420 | 0.185 |
| 1.0 Hmax | −0.490 | 0.257 |

TABLE 52

Values of Conditions of 8th Embodiment (4)

| | $\dfrac{\phi a(H) - \phi a0}{\phi 3}$ | $\dfrac{\phi a(H) - \phi a0}{\phi 3}$ |
|---|---|---|
| 0.0 Hmax | 0.000 | 0.000 |
| 0.1 Hmax | −0.006 | 0.009 |
| 0.2 Hmax | −0.018 | 0.032 |
| 0.3 Hmax | −0.029 | 0.061 |
| 0.4 Hmax | −0.036 | 0.089 |
| 0.5 Hmax | −0.050 | 0.121 |
| 0.6 Hmax | −0.088 | 0.168 |
| 0.7 Hmax | −0.154 | 0.234 |
| 0.8 Hmax | −0.205 | 0.288 |
| 0.9 Hmax | −0.240 | 0.330 |
| 1.0 Hmax | −0.774 | 0.956 |

TABLE 53

Values of Conditions of 8th Embodiment (5)

| | $\dfrac{d}{dH}\{\nu d(H)\}$ | $\dfrac{d}{dH}\{\nu d(H)\}$ |
|---|---|---|
| 0.5 Hmax | −0.00047 | −0.00025 |
| 0.6 Hmax | −0.00059 | −0.00032 |
| 0.7 Hmax | −0.00074 | −0.00040 |
| 0.8 Hmax | −0.00095 | −0.00050 |
| 0.9 Hmax | −0.00131 | −0.00061 |
| 1.0 Hmax | −0.00196 | −0.00074 |

TABLE 54

Values of Conditions of 8th Embodiment (6)

| | $\dfrac{\nu d(H) - \nu d(0)}{\nu d(0)}$ | $\dfrac{\nu d(H) - \nu d(0)}{\nu d(0)}$ |
|---|---|---|
| 0.0 Hmax | 0.000 | 0.000 |
| 0.1 Hmax | −0.001 | 0.000 |
| 0.2 Hmax | −0.004 | −0.001 |
| 0.3 Hmax | −0.009 | −0.003 |
| 0.4 Hmax | −0.017 | −0.005 |
| 0.5 Hmax | −0.026 | −0.008 |
| 0.6 Hmax | −0.037 | −0.012 |
| 0.7 Hmax | −0.051 | −0.017 |
| 0.8 Hmax | −0.067 | −0.023 |
| 0.9 Hmax | −0.088 | −0.030 |
| 1.0 Hmax | −0.118 | −0.038 |

TABLE 55

Values of Conditions of 9th Embodiment (1)

| Condition | Value |
|---|---|
| $\dfrac{\phi 1}{\phi 2}$ (condition (13)) | 0.339 |
| $\left|\dfrac{Nd2}{\phi 1^4}\right|$ of 1st lens (condition (1)) | 142.495 |
| $\left|\dfrac{Nd2}{\phi 2^4}\right|$ of 2nd lens (condition (1)) | 6.555 |
| $\dfrac{Nd1}{\phi 1^2}$ of 1st lens (condition (2)) | 7.207 |
| $\dfrac{Nd1}{\phi 2^2}$ of 2nd lens (condition (2)) | 0.707 |
| $\dfrac{NC1 - Nd1}{\phi 1^2}$ of 1st lens (condition (37)) | −0.079 |
| $\dfrac{NF1 - Nd1}{\phi 1^2}$ of 1st lens (condition (37)) | 0.189 |
| $\dfrac{NC1 - Nd1}{\phi 2^2}$ of 2nd lens (condition (38)) | −0.011 |
| $\dfrac{NF1 - Nd1}{\phi 2^2}$ of 2nd lens (condition (38)) | 0.025 |
| $\dfrac{R12 + R11}{R12 - R11}$ (condition (26)) | 1.480 |
| $\dfrac{TT1}{f1}$ (condition (27)) | 0.059 |
| $\dfrac{R22 + R21}{R22 - R21}$ (condition (28)) | −2.137 |
| $\dfrac{TT2}{f2}$ (condition (29)) | 0.400 |
| $\dfrac{\phi 1}{\phi W}$ (condition (32)) | 0.383 |

TABLE 55-continued

Values of Conditions of 9th Embodiment (1)

| Condition | Value |
|---|---|
| $\left|\dfrac{\phi 3}{\phi W}\right|$ (condition (33)) | 1.383 |

TABLE 56

Values of Conditions of 9th Embodiment (2)

| | $\dfrac{\phi a(H) - \phi a0}{\phi 1}$ | $\dfrac{\phi a(H) - \phi a0}{\phi 1}$ |
|---|---|---|
| 0.0 Hmax | 0.000 | 0.000 |
| 0.1 Hmax | −0.003 | 0.004 |
| 0.2 Hmax | −0.014 | 0.018 |
| 0.3 Hmax | −0.032 | 0.041 |
| 0.4 Hmax | −0.060 | 0.075 |
| 0.5 Hmax | −0.101 | 0.122 |
| 0.6 Hmax | −0.161 | 0.185 |
| 0.7 Hmax | −0.251 | 0.268 |
| 0.8 Hmax | −0.385 | 0.374 |
| 0.9 Hmax | −0.586 | 0.510 |
| 1.0 Hmax | −0.880 | 0.680 |

TABLE 57

Values of Conditions of 9th Embodiment (3)

| | $\dfrac{\phi a(H) - \phi a0}{\phi 2}$ | $\dfrac{\phi a(H) - \phi a0}{\phi 2}$ |
|---|---|---|
| 0.0 Hmax | 0.000 | 0.000 |
| 0.1 Hmax | −0.005 | 0.001 |
| 0.2 Hmax | −0.019 | 0.006 |
| 0.3 Hmax | −0.043 | 0.013 |
| 0.4 Hmax | −0.076 | 0.024 |
| 0.5 Hmax | −0.120 | 0.040 |
| 0.6 Hmax | −0.174 | 0.064 |
| 0.7 Hmax | −0.239 | 0.098 |
| 0.8 Hmax | −0.314 | 0.144 |
| 0.9 Hmax | −0.397 | 0.200 |
| 1.0 Hmax | −0.477 | 0.257 |

TABLE 58

Values of Conditions of 9th Embodiment (4)

| | $\dfrac{\phi a(H) - \phi a0}{\phi 3}$ | $\dfrac{\phi a(H) - \phi a0}{\phi 3}$ |
|---|---|---|
| 0.0 Hmax | 0.000 | −0.000 |
| 0.1 Hmax | 0.004 | −0.005 |
| 0.2 Hmax | 0.014 | −0.024 |
| 0.3 Hmax | 0.020 | −0.065 |
| 0.4 Hmax | 0.024 | −0.130 |
| 0.5 Hmax | 0.049 | −0.205 |
| 0.6 Hmax | 0.123 | −0.268 |
| 0.7 Hmax | 0.223 | −0.333 |
| 0.8 Hmax | 0.189 | −0.543 |
| 0.9 Hmax | −0.227 | −1.127 |
| 1.0 Hmax | −0.538 | −1.545 |

TABLE 59

Values of Conditions of 9th Embodiment (5)

| | GRIN1 $\dfrac{d}{dH}\{vd(H)\}$ Condition (B) | GRIN2 $\dfrac{d}{dH}\{vd(H)\}$ Condition (B) |
|---|---|---|
| 0.5 Hmax | −0.00032 | −0.00032 |
| 0.6 Hmax | −0.00039 | −0.00041 |
| 0.7 Hmax | −0.00048 | −0.00051 |
| 0.8 Hmax | −0.00060 | −0.00064 |
| 0.9 Hmax | −0.00077 | −0.00082 |
| 1.0 Hmax | −0.00100 | −0.00108 |

TABLE 60

Values of Conditions of 9th Embodiment (6)

| | GRIN1 $\dfrac{vd(H) - vd(0)}{vd(0)}$ Condition (23) | GRIN2 $\dfrac{vd(H) - vd(0)}{vd(0)}$ Condition (23) |
|---|---|---|
| 0.0 Hmax | 0.000 | 0.000 |
| 0.1 Hmax | −0.001 | 0.000 |
| 0.2 Hmax | −0.003 | −0.002 |
| 0.3 Hmax | −0.007 | −0.004 |
| 0.4 Hmax | −0.011 | −0.007 |
| 0.5 Hmax | −0.016 | −0.012 |
| 0.6 Hmax | −0.022 | −0.017 |
| 0.7 Hmax | −0.029 | −0.024 |
| 0.8 Hmax | −0.037 | −0.032 |
| 0.9 Hmax | −0.047 | −0.042 |
| 1.0 Hmax | −0.060 | −0.055 |

TABLE 61

Values of Conditions of 10th Embodiment (1)

| Condition | Value |
|---|---|
| $\dfrac{\phi 1}{\phi 2}$ (condition (13)) | 0.373 |
| $\left|\dfrac{Nd2}{\phi 1^4}\right|$ of 1st lens (condition (1)) | 122.861 |
| $\left|\dfrac{Nd2}{\phi 2^4}\right|$ of 2nd lens (condition (1)) | 6.942 |
| $\dfrac{Nd1}{\phi 1^2}$ of 1st lens (condition (2)) | 6.181 |
| $\dfrac{Nd1}{\phi 2^2}$ of 2nd lens (condition (2)) | 0.759 |
| $\dfrac{NC1 - Nd1}{\phi 1^2}$ of 1st lens (condition (37)) | −0.097 |
| $\dfrac{NF1 - Nd1}{\phi 1^2}$ of 1st lens (condition (37)) | 0.203 |
| $\dfrac{NC1 - Nd1}{\phi 2^2}$ of 2nd lens (condition (38)) | −0.008 |

TABLE 61-continued

Values of Conditions of 10th Embodiment (1)

| Condition | Value |
|---|---|
| $\dfrac{NF1 - Nd1}{\phi 2^2}$ of 2nd lens (condition (38)) | 0.022 |
| $\dfrac{R12 + R11}{R12 - R11}$ (condition (26)) | 3.864 |
| $\dfrac{TT1}{f1}$ (condition (27)) | 0.053 |
| $\dfrac{R22 + R21}{R22 - R21}$ (condition (28)) | −1.933 |
| $\dfrac{TT2}{f2}$ (condition (29)) | 0.360 |
| $\dfrac{\phi 1}{\phi W}$ (condition (32)) | 0.413 |
| $\left|\dfrac{\phi 3}{\phi W}\right|$ (condition (33)) | 1.341 |

TABLE 62

Values of Conditions of 10th Embodiment (2)

| | On r1 $\dfrac{\phi a(H) - \phi a0}{\phi 1}$ Conditions (16)(17) | On r2 $\dfrac{\phi a(H) - \phi a0}{\phi 1}$ Conditions (16)(17) |
|---|---|---|
| 0.0 Hmax | 0.000 | 0.000 |
| 0.1 Hmax | −0.003 | 0.002 |
| 0.2 Hmax | −0.012 | 0.010 |
| 0.3 Hmax | −0.028 | 0.024 |
| 0.4 Hmax | −0.051 | 0.046 |
| 0.5 Hmax | −0.086 | 0.081 |
| 0.6 Hmax | −0.137 | 0.134 |
| 0.7 Hmax | −0.212 | 0.217 |
| 0.8 Hmax | −0.327 | 0.343 |
| 0.9 Hmax | −0.504 | 0.532 |
| 1.0 Hmax | −0.777 | 0.806 |

TABLE 63

Values of Conditions of 10th Embodiment (3)

| | On r3 $\dfrac{\phi a(H) - \phi a0}{\phi 2}$ Conditions (16)(19) | On r4 $\dfrac{\phi a(H) - \phi a0}{\phi 2}$ Conditions (16)(19) |
|---|---|---|
| 0.0 Hmax | 0.000 | 0.000 |
| 0.1 Hmax | −0.006 | 0.001 |
| 0.2 Hmax | −0.025 | 0.005 |
| 0.3 Hmax | −0.057 | 0.013 |
| 0.4 Hmax | −0.101 | 0.024 |
| 0.5 Hmax | −0.158 | 0.042 |
| 0.6 Hmax | −0.228 | 0.066 |
| 0.7 Hmax | −0.310 | 0.099 |
| 0.8 Hmax | −0.404 | 0.142 |
| 0.9 Hmax | −0.521 | 0.195 |
| 1.0 Hmax | −0.700 | 0.259 |

TABLE 64

Values of Conditions of 10th Embodiment (4)

| | $\dfrac{\phi a(H) - \phi a0}{\phi 3}$ | $\dfrac{\phi a(H) - \phi a0}{\phi 3}$ |
|---|---|---|
| 0.0 Hmax | 0.000 | 0.000 |
| 0.1 Hmax | −0.016 | 0.009 |
| 0.2 Hmax | −0.057 | 0.030 |
| 0.3 Hmax | −0.111 | 0.053 |
| 0.4 Hmax | −0.176 | 0.078 |
| 0.5 Hmax | −0.262 | 0.120 |
| 0.6 Hmax | −0.369 | 0.185 |
| 0.7 Hmax | −0.426 | 0.223 |
| 0.8 Hmax | −0.314 | 0.111 |
| 0.9 Hmax | −0.287 | 0.065 |
| 1.0 Hmax | −2.616 | 1.966 |

TABLE 65

Values of Conditions of 10th Embodiment (5)

| | $\dfrac{d}{dH}\{vd(H)\}$ | $\dfrac{d}{dH}\{vd(H)\}$ |
|---|---|---|
| 0.5 Hmax | −0.00062 | −0.00024 |
| 0.6 Hmax | −0.00080 | −0.00031 |
| 0.7 Hmax | −0.00102 | −0.00039 |
| 0.8 Hmax | −0.00130 | −0.00050 |
| 0.9 Hmax | −0.00165 | −0.00068 |
| 1.0 Hmax | −0.00211 | −0.00102 |

TABLE 66

Values of Conditions of 10th Embodiment (6)

| | $\dfrac{vd(H) - vd(0)}{vd(0)}$ | $\dfrac{vd(H) - vd(0)}{vd(0)}$ |
|---|---|---|
| 0.0 Hmax | 0.000 | 0.000 |
| 0.1 Hmax | −0.001 | 0.000 |
| 0.2 Hmax | −0.006 | −0.001 |
| 0.3 Hmax | −0.013 | −0.003 |
| 0.4 Hmax | −0.023 | −0.005 |
| 0.5 Hmax | −0.037 | −0.008 |
| 0.6 Hmax | −0.054 | −0.012 |
| 0.7 Hmax | −0.074 | −0.016 |
| 0.8 Hmax | −0.098 | −0.022 |
| 0.9 Hmax | −0.126 | −0.029 |
| 1.0 Hmax | −0.157 | −0.040 |

TABLE 67

Values of Conditions of 11th Embodiment (1)

| Condition | Value |
|---|---|
| $\dfrac{\phi 1}{\phi 2}$ (condition (13)) | 0.433 |
| $\left\|\dfrac{Nd2}{\phi 1^4}\right\|$ of 1st lens (condition (1)) | 109.896 |
| $\left\|\dfrac{Nd2}{\phi 2^4}\right\|$ of 2nd lens (condition (1)) | 7.289 |
| $\dfrac{Nd1}{\phi 1^2}$ of 1st lens (condition (2)) | 5.227 |
| $\dfrac{Nd1}{\phi 2^2}$ of 2nd lens (condition (2)) | 1.067 |
| $\dfrac{NC1 - Nd1}{\phi 1^2}$ of 1st lens (condition (37)) | −0.095 |
| $\dfrac{NF1 - Nd1}{\phi 1^2}$ of 1st lens (condition (37)) | 0.195 |
| $\dfrac{NC1 - Nd1}{\phi 2^2}$ of 2nd lens (condition (38)) | −0.009 |
| $\dfrac{NF1 - Nd1}{\phi 2^2}$ of 2nd lens (condition (38)) | 0.027 |
| $\dfrac{R12 + R11}{R12 - R11}$ (condition (26)) | 4.458 |
| $\dfrac{TT1}{f1}$ (condition (27)) | 0.059 |
| $\dfrac{R22 + R21}{R22 - R11}$ (condition (28)) | −1.906 |
| $\dfrac{TT2}{f2}$ (condition (29)) | 0.281 |
| $\dfrac{\phi 1}{\phi W}$ (condition (32)) | 0.456 |
| $\left\|\dfrac{\phi 3}{\phi W}\right\|$ (condition (33)) | 1.479 |

TABLE 68

Values of Conditions of 11th Embodiment (2)

|  | $\dfrac{\phi a(H) - \phi a0}{\phi 1}$ | $\dfrac{\phi a(H) - \phi a0}{\phi 1}$ |
|---|---|---|
| 0.0 Hmax | 0.000 | 0.000 |
| 0.1 Hmax | −0.473 | 0.441 |
| 0.2 Hmax | −0.486 | 0.452 |
| 0.3 Hmax | −0.507 | 0.470 |
| 0.4 Hmax | −0.540 | 0.501 |
| 0.5 Hmax | −0.588 | 0.548 |
| 0.6 Hmax | −0.659 | 0.623 |
| 0.7 Hmax | −0.764 | 0.740 |
| 0.8 Hmax | −0.922 | 0.920 |

TABLE 68-continued

Values of Conditions of 11th Embodiment (2)

|  | $\dfrac{\phi a(H) - \phi a0}{\phi 1}$ | $\dfrac{\phi a(H) - \phi a0}{\phi 1}$ |
|---|---|---|
| 0.9 Hmax | −1.165 | 1.187 |
| 1.0 Hmax | −1.548 | 1.553 |

TABLE 69

Values of Conditions of 11th Embodiment (3)

|  | On r3 $\dfrac{\phi a(H) - \phi a0}{\phi 2}$ Conditions (16)(19) | On r4 $\dfrac{\phi a(H) - \phi a0}{\phi 2}$ Conditions (16)(19) |
|---|---|---|
| 0.0 Hmax | 0.000 | 0.000 |
| 0.1 Hmax | 0.081 | −0.002 |
| 0.2 Hmax | 0.058 | −0.002 |
| 0.3 Hmax | 0.019 | −0.001 |
| 0.4 Hmax | −0.035 | 0.001 |
| 0.5 Hmax | −0.105 | 0.008 |
| 0.6 Hmax | −0.193 | 0.022 |
| 0.7 Hmax | −0.300 | 0.048 |
| 0.8 Hmax | −0.427 | 0.092 |
| 0.9 Hmax | −0.568 | 0.156 |
| 1.0 Hmax | −0.716 | 0.235 |

TABLE 70

Values of Conditions of 11th Embodiment (4)

|  | On r5 $\dfrac{\phi a(H) - \phi a0}{\phi 3}$ Conditions (16)(21) | On r4 $\dfrac{\phi a(H) - \phi a0}{\phi 3}$ Conditions (16)(21) |
|---|---|---|
| 0.0 Hmax | 0.000 | 0.000 |
| 0.1 Hmax | −0.284 | 1.284 |
| 0.2 Hmax | −0.310 | 1.222 |
| 0.3 Hmax | −0.337 | 1.118 |
| 0.4 Hmax | −0.354 | 0.977 |
| 0.5 Hmax | −0.368 | 0.817 |
| 0.6 Hmax | −0.413 | 0.673 |
| 0.7 Hmax | −0.536 | 0.578 |
| 0.8 Hmax | −0.742 | 0.509 |
| 0.9 Hmax | −0.870 | 0.272 |
| 1.0 Hmax | −0.284 | −0.603 |

TABLE 71

Values of Conditions of 11th Embodiment (5)

|  | GRIN1 $\dfrac{d}{dH}\{vd(H)\}$ Condition (B) | GRIN2 $\dfrac{d}{dH}\{vd(H)\}$ Condition (B) |
|---|---|---|
| 0.5 Hmax | −0.00070 | −0.00025 |
| 0.6 Hmax | −0.00090 | −0.00032 |
| 0.7 Hmax | −0.00116 | −0.00040 |
| 0.8 Hmax | −0.00149 | −0.00053 |
| 0.9 Hmax | −0.00194 | −0.00078 |
| 1.0 Hmax | −0.00258 | −0.00128 |

TABLE 72

Values of Conditions of 11th Embodiment (6)

| | GRIN1 $\dfrac{\nu d(H) - \nu d(0)}{\nu d(0)}$ Condition (23) | GRIN2 $\dfrac{\nu d(H) - \nu d(0)}{\nu d(0)}$ Condition (23) |
|---|---|---|
| 0.0 Hmax | 0.000 | 0.000 |
| 0.1 Hmax | −0.002 | 0.000 |
| 0.2 Hmax | −0.006 | −0.001 |
| 0.3 Hmax | −0.014 | −0.002 |
| 0.4 Hmax | −0.025 | −0.004 |
| 0.5 Hmax | −0.040 | −0.007 |
| 0.6 Hmax | −0.058 | −0.011 |
| 0.7 Hmax | −0.080 | −0.015 |
| 0.8 Hmax | −0.106 | −0.020 |
| 0.9 Hmax | −0.136 | −0.028 |
| 1.0 Hmax | −0.170 | −0.041 |

TABLE 73

Values of Conditions of 8th Embodiment (7)

| | On r3 $\dfrac{\phi a1(H) - \phi a10}{\phi 2} \equiv A1$ Condition (34) | On r4 $\dfrac{\phi a2(H) - \phi a20}{\phi 2} \equiv A2$ Condition (35) | Value of $|A1|-A2$ Condition (36) |
|---|---|---|---|
| 0.8 Hmax | −0.342 | 0.128 | 0.114 |
| 0.9 Hmax | −0.420 | 0.185 | 0.235 |
| 1.0 Hmax | −0.490 | 0.257 | 0.233 |

TABLE 74

Values of Conditions of 9th Embodiment (7)

| | $\dfrac{\phi a1(H) - \phi a10}{\phi 1} \equiv A1$ | $\dfrac{\phi a2(H) - \phi a20}{\phi 1} \equiv A2$ | Value of $|A1|-A2$ Condition (36) |
|---|---|---|---|
| 0.8 Hmax | −0.385 | 0.374 | 0.011 |
| 0.9 Hmax | −0.586 | 0.510 | 0.076 |
| 1.0 Hmax | −0.880 | 0.680 | 0.200 |

TABLE 75

Values of Conditions of 9th Embodiment (8)

| | $\dfrac{\phi a1(H) - \phi a10}{\phi 2} \equiv A1$ | $\dfrac{\phi a2(H) - \phi a20}{\phi 2} \equiv A2$ | Value of $|A1|-A2$ Condition (36) |
|---|---|---|---|
| 0.8 Hmax | −0.314 | 0.144 | 0.170 |
| 0.9 Hmax | −0.397 | 0.200 | 0.197 |
| 1.0 Hmax | −0.477 | 0.257 | 0.220 |

TABLE 76

Values of Conditions of 10th Embodiment (7)

| | $\dfrac{\phi a1(H) - \phi a10}{\phi 2} \equiv A1$ | $\dfrac{\phi a2(H) - \phi a20}{\phi 2} \equiv A2$ | Value of $|A1|-A2$ Condition (36) |
|---|---|---|---|
| 0.8 Hmax | −0.404 | 0.142 | 0.262 |
| 0.9 Hmax | −0.521 | 0.195 | 0.326 |
| 1.0 Hmax | −0.700 | 0.259 | 0.441 |

TABLE 77

Values of Conditions of 10th Embodiment (8)

| | $\dfrac{\phi a1(H) - \phi a10}{\phi 3} \equiv A1$ | $\dfrac{\phi a2(H) - \phi a20}{\phi 3} \equiv A2$ | Value of $|A1|-A2$ Condition (36) |
|---|---|---|---|
| 0.8 Hmax | −0.314 | 0.111 | 0.203 |
| 0.9 Hmax | −0.287 | 0.065 | 0.222 |
| 1.0 Hmax | −2.616 | 1.966 | 0.650 |

TABLE 78

Values of Conditions of 11th Embodiment (7)

| | $\dfrac{\phi a1(H) - \phi a10}{\phi 2} \equiv A1$ | $\dfrac{\phi a2(H) - \phi a20}{\phi 2} \equiv A2$ | Value of $|A1|-A2$ Condition (36) |
|---|---|---|---|
| 0.8 Hmax | −0.427 | 0.092 | 0.335 |
| 0.9 Hmax | −0.568 | 0.156 | 0.412 |
| 1.0 Hmax | −0.716 | 0.235 | 0.481 |

TABLE 79

Values of Conditions of 11th Embodiment (8)

| | $\dfrac{\phi a1(H) - \phi a10}{\phi 2} \equiv A1$ | $\dfrac{\phi a2(H) - \phi a20}{\phi 2} \equiv A2$ | Value of $|A1|-A2$ Condition (36) |
|---|---|---|---|
| 0.8 Hmax | −0.742 | 0.509 | 0.233 |
| 0.9 Hmax | −0.870 | 0.272 | 0.598 |
| 1.0 Hmax | −0.284 | −0.603 | 0.887 |

What is claimed is:

1. A zoom lens system comprising a plurality of lens units in which zooming is performed by varying distances between said lens units,
   wherein at least one lens unit included in said lens units consists of a lens element, said lens element having a gradient index in a direction vertical to an optical axis and having at least one aspherical surface.

2. A zoom lens system as claimed in claim 1, wherein all of said lens units each consist of a lens element having a gradient index in a direction vertical to an optical axis and each having at least one aspherical surface.

3. A zoom lens system as claimed in claim 1, wherein a lens unit other than a most image side lens unit includes a gradient index lens.

4. A zoom lens system as claimed in claim 2, wherein a most object side lens unit has a positive refractive power.

5. A zoom lens system as claimed in claim 3, wherein a most object side lens unit has a positive refractive power.

6. A zoom lens system as claimed in claim 3, wherein said most image side lens unit includes an aspherical surface.

7. A zoom lens system as claimed in claim 3, wherein said most image side lens unit consists of two lens elements.

8. A zoom lens system as claimed in claim 1, wherein the following condition is fulfilled:

$$\left|\frac{Nd2}{\phi g^4}\right| < 1000$$

where Nd2 is a fourth power gradient index coefficient of said gradient index lens to d-line, and φg is a refractive power of said gradient index lens.

9. A zoom lens system as claimed in claim 8, wherein a lens unit including a gradient index lens has a positive refractive power, and wherein the following condition is fulfilled:

$$-30 < \frac{Nd1}{\phi p^2} < 20$$

where Nd1 is a quadratic gradient index coefficient of said gradient index lens to d-line, and φp is a refractive power of said lens unit.

10. A zoom lens system as claimed in claim 8, wherein a lens unit including a gradient index lens has a negative refractive power, and wherein the following condition is fulfilled:

$$-20 < \frac{Nd1}{\phi m^2} < 30$$

where Nd1 is a quadratic gradient index coefficient of said gradient index lens to d-line, and φm is a refractive power of said lens unit.

11. A zoom lens system as claimed in claim 8, wherein said gradient index lens fulfills the following condition:

when 0<H<Hmax, $$-6.0 < \frac{\phi a(H) - \phi a0}{\phi g} < 6.0$$

where H is a height along a lens diameter, Hmax is an effective lens diameter, φa(H) is a refractive power by a local curvature at said height H of said aspherical surface, φa0 is a refractive power by a reference curvature of said aspherical surface, and φg is a refractive power of said gradient index lens.

12. A zoom lens system as claimed in claim 1, wherein a front lens unit and a rear lens unit are provided.

13. A zoom lens system as claimed in claim 12, wherein said front lens unit includes one gradient index lens having at least one aspherical surface, and wherein said front lens unit fulfills the following condition:

0<H<0.5Hmax $$\frac{d}{dH}\{vd(H)\} < 0;$$

when 0<H<Hmax, $$-0.5 < \frac{vd(H) - vd(0)}{vd(0)} \leq 0.0$$

$$-5.0 < \frac{RF2 + RF1}{RF2 - RF1} < 0.0$$

$$0.1 < \frac{TF}{fF} < 1.0$$

where vd(H) is a dispersion value at a height H of said gradient index lens, vd(0) is a dispersion value at an optical axis, d/dh{vd(H)} is a differential coefficient of said vd(H), RF2 is a radius of curvature of an object side surface of said front lens unit, RF1 is a radius of curvature of an image side surface of said front lens unit, fF is a focal length of said front lens unit, and TF is an axial thickness of said gradient index lens included in said front lens unit.

14. A zoom lens system as claimed in claim 12, wherein said rear lens unit includes one gradient index lens having at least one aspherical surface, and wherein the following condition is fulfilled:

$$0.5 \leq \left|\frac{\phi R}{\phi W}\right| \leq 2.5$$

where φR is a refractive power of said rear lens unit, and φW is a refractive power of said zoom lens system at a shortest focal length condition.

15. A zoom lens system as claimed in claim 12, wherein said rear lens unit includes an aspherical surface and fulfills the following conditions:

when 0<H<Hmax, $$-3.0 < \frac{\phi a(H) - \phi a0}{\phi R} < 8.0$$

where H is a height along a lens diameter, Hmax is an effective lens diameter, φa(H) is a refractive power by a local curvature at said height H of said aspherical surface, φa0 is a refractive power by a reference curvature of said aspherical surface, and φR is a refractive power of said rear lens unit.

16. A zoom lens system as claimed in claim 14, wherein said rear lens unit fulfills the following conditions:

$$0.0 \leq \frac{vd(H) - vd(0)}{vd(0)} < 1.0$$

$$0.0 < \frac{RR2 + RR1}{RR2 - RR1} < 5.0$$

$$0.02 < \frac{TR}{|fR|} < 0.7$$

where vd(H) is a dispersion value at a height H of said gradient index lens, vd(0) is a dispersion value at an optical axis, d/dH{vd(H)} is a differential coefficient of said vd(H), RR2 is a radius of curvature of an object side surface of said rear lens unit, RR1 is a radius of curvature of an image side surface of said rear lens unit, fR is a focal length of said rear lens unit, and TR is an axial thickness of said gradient index lens included in said rear lens unit.

17. A zoom lens system as claimed in claim 1, wherein said zoom lens system comprises three lens units.

18. A zoom lens system as claimed in claim 1, wherein the most object side lens unit is a meniscus lens with an aspherical surface.

19. A zoom lens system as claimed in claim 18, wherein the meniscus lens has two aspherical surfaces.

20. A zoom lens system as claimed in claim 19, wherein the rear lens unit consists of a positive lens element and a negative meniscus lens element convex to an image side.

21. A zoom lens system as claimed in claim 20, wherein the positive lens element of the rear lens unit has an object side aspherical surface.

22. A zoom lens system as claimed in claim 21, wherein the following condition is fulfilled:

$$\left|\frac{Nd2}{\phi g^4}\right| < 1000$$

where Nd2 is a fourth power gradient index coefficient of said gradient index lens to d-line, and φg is a refractive power of said gradient index lens.

23. A zoom lens system as claimed in claim 19, wherein another lens unit other than the most object side lens unit includes a gradient index lens.

24. A zoom lens system as claimed in claim 23, wherein another lens unit has an image side aspherical surface.

25. A zoom lens system as claimed in claim 24, wherein another lens unit is a negative meniscus lens.

26. A two-unit zoom lens system from the object to the image side, comprising:
   a first lens unit consisting of a meniscus gradient index lens which has a gradient index of refraction in a direction vertical to an optical axis with at least one non-planar aspherical surface; and
   a second lens unit consisting of a gradient index lens which has a gradient index of refraction in a direction vertical to the optical axis with at least one non-planar aspherical surface, wherein zooming is performed by varying the distances between said lens units.

27. A zoom lens system as claimed in claim 1, wherein said zoom lens system consists of from an object side:
   a front lens unit having a positive refractive power; and
   a second lens unit having a negative refractive power.

28. A zoom lens system as claimed in claim 27, wherein said front lens unit includes one gradient index lens having at least one aspherical surface, and wherein said front lens unit fulfills the following condition:
   when 0<H<0.5Hmax, $$\frac{d}{dH}\{vd(H)\} < 0;$$

when 0<H<Hmax, $$-0.5 < \frac{vd(H) - vd(0)}{vd(0)} \leq 0.0$$

$$-5.0 < \frac{RF2 + RF1}{RF2 - RF1} < 0.0$$

$$0.1 < \frac{TF}{fF} < 1.0$$

where vd(H) is a dispersion value at a height H of said gradient index lens, d/dH{vd(H)} is a differential coefficient of said vd(H), RF2 is a radius of curvature of an object side surface of said front lens unit, RF1 is a radius of curvature of an image side surface of said front lens unit, fF is a focal length of said front lens unit, and TF is an axial thickness of said gradient index lens included in said front lens unit.

29. A zoom lens system as claimed in claim 27, wherein said rear lens unit includes one gradient index lens having at least one aspherical surface, and wherein the following condition is fulfilled:

$$0.5 \leq \left|\frac{\phi R}{\phi W}\right| \leq 2.5$$

where φR is a refractive power of said rear lens unit, and φW is a refractive power of said zoom lens system at a shortest focal length condition.

30. A zoom lens system as claimed in claim 29, wherein said rear lens unit fulfills the following conditions:
   when 0<H<Hmax, $$-3.0 < \frac{\phi a(H) - \phi a0}{\phi R} < 8.0$$

where H is a height along a lens diameter, Hmax is an effective lens diameter, φa(H) is a refractive power by a local curvature at said height H of said aspherical surface, φa0 is a refractive power by a reference curvature of said aspherical surface, and φR is a refractive power of said rear lens unit.

31. A zoom lens system as claimed in claim 29, wherein said rear lens unit fulfills the following conditions:

$$0.0 \leq \frac{vd(H) - vd(0)}{vd(0)} < 1.0$$

$$0.0 < \frac{RR2 + RR1}{RR2 - RR1} < 5.0$$

$$0.02 < \frac{TR}{|fR|} < 0.7$$

where vd(H) is a dispersion value at a height H of said gradient index lens, d/dH{vd(H)} is a differential coefficient of said vd(H), RR2 is a radius of curvature of an object side surface of said rear lens unit, RR1 is a radius of curvature of an image side surface of said rear lens unit, fR is a focal length of said rear lens unit, and TR is an axial thickness of said gradient index lens included in said rear lens unit.

32. A zoom lens system as claimed in claim 1, wherein said zoom lens system consists of from an object side:
   a first lens unit having a positive refractive power;
   a second lens unit having a positive refractive power; and
   a third lens unit having a negative refractive power,
   wherein at least one of said lens units consists of said gradient index lens.

33. A zoom lens system as claimed in claim 32, wherein the following condition is fulfilled:

$$0.15 < \frac{\phi_1}{\phi_2} < 1.0$$

φ₁ is a refractive power of said first lens unit, and φ₂ is a refractive power of said second lens unit.

34. A zoom lens system as claimed in claim 32, wherein said first lens unit has a positive lens configuration strongly convex to the object side, and wherein said second lens unit has a positive lens configuration strongly convex to an image side.

35. A zoom lens system as claimed in claim 32, wherein said gradient index lens has a positive refractive power, and wherein the following condition is fulfilled:

$$-30 < \frac{N_{1d}}{\phi_p^2} < 20$$

where $N_{1d}$ is a quadratic gradient index coefficient of said gradient index lens to d-line, and $\phi_p$ is a refractive power of said positive lens unit.

36. A zoom lens system as claimed in claim 32, wherein said gradient index lens has a negative refractive power, and wherein the following condition is fulfilled:

$$-20 < \frac{N_{1d}}{\phi_m^2} < 30$$

where $N_{1d}$ is a quadratic gradient index coefficient of said gradient index lens to d-line, and $\phi_m$ is a refractive power of said negative lens unit.

37. A zoom lens system as claimed in claim 32, wherein the following condition is fulfilled:

$$\left| \frac{N_{2d}}{\phi_G^4} \right| < 1000$$

where $N_{2d}$ is a fourth power gradient index coefficient of said gradient index lens to d-line, and $\phi_G$ is a refractive power of said gradient index lens.

38. A zoom lens system as claimed in claim 32, wherein the following condition is fulfilled:
when 0<H<Hmax, $$-6.0 < \frac{\phi_a - \phi_{0a}}{\phi_G} < 5.0$$

where H is a height along a lens diameter, Hmax is an effective lens diameter, $\phi_a$ is a local refractive power of said aspherical surface, $\phi_{0a}$ is a refractive power by a reference curvature of said aspherical surface, and $\phi_G$ is a refractive power of said gradient index lens.

39. A zoom lens system as claimed in claim 32, wherein said first lens unit includes an aspherical lens element, and wherein the following condition is fulfilled:
when 0<H<Hmax, $$-6.0 < \frac{\phi_a - \phi_{0a}}{\phi_1} < 5.0$$

where H is a height along a lens diameter, Hmax is an effective lens diameter, $\phi_a$ is a local refractive power of said aspherical surface, $\phi_{0a}$ is a refractive power by a reference curvature of said aspherical surface, and $\phi_1$ is a refractive power of said first lens unit.

40. A zoom lens system as claimed in claim 39, wherein said first lens unit includes a bi-aspherical lens element, and wherein one surface of said bi-aspherical lens element fulfills $(\phi_a - \phi_{0a})/\phi_1 < 0.0$ when 0.8Hmax<H<Hmax, and wherein another surface of said bi-aspherical lens element fulfills $(\phi_a - \phi_{0a})/\phi_1 > 0.0$ when 0.8Hmax<H<Hmax.

41. A zoom lens system as claimed in claim 40, wherein the following condition is fulfilled:
when 0.8Hmax<H<Hmax, $$|A_{m1}| > A_{p1}$$

where $A_{m1}$ is a value of $(\phi_a - \phi_{0a})/\phi_1$ of said aspherical surface fulfilling $(\phi_a - \phi_{0a})/\phi_1 < 0.0$, and $A_{p1}$ is a value of $(\phi_a - \phi_{0a})/\phi_1$ of said spherical surface fulfilling $(\phi_a - \phi_{0a})/\phi_1 > 0.0$.

42. A zoom lens system as claimed in claim 32, wherein said second lens unit includes an aspherical lens element, and wherein the following condition is fulfilled:
when 0<H<Hmax, $$-3.0 < \frac{\phi_a - \phi_{0a}}{\phi_2} < 2.0$$

where H is a height along a lens diameter, Hmax is an effective lens diameter, $\phi_a$ is a local refractive power of said aspherical surface, $\phi_{0a}$ is a refractive power by a reference curvature of said aspherical surface, and $\phi_2$ is a refractive power of said second lens unit.

43. A zoom lens system as claimed in claim 42, wherein said second lens unit includes a bi-aspherical lens element, and wherein one surface of said bi-aspherical lens element fulfills $(\phi_a - \phi_{0a})/\phi_2 < 0.0$ when 0.8Hmax<H<Hmax, and wherein another surface of said bi-aspherical lens element fulfills $(\phi_a - \phi_{0a})/\phi_2 > 0.0$ when 0.8Hmax<H<Hmax.

44. A zoom lens system as claimed in claim 43, wherein the following condition is fulfilled:
when 0.8Hmax<H<Hmax, $$|A_{m2}| > A_{p2}$$

where $A_{m2}$ is a value of $(\phi_a - \phi_{0a})/\phi_2$ of said aspherical surface fulfilling $(\phi_a - \phi_{0a})/\phi_2 < 0.0$, and $A_{p2}$ is a value of $(\phi_a - \phi_{0a})/\phi_2$ of said aspherical surface fulfilling $(\phi_a - \phi_{0a})/\phi_2 > 0.0$.

45. A zoom lens system as claimed in claim 32, wherein said third lens unit includes an aspherical lens element, and wherein the following condition is fulfilled:
when 0<H<Hmax, $$-6.0 < \frac{\phi_a - \phi_{0a}}{\phi_3} < 5.0$$

where H is a height along a lens diameter, Hmax is an effective lens diameter, $\phi_a$ is a local refractive power of said aspherical surface, $\phi_{0a}$ is a refractive power by a reference curvature of said aspherical surface, and $\phi_3$ is a refractive power of said third lens unit.

46. A zoom lens system as claimed in claim 45, wherein said third lens unit includes a bi-aspherical lens element, and wherein one surface of said bi-aspherical lens element fulfills $(\phi_a - \phi_{0a})/\phi_2 < 0.0$ when 0.8Hmax<H<Hmax, and wherein another surface of said bi-aspherical lens element fulfills $(\phi_a - \phi_{0a})/\phi_3 > 0.0$ when 0.8Hmax<H<Hmax.

47. A zoom lens system as claimed in claim 46, wherein the following condition is fulfilled:
when 0.8Hmax<H<Hmax, $$|A_{m3}| > A_{p3}$$

where $A_{m3}$ is a value of $(\phi_a - \phi_{0a})/\phi_3$ of said aspherical surface fulfilling $(\phi_a - \phi_{0a})/\phi_3 < 0.0$, and $A_{p3}$ is a value of $(\phi_a - \phi_{0a})/\phi_3$ of said aspherical surface fulfilling $(\phi_a - \phi_{0a})/\phi_3 > 0.0$.

48. A zoom lens system as claimed in claim 32, wherein said first lens unit includes a gradient index lens, and wherein said gradient index lens fulfills the following conditions:

when $0<H<0.5H_{max}$, $$\frac{d\nu_d(H)}{dH} < 0;$$

when $0<H<H_{max}$, $$-1.0 < \frac{\nu_d(H) - \nu_d(0)}{\nu_d(0)} \le 0.0$$

where $\nu d(H)$ is an Abbe number at a point a height H away from said optical axis in a vertical direction in said gradient index lens.

49. A zoom lens system as claimed in claim 32, wherein said second lens unit includes a gradient index lens, and wherein said gradient index lens fulfills the following conditions:

when $0<H<0.5H_{max}$, $$\frac{d\nu_d(H)}{dH} < 0;$$

and when $0<H<H_{max}$, $$-1.0 < \frac{\nu_d(H) - \nu_d(0)}{\nu_d(0)} \le 0.0$$

where $\nu d(H)$ is an Abbe number at a point a height H away from said optical axis in a vertical direction in said gradient index lens.

50. A zoom lens system as claimed in claim 32, wherein said third lens unit includes a gradient index lens, and wherein said gradient index lens fulfills the following conditions:

when $0<H<0.5H_{max}$, $$\frac{d\nu_d(H)}{dH} > 0;$$

and when $0<H<H_{max}$ $$0.0 \le \frac{\nu_d(H) - \nu_d(0)}{\nu_d(0)} < 1.0$$

where $\nu d(H)$ is an Abbe number at a point a height H away from said optical axis in a vertical direction in said gradient index lens.

51. A zoom lens system as claimed in claim 32, wherein said first lens unit consists of one lens element, and wherein the following condition is fulfilled:

$$0.0 < \frac{R_{12} + R_{11}}{R_{12} - R_{11}} < 5.0$$

where $R_{11}$ is a radius of curvature of an object side surface of said first lens element, and $R_{12}$ is a radius of curvature of an image side surface of said first lens element.

52. A zoom lens system as claimed in claim 32, wherein said first lens unit consists of one gradient index lens, and wherein the following condition is fulfilled:

$$0.02 \le \frac{T_1}{f_1} \le 0.4$$

where $f_1$ is a focal length of said first lens unit, and $T_1$ is an axial thickness of said first lens unit.

53. A zoom lens system as claimed in claim 32, wherein said second lens unit consists of one lens element, and wherein the following condition is fulfilled:

$$-5.0 < \frac{R_{22} + R_{21}}{R_{22} - R_{21}} < 0.0$$

where $R_{21}$ is a radius of curvature of an object side surface of said second lens unit, and $R_{22}$ is a radius of curvature of an image side surface of said second lens unit.

54. A zoom lens system as claimed in claim 32, wherein said second lens unit consists of one gradient index lens, and wherein the following condition is fulfilled:

$$0.08 \le \frac{T_2}{f_2} \le 1.0$$

where $f_2$ is a focal length of said second lens unit, and $T_2$ is an axial thickness of said second lens unit.

55. A zoom lens system as claimed in claim 32, wherein said third lens unit consists of one lens element, and wherein the following condition is fulfilled:

$$0.0 < \frac{R_{32} + R_{31}}{R_{32} - R_{31}} < 5.0$$

where $R_{31}$ is a radius of curvature of an object side surface of said third lens unit, and $R_{32}$ is a radius of curvature of an image side surface of said third lens unit.

56. A zoom lens system as claimed in claim 32, wherein said third lens unit consists of one gradient index lens, and wherein the following condition is fulfilled:

$$0.02 \le \frac{T_3}{|f_3|} \le 0.7$$

where $f_3$ is a focal length of said third lens unit, and $T_3$ is an axial thickness of said third lens unit.

57. A zoom lens system as claimed in claim 32, wherein the following condition is fulfilled:

$$0.1 \le \frac{\phi_1}{\phi_W} \le 1.0$$

where $\phi_1$ is a refractive power of said first lens unit, and $\phi_W$ is a refractive power of said zoom lens system at a shortest focal length condition.

58. A zoom lens system as claimed in claim 32, wherein the following condition is fulfilled:

$$0.4 \le \left|\frac{\phi_3}{\phi_W}\right| \le 2.5$$

where $\phi_3$ is a refractive power of said third lens unit, and $\phi_W$ is a refractive power of said zoom lens system at a shortest focal length condition.

59. A zoom lens system as claimed in claim 32, wherein said zoom lens system consists of from an object side:

a first lens unit having a positive refractive power;

a second lens unit having a positive refractive power; and a third lens unit having a negative refractive power, wherein said lens units each include one lens element, and wherein the following condition is fulfilled:

$$0.15 < \frac{\phi_1}{\phi_2} < 1.0$$

where $\phi_1$ is a refractive power of said first lens unit, and $\phi_2$ is a refractive power of said second lens unit.

60. A zoom lens system as claimed in claim 32, wherein said zoom lens system consists of from an object side:

a first lens unit having a positive refractive power;

a second lens unit having a positive refractive power; and a third lens unit having a negative refractive power, wherein zooming is performed by varying distances between said lens units, and wherein said first and second lens units each include one lens element, and wherein said third lens unit includes two lens elements.

61. A zoom lens system as claimed in claim 60, wherein at least one of said first and second lens units consists of one gradient index lens having said gradient index in said direction vertical to said optical axis, and wherein said gradient index lens has at least one aspherical surface.

62. A zoom lens system as claimed in claim 60, wherein the following condition is fulfilled:

$$0.15 < \frac{\phi_1}{\phi_2} < 1.0$$

where $\phi_1$ is a refractive power of said first lens unit, and $\phi_2$ is a refractive power of said second lens unit.

63. A zoom lens system as claimed in claim 60, wherein said first lens unit has a positive lens configuration strongly convex to the object side, and wherein said second lens unit has a positive lens configuration strongly convex to an image side.

64. A zoom lens system as claimed in claim 60, wherein the following condition is fulfilled:

when 0<H<Hmax, $$-6.0 < \frac{\phi_a - \phi_{0a}}{\phi_g} < 5.0$$

where H is a height along a lens diameter, Hmax is an effective lens diameter, $\phi_a$ is a local refractive power of said aspherical surface, $\phi_{0a}$ is a refractive power by a reference curvature of said aspherical surface, and $\phi_g$ is a refractive power of said gradient index lens.

65. A zoom lens system as claimed in claim 60, wherein the following condition is fulfilled:

$$\left| \frac{N_{d2}}{\phi_g^4} \right| < 1000$$

where $N_{d2}$ is a fourth power gradient index coefficient of said gradient index lens to d-line, and $\phi_g$ is a refractive power of said gradient index lens.

66. A zoom lens system as claimed in claim 60, wherein said positive lens unit includes a gradient index lens, and wherein the following condition is fulfilled:

$$-30 < \frac{N_{d1}}{\phi_p^2} < 20$$

where $N_{d1}$ is a quadratic gradient index of said gradient index lens to d-line, and $\phi_p$ is a refractive power of said positive lens unit.

67. A zoom lens system as claimed in claim 60, wherein said first lens unit includes an aspherical lens element, and wherein the following condition is fulfilled:

when 0<H<Hmax, $$-6.0 < \frac{\phi_a - \phi_{a0}}{\phi_1} < 5.0$$

where H is a height along a lens diameter, Hmax is an effective lens diameter, $\phi_a$ is a local refractive power of said aspherical surface, $\phi_{a0}$ is a refractive power by a reference curvature of said aspherical surface, and $\phi_1$ is a refractive power of said first lens unit.

68. A zoom lens system as claimed in claim 60, wherein said second lens unit includes an aspherical lens element, and the following condition is fulfilled:

when 0<H<Hmax, $$-3.0 < \frac{\phi_a - \phi_{a0}}{\phi_2} < 2.0$$

where H is a height along a lens diameter, Hmax is an effective lens diameter, $\phi_a$ is a local refractive power of said aspherical surface, $\phi_{a0}$ is a refractive power by a reference curvature of said aspherical surface, and $\phi_2$ is a refractive power of said second lens unit.

69. A zoom lens system as claimed in claim 60, wherein said third lens unit includes an aspherical lens element, and wherein the following condition is fulfilled:

when 0<H<Hmax, $$-6.0 < \frac{\phi_a - \phi_{a0}}{\phi_3} < 5.0$$

where H is a height along a lens diameter, Hmax is an effective lens diameter, $\phi_a$ is a local refractive power of said aspherical surface, $\phi_{a0}$ is a refractive power by a reference curvature of said aspherical surface, and $\phi_3$ is a refractive power of said third lens unit.

70. A zoom lens system as claimed in claim 60, wherein a bi-aspherical lens element is included, and wherein said bi-aspherical lens element fulfills the following conditions:

when 0.8Hmax<H<Hmax, $$\frac{\phi_{a1}(H) - \phi_{a10}}{\phi_{BA}} < 0.0$$

$$\frac{\phi_{a2}(H) - \phi_{a20}}{\phi_{BA}} > 0.0$$

$$\left| \frac{\phi_{a1}(H) - \phi_{a10}}{\phi_{BA}} \right| - \frac{\phi_{a2}(H) - \phi_{a20}}{\phi_{BA}} > 0$$

where $\phi_{a1}(H)$ is a refractive power by a local curvature at a height H of a first aspherical surface, $\phi_{a10}$ is a refractive power by a reference curvature of said first aspherical surface, $\phi_{a2}(H)$ is a refractive power by a local curvature at said height H of a second aspherical surface, $\phi_{a2o}$ is a refractive power by a reference curvature of said second aspherical surface, and $\phi_{BA}$ is a refractive power of a lens unit including said bi-aspherical lens element.

71. A zoom lens system as claimed in claim 60, wherein said first lens unit includes a gradient index lens, and wherein said gradient index lens fulfills the following conditions:

when 0<H<0.5Hmax, $$\frac{d\, v_d(H)}{d\, H} < 0;$$

and
when 0<H<Hmax, $$-1.0 < \frac{v_d(H) - v_d(0)}{v_d(0)} \leq 0.0$$

where vd(H) is an Abbe number at a point a height H away from said optical axis in a vertical direction in said gradient index lens.

72. A zoom lens system as claimed in claim 60, wherein said second lens unit includes a gradient index lens, and wherein said gradient index lens fulfills the following conditions:

when 0<H<0.5Hmax, $$\frac{d\, v_d(H)}{d\, H} < 0;$$

and
when 0<H<Hmax, $$-1.0 < \frac{v_d(H) - v_d(0)}{v_d(0)} \leq 0.0$$

where vd(H) is an Abbe number at a point a height H away from said optical axis in a vertical direction in said gradient index lens.

73. A zoom lens system as claimed in claim 60, wherein said first lens unit includes a gradient index lens, and wherein the following condition is fulfilled:

$$-5.0 < \frac{N\lambda 1 - Nd1}{\phi 1^2} < 5.0$$

where Nλ1 is a quadratic gradient index coefficient of said gradient index lens to F-line and C-line, Nd1 is a quadratic gradient index coefficient of said gradient index lens to d-line, and φ1 is a refractive power of said first lens unit.

74. A zoom lens system as claimed in claim 60, wherein said second lens unit includes a gradient index lens, and wherein the following condition is fulfilled:

$$-1.0 < \frac{N\lambda 1 - Nd1}{\phi 2^2} < 1.0$$

where Nλ1 is a quadratic gradient index coefficient of said gradient index lens to F-line and C-line, Nd1 is a quadratic gradient index coefficient of said gradient index lens to d-line, and φ2 is a refractive power of said second lens unit.

75. A zoom lens system as claimed in claim 60, wherein said first lens unit consists of one gradient index lens, and wherein the following condition is fulfilled:

$$0.0 < \frac{R_{12} + R_{11}}{R_{12} - R_{11}} < 5.0$$

where $R_{11}$ is a radius of curvature of an object side surface of said first lens unit, and $R_{12}$ is a radius of curvature of an image side surface of said first lens unit.

76. A zoom lens system as claimed in claim 60, wherein said first lens unit consists of one gradient index lens, and wherein the following condition is fulfilled:

$$0.02 \leq \frac{TT_1}{f_1} \leq 0.4$$

where $f_1$ is a focal length of said first lens unit, and $TT_1$ is an axial thickness of said first lens unit.

77. A zoom lens system as claimed in claim 60, wherein said second lens unit consists of one gradient index lens, and wherein the following condition is fulfilled:

$$-5.0 < \frac{R22 + R21}{R22 - R21} < 0.0$$

where $R_{21}$ is a radius of curvature of an object side surface of said second lens unit, and $R_{22}$ is a radius of curvature of an image side surface of said second lens unit.

78. A zoom lens system as claimed in claim 60, wherein said second lens unit consists of one gradient index lens, and wherein the following condition is fulfilled:

$$0.08 \leq \frac{TT_2}{f_2} \leq 1.0$$

where $f_2$ is a focal length of said second lens unit, and $TT_2$ is an axial thickness of said second lens unit.

79. A zoom lens system as claimed in claim 60, wherein the following condition is fulfilled:

$$0.1 \leq \frac{\phi_1}{\phi_w} \leq 1.0$$

where $\phi_1$ is a refractive power of said first lens unit, and $\phi_W$ is a refractive power of said zoom lens system at a shortest focal length condition.

80. A zoom lens system as claimed in claim 60, wherein the following condition is fulfilled:

$$0.4 \leq \left|\frac{\phi_3}{\phi_w}\right| \leq 2.5$$

where $\phi_3$ is a refractive power of said third lens unit, and $\phi_W$ is a refractive power of said zoom lens system at a shortest focal length condition.

* * * * *